(12) United States Patent
Brackenridge et al.

(10) Patent No.: US 10,460,572 B2
(45) Date of Patent: Oct. 29, 2019

(54) METHODS AND SYSTEM FOR PROCESSING CUSTOMERS THROUGH A POINT-OF-SALE SYSTEM HAVING A MULTIPLE-ITEM PRICE SCANNING APPARATUS

(71) Applicants: Stephanie Lee Brackenridge, Hudsonville, MI (US); Elmer Robinson, Jr., Marne, MI (US); David Scott Pallas, Hudsonville, MI (US)

(72) Inventors: Stephanie Lee Brackenridge, Hudsonville, MI (US); Elmer Robinson, Jr., Marne, MI (US); David Scott Pallas, Hudsonville, MI (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 14/421,521

(22) PCT Filed: Jul. 16, 2013

(86) PCT No.: PCT/US2013/050750
§ 371 (c)(1),
(2) Date: Feb. 13, 2015

(87) PCT Pub. No.: WO2014/014954
PCT Pub. Date: Jan. 23, 2014

(65) Prior Publication Data
US 2015/0194023 A1    Jul. 9, 2015

Related U.S. Application Data

(60) Provisional application No. 61/712,056, filed on Oct. 10, 2012, provisional application No. 61/672,140, filed on Jul. 16, 2012.

(51) Int. Cl.
*G06F 7/00*    (2006.01)
*G07G 1/00*    (2006.01)
(Continued)

(52) U.S. Cl.
CPC .......... *G07G 1/0018* (2013.01); *G06Q 20/10* (2013.01); *G06Q 30/06* (2013.01); *G07G 1/0036* (2013.01);
(Continued)

(58) Field of Classification Search
USPC ........ 235/375, 379, 380, 435, 439, 451, 462
See application file for complete search history.

(56) References Cited

U.S. PATENT DOCUMENTS

| 5,543,607 A | 8/1996 | Watanabe et al. |
| 7,648,066 B2 | 1/2010 | Kangas et al. |
| (Continued) | | |

FOREIGN PATENT DOCUMENTS

| DE | 202006016666 U1 | 1/2007 |
| DE | 102008010642 A1 | 8/2009 |
| (Continued) | | |

OTHER PUBLICATIONS

European Search Report in co-pending European patent application EP13819626.6 dated Jan. 1, 2016.

*Primary Examiner* — Matthew Mikels
(74) *Attorney, Agent, or Firm* — Schwegman, Lundberg & Woessner

(57) ABSTRACT

A system for processing customers of a retail establishment through a point-of-sale system at which multiple items can be simultaneously scanned for purchase may include a conveyance path to transport items for purchase from the retail establishment, a multiple-item scanner to substantially simultaneously price scan multiple items grouped together on the conveyance path as the conveyance path transports the multiple items thereby, a plurality of separate item collection areas coupled to the conveyance path, each of the plurality of item collection areas configured to selectively receive items from the conveyance path after price scanning by the multiple-item scanner, and a plurality of customer payment interfaces each positioned at a different one of the plurality of item collection areas and each configured to process customer payment for purchase of items routed only to the one of the plurality of item collection areas at which that customer payment station is positioned.

18 Claims, 21 Drawing Sheets

(51) Int. Cl.
*G06Q 30/06* (2012.01)
*G06Q 20/10* (2012.01)
*G07G 1/12* (2006.01)
*A47F 9/04* (2006.01)

(52) U.S. Cl.
CPC ............. *G07G 1/0045* (2013.01); *G07G 1/12* (2013.01); *A47F 9/048* (2013.01)

(56) References Cited

U.S. PATENT DOCUMENTS

| 7,967,112 | B2 | 6/2011 | Kaplan et al. | |
|---|---|---|---|---|
| 8,240,563 | B2 | 8/2012 | Kaplan et al. | |
| 2001/0016871 | A1* | 8/2001 | Fujita | G06Q 20/20 709/203 |
| 2002/0079366 | A1* | 6/2002 | Nguyen | A47F 9/045 235/383 |
| 2002/0103708 | A1* | 8/2002 | Kloubakov | G06Q 20/20 705/21 |
| 2004/0204992 | A1* | 10/2004 | Doerwald | G06Q 30/02 705/14.27 |
| 2008/0302607 | A1* | 12/2008 | Kaplan | A47F 9/04 186/61 |
| 2009/0090583 | A1* | 4/2009 | Bonner | G06Q 30/06 186/59 |
| 2013/0320083 | A1* | 12/2013 | Hammer | A47F 9/046 235/383 |

FOREIGN PATENT DOCUMENTS

| EP | 0491348 | 6/1992 |
|---|---|---|
| EP | 1746547 | 1/2007 |
| EP | 2177135 | 4/2010 |
| JP | 07277478 | 10/1995 |
| WO | 2004/109611 | 12/2004 |
| WO | 2007/125200 | 11/2007 |
| WO | 2004/008402 | 1/2014 |

* cited by examiner

METHODS AND SYSTEM FOR PROCESSING CUSTOMERS THROUGH A POINT-OF-SALE SYSTEM HAVING A MULTIPLE-ITEM PRICE SCANNING APPARATUS

CROSS-REFERENCE TO RELATED APPLICATIONS

This patent application claims the benefit of, and priority to, U.S. Provisional Patent Application Ser. No. 61/672,140, filed Jul. 16, 2012, and to U.S. Provisional Patent Application Ser. No. 61/712,056, filed Oct. 10, 2012, the disclosures of which are each incorporated herein by reference.

BACKGROUND

Retailers of goods and services may typically offer such goods and services for purchase via one or more conventional brick-and-mortar retail outlets. Such retail outlets may include any number of point-of-sale systems via which customers purchase items selected while shopping according to a so-called "checkout" process. Some such point-of-sale systems are operated by employees of the retail enterprise, while others are so-called "self-checkout" point-of-sale systems at which customers scan their selected items for purchase, autonomously control payment for the selected items and perhaps bag their purchased items.

Bulk item price scanners are commercially available which are capable of determining, substantially simultaneously, prices for multiple items grouped together on a conveyance unit. Such bulk item or multiple-item price scanners therefore have the potential to achieve significantly increased item throughput in point-of-sale systems as compared with conventional item scanners. Item conveyance and handling systems can be designed to take advantage of the increased item throughput made possible with such multiple-item price scanners to concomitantly increase the volume of customers that can be processed though point-of-sale systems at any one time and/or decrease the processing time of customers through point-of-sale systems.

SUMMARY

This disclosure may comprise one or more of the features recited in the attached claims, and/or one or more of the following features and combinations thereof. In one aspect, a system for processing customers of a retail establishment through a point-of-sale system at which multiple items can be simultaneously scanned for purchase may include a conveyance path to transport items for purchase from the retail establishment, a multiple-item scanner to substantially simultaneously price scan multiple items grouped together on the conveyance path as the conveyance path transports the multiple items thereby, a plurality of separate item collection areas coupled to the conveyance path, each of the plurality of item collection areas configured to selectively receive items from the conveyance path after price scanning by the multiple-item scanner, and a plurality of customer payment interfaces each positioned at a different one of the plurality of item collection areas and each configured to process customer payment for purchase of items routed only to the one of the plurality of item collection areas at which that customer payment station is positioned.

In another aspect, a system for processing customers of a retail establishment through a point-of-sale system at which multiple items can be simultaneously scanned for purchase may include a conveyance path support structure defining a planar shelf mating surface, a conveyance path operatively mounted to the conveyance path support structure to transport items for purchase from the retail establishment, the conveyance path defining a planar item support surface that is parallel with the shelf mating surface of the conveyance path support structure, the conveyance path having an item entrance end and an opposite item exit end, a multiple-item scanner to substantially simultaneously price scan multiple items grouped together on the conveyance path as the conveyance path transports the multiple items thereby, the shelf mating surface of the conveyance path support structure defined along one side of the conveyance path between the multiple-item scanner and the item exit end of the conveyance path, and an attendant station adjacent to the one side the conveyance path support structure, the attendant station comprising a shelf having a planar top surface, the shelf mounted to the conveyance path support structure with the top surface abutting and co-planar with the shelf mating surface of the conveyance path, the shelf mating surface of the conveyance path support structure and the top surface of the shelf together forming a substantially continuous planar surface.

In yet another aspect, a system for processing customers of a retail establishment through a point-of-sale system at which multiple items can be simultaneously scanned for purchase may include a conveyance path to transport items for purchase from the retail establishment, the conveyance path having an item entrance end and an opposite item exit end, a multiple-item scanner to substantially simultaneously price scan multiple items grouped together on the conveyance path as the conveyance path transports the multiple items thereby, a plurality of separate item collection areas to receive items from the conveyance path after price scanning by the multiple-item scanner, and at least one rotatable turnabout positioned between the item exit end of the conveyance path and the plurality of item collection areas to route the multiple items from the conveyance path to a selected one of the plurality of item collection areas after price scanning by the multiple-item scanner.

In a further aspect, a system for processing customers of a retail establishment through a point-of-sale system at which multiple items can be simultaneously scanned for purchase may include a conveyance path to transport items for purchase from the retail establishment, a multiple-item scanner to substantially simultaneously price scan multiple items grouped together on the conveyance path as the conveyance path transports the multiple items thereby, and a plurality of separate item collection areas coupled to the conveyance path to receive items from the conveyance path after price scanning by the multiple-item scanner, each of the plurality of item collection areas having an item entrance end, an item exit end and an item support surface that slopes downwardly from the item entrance end toward the item exit end at a first angle selected to slow items moving down the item collection area from the item entrance end toward the item exit end sufficiently to maintain integrity of at least one of one or more of the items and the contents of one or more of the items.

In still another aspect, a system for processing customers of a retail establishment through a point-of-sale system at which multiple items can be simultaneously scanned for purchase may include a conveyance path to transport items for purchase from the retail establishment, a multiple-item scanner to substantially simultaneously price scan multiple items grouped together on the conveyance path as the conveyance path transports the multiple items thereby, the multiple-item scanner to produce an exception signal when the multiple-item scanner detects at least one item of the multiple items as an exception, an attendant station comprising a display monitor and a hand-held price scanner, and a processor including a memory having stored therein instructions executable by the processor to control movement of the conveyance path, to control the display monitor to display a graphic thereon in response to receipt of the exception signal produced by the multiple-item scanner, and to acknowledge attendant response to the exception detected by the multiple-item scanner by continuing to control movement of the conveyance path upon receipt of a scan signal produced by the hand-held price scanner when the hand-held price scanner scans the graphic displayed on the display monitor.

In still a further aspect, a system for processing customers of a retail establishment through a point-of-sale system at which multiple items can be simultaneously scanned for purchase may include a conveyance path support structure defining spaced apart first and second side walls, a conveyance path operatively mounted to the conveyance path support structure between the first and second side walls, the conveyance path configured to transport items for purchase from the retail establishment along the first and second side walls, at least one of the first and second side walls having a plurality of spaced-apart light sources mounted thereto along at least a portion of the conveyance path, a multiple-item scanner to substantially simultaneously price scan multiple items grouped together on the conveyance path as the conveyance path transports the multiple items thereby, the multiple-item scanner to produce an exception signal when the multiple-item scanner detects at least one item of the multiple items as an exception, and a processor including a memory having stored therein instructions executable by the processor to control at least some of the plurality of light sources, in response to receipt of the exception signal, based on a transport speed of the conveyance path to each selectively illuminate as the at least one item detected as an exception is transported thereto by the conveyance path.

In yet another aspect, a system for processing customers of a retail establishment through a point-of-sale system at which multiple items can be simultaneously scanned for purchase may include a conveyance path to transport items for purchase from the retail establishment between an item entrance end and an item exit end of the conveyance path, a multiple-item scanner to substantially simultaneously price scan multiple items grouped together on the conveyance path as the conveyance path transports the multiple items thereby, a plurality of separate item collection areas coupled to the item exit end of the conveyance path, each of the plurality of item collection areas configured to selectively receive items from the conveyance path after price scanning by the multiple-item scanner, a first display monitor positioned at the item entrance end of the conveyance path, and a processor including a memory having stored therein instructions executable by the processor to control the first display monitor to display thereon for customer selection graphics indicative of available ones of the plurality of item collection areas not being used by other customers, and to be responsive to a selected one of the graphics to designate a corresponding one of the plurality of item collection areas to receive items to be subsequently processed by the multiple-item scanner.

In yet a further aspect, a system for processing customers of a retail establishment through a point-of-sale system at which multiple items can be simultaneously scanned for purchase may include a conveyance path to transport items for purchase from the retail establishment between an item entrance end and an item exit end of the conveyance path, a multiple-item scanner to substantially simultaneously price scan multiple items grouped together on the conveyance path as the conveyance path transports the multiple items thereby, a plurality of separate item collection areas each coupled to the item exit end of the conveyance path, each of the plurality of item collection areas configured to selectively receive items from the conveyance path after price scanning by the multiple-item scanner, a plurality of customer payment interfaces each positioned at a different one of the plurality of item collection areas to process customer payment for purchase of items transported thereto, each of the plurality of customer payment interfaces comprising a first display monitor, and a processor including a memory having stored therein instructions executable by the processor to control the first display monitor of the customer payment interface positioned at the one of the plurality of item collection areas designated to receive the items processed by the multiple-item scanner to display thereon a graphic in place of transaction information relating to price scanning of the multiple items by the multiple-item scanner, and to display thereon the transaction information in response to manual selection of the graphic or manual selection of another selector of the customer payment interface positioned at the one of the plurality of item collection areas designated to receive the items processed by the multiple-item scanner.

In still a further aspect, a system for processing customers of a retail establishment through a point-of-sale system at which multiple items can be simultaneously scanned for purchase may include a conveyance path to transport items for purchase from the retail establishment, the conveyance path having an item entrance end and an opposite item exit end, a multiple-item scanner to substantially simultaneously price scan multiple items grouped together on the conveyance path as the conveyance path transports the multiple items thereby, the multiple-item scanner to assign each of the multiple items with an integrity value as the multiple-item scanner price scans the multiple items, a plurality of separate item collection areas to receive items from the conveyance path after price scanning by the multiple-item scanner, at least one rotatable turnabout positioned between the item exit end of the conveyance path and the plurality of item collection areas to route the multiple items from the conveyance path to a selected one of the plurality of item collection areas after price scanning by the multiple-item scanner, and a processor including a memory having stored therein instructions executable by the processor to controllably decrease at least one of a transport speed of the conveyance path and a rotational speed of the at least one rotatable turnabout based on the integrity value assigned to at least one of the multiple items if the integrity value assigned to the at least one of the multiple items warrants a decrease in a speed of transport of the at least one of the multiple items by the conveyance path and the at least one rotatable turnabout to the selected one of the plurality of collection areas in order to maintain structural integrity of the at least one of the multiple items or its contents.

A method of processing customers of a retail establishment through a point-of-sale system at which multiple items can be simultaneously scanned for purchase may include substantially simultaneously price scanning multiple items grouped together on a conveyance path with a multiple-item price scanner as the conveyance path transports the multiple items thereby, producing an exception signal when the multiple-item scanner detects at least one item of the multiple items as an exception, displaying on an attendant station display monitor a graphic in response to the exception signal produced by the multiple-item scanner, and detecting acknowledgement of the exception signal upon receipt of a scan signal produced by a hand-held price scanner in response to a scan by the hand-held price scanner of the graphic displayed on the display monitor.

Another method of processing customers of a retail establishment through a point-of-sale system at which multiple items can be simultaneously scanned for purchase may include substantially simultaneously price scanning multiple items grouped together on a conveyance path with a multiple-item price scanner as the conveyance path transports the multiple items thereby, producing an exception signal when the multiple-item scanner detects at least one item of the multiple items as an exception, and controlling at least some of a plurality of light sources extending along the conveyance path, in response to the exception signal, based on a transport speed of the conveyance path to each selectively illuminate as the at least one item detected as an exception is transported thereto by the conveyance path.

Yet another method of processing customers of a retail establishment through a point-of-sale system at which multiple items can be simultaneously scanned for purchase may include substantially simultaneously price scanning multiple items grouped together on a conveyance path with a multiple-item price scanner as the conveyance path transports the multiple items thereby, controlling a first display monitor positioned at an item entrance of the conveyance path to display thereon for customer selection graphics indicative of available ones of a plurality of item collection areas coupled to the exit end of the conveyance path that are not being used by other customers, and designating one of the plurality of item collection areas, corresponding to a selected one of the graphics, to which the multiple items price scanned by the multiple-item scanner are to be routed.

A further method of processing customers of a retail establishment through a point-of-sale system at which multiple items can be simultaneously scanned for purchase may include substantially simultaneously price scanning multiple items grouped together on a conveyance path with a multiple-item price scanner as the conveyance path transports the multiple items thereby, controlling a first display monitor of a customer payment interface positioned at one of a plurality of item collection areas designated to receive the multiple items price scanned by the multiple-item scanner to display thereon a graphic in place of transaction information relating to price scanning of the multiple items by the multiple-item scanner, and controlling first display monitor to display thereon the transaction information in response to manual selection of the graphic or manual selection of another selector of the customer payment interface.

Still another method of processing customers of a retail establishment through a point-of-sale system at which multiple items can be simultaneously scanned for purchase may include substantially simultaneously price scanning multiple items grouped together on a conveyance path with a multiple-item price scanner as the conveyance path transports the multiple items thereby, assigning to each of the multiple items an integrity value as the multiple-item scanner price scans the multiple items, routing via at least one rotatable turnabout the multiple items from the conveyance path to a selected one of a plurality of item collection areas after price scanning by the multiple-item scanner, and controllably decreasing at least one of a transport speed of the conveyance path and a rotational speed of the at least one rotatable turnabout based on the integrity value assigned to at least one of the multiple items if the integrity value assigned to the at least one of the multiple items warrants a decrease in a speed of transport of the at least one of the multiple items by the conveyance path and the at least one rotatable turnabout to the selected one of the plurality of collection areas in order to maintain structural integrity of the at least one of the multiple items or its contents.

BRIEF DESCRIPTION OF THE DRAWINGS

This disclosure is illustrated by way of example and not by way of limitation in the accompanying figures. Where considered appropriate, reference labels have been repeated among the figures to indicate corresponding or analogous elements.

DETAILED DESCRIPTION OF THE DRAWINGS

Figure 1:
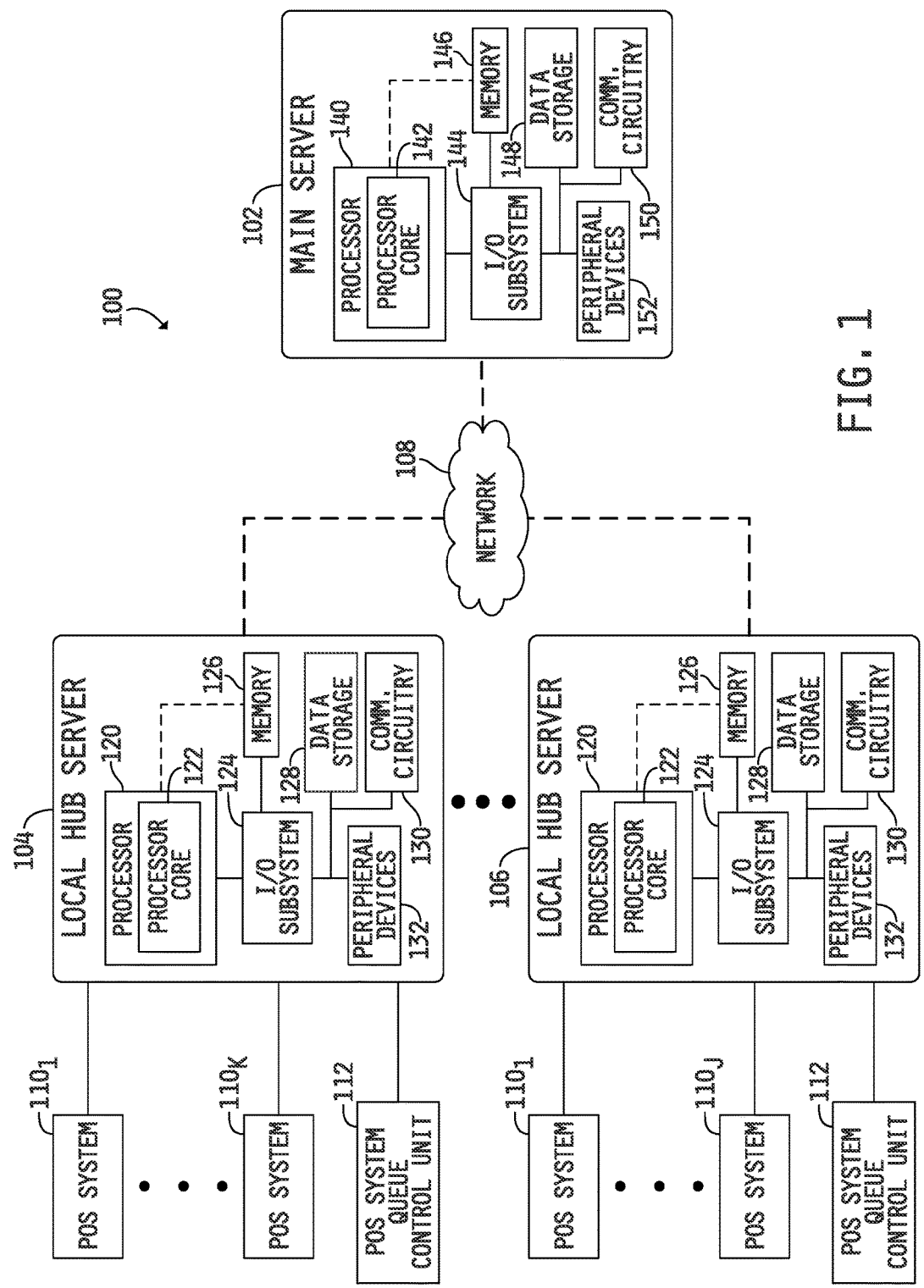
FIG. 1 is a simplified block diagram of an embodiment of a system for processing customers through a point-of-sale system having a multiple-item price scanning apparatus.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, resource partitioning/sharing/duplication implementations, types and interrelationships of system components, and logic partitioning/integration choices are set forth in order to provide a more thorough understanding of the present disclosure. Control structures, gate level circuits, driver circuits and full software instruction sequences have not been shown in detail in order not to obscure the invention. It will be appreciated, however, by one skilled in the art that embodiments of the disclosure may be practiced without such specific details. Those of ordinary skill in the art, with the included descriptions, will be able to implement appropriate functionality without undue experimentation.

References in the specification to "one embodiment", "an embodiment", "an example embodiment", "one illustrative embodiment" etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure, process, process step or characteristic is described in connection with an embodiment, it is submitted that it is within the knowledge of one skilled in the art to effect such feature, structure, process, process step or characteristic in connection with other embodiments whether or not explicitly described. Further still, it is contemplated that any single feature, structure, process, process step or characteristic disclosed herein may be combined with any one or more other disclosed feature, structure, process, process step or characteristic, whether or not explicitly described, and that no limitations on the types and/or number of such combinations should therefore be inferred. The terms "customer," "shopper" and "user," and variants thereof, are used interchangeably in the following description, and such terms should be understood to refer interchangeably to an individual or a predefined group of individuals, e.g., members of a family, employees of a common business entity, etc., who shops at and purchases items from a retail enterprise. Likewise, the terms "staging area" and "collection area" should be understood to refer interchangeably to areas of the various point-of-sale systems illustrated in the drawings and described herein to which items purchased by customers are routed for bagging and, in some cases, payment thereof.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on one or more machine-readable media, which may be read and executed by one or more processors. A machine-readable medium may be embodied as any device or physical structure for storing or transmitting information in a form readable by a machine (e.g., a computing device). For example, a machine-readable medium may be embodied as any one or combination of read only memory (ROM);

random access memory (RAM); magnetic disk storage media; optical storage media; flash memory devices; and others.

Referring now to FIG. 1, a system 100 is shown for processing customers through a point-of-sale system which utilizes bulk item price scanning. In the illustrated embodiment, the system 100 includes a main server 102 coupled via a network 108 to a plurality of hub servers 104, 106 each configured to control one or more such point-of-sale systems $110_1$-$110_K$, $110_1$-$110_J$ to process items selected by customers for purchase and to process payment for such items. As discussed in more detail below, each of the one or more point-of-sale systems $110_1$-$110_K$, $110_1$-$110_J$ includes a bulk item scanner configured to determine, substantially simultaneously, prices for multiple items grouped together on a conveyance unit, and the system 100 provides structures and controls for handling and conveying such items prior to and/or following such price scanning for the purpose of facilitating advancement of customers through the point-of-sale system. Some retail enterprises may include multiple such point-of-sale systems, and in such implementations the system 100 may further illustratively include a point-of-sale queue control unit 112 configured to monitor operation of the multiple point-of-sale systems and guide customers to available ones of the multiple point-of-sale systems.

Some retail enterprises may include a single brick and mortar outlet, and other larger enterprises may include two or more physically remote brick and mortar outlets. In the latter case, the retail enterprise may include, for example, a main physical location with two or more remote physical locations, and for purposes of this document the two or remote physical locations in such an arrangement are referred to as "hub" locations. In this disclosure, the system 100 will be illustrated and described in the context of such a larger retail enterprise having a main physical location and two or more physical hub locations. In this regard, the system 100 shown in FIG. 1 illustratively includes a main server 102, which will typically be located at the main location of the retail enterprise, coupled via a network 108 to two or more local hub servers 104, 106, each of which will typically be located at a different one of the two or more hub locations. Each hub location may include any number of point-of-sale systems coupled to a corresponding local hub server, and in the embodiment illustrated in FIG. 1, for example, the local hub server 104 is communicatively coupled to "K" such point-of-sale systems $110_1$-$110_K$, $110_1$-$110_J$ where K may be any positive integer, and the local hub server 106 is communicatively coupled to "J" such point-of-sale systems $110_1$-$110_J$, where J may be any positive integer and where J may or may not be equal to K. Communicative coupling between the local hub server 104 and the one or more point-of-sale systems $110_1$-$110_K$, and between the local hub server 106 and the one or more point-of-sale systems $110_1$-$110_J$, may be accomplished using any known hardware and/or wireless communication coupling, and communications over such hardwire and/or wireless coupling may be accomplished using any known communication protocol.

Any of the one or more hub locations may further include a point-of-sale system queue control unit 112, and in the embodiment illustrated in FIG. 1, for example, the local hub server 104 is communicatively coupled to a dedicated point-of-sale system queue control unit 112 and the local hub server 104 is likewise communicatively coupled to a separate, dedicated point-of-sale system queue control unit 112. Communicative coupling between either of the local hub servers 104, 106 and an associated point-of-sale system queue control unit 112 may be accomplished using any known hardwire and/or wireless communication coupling, and communications over such hardwire and/or wireless coupling may be accomplished using any known communication protocol.

In some alternative embodiments of such a large retail enterprise, one or more of the local hub servers 104, 106 may be omitted, and the main server 102 may be coupled direction, via the network 108, to the one or more point-of-sale systems $110_1$-$110_K$, $110_1$-$110_J$ and/or to the point-of-sale system queue control unit 112, or the main server may be omitted and at least one of the local hub servers 104, 106 may be configured to act as a so-called master server with the remaining local hub servers 104, 106 configured to act as so-called slave servers. In other alternative embodiments in which the retail enterprise includes only a single brick and mortar outlet, the local hub server 104, 106 may be or include the main server 102 or vice versa. For purposes of the following description, any process disclosed as being controlled by the one or more local hub servers 104, 106 may, in some embodiments, instead be controlled, in whole or in part, by the main server 102 and vice versa, and/or may be controlled, in whole or in part, by one of point-of-sale systems $110_1$-$110_K$, $110_1$-$110_J$.

In the embodiment illustrated in FIG. 1, the user computing device 104, of the system 100 may be embodied as any type of computing device capable of performing the functions described herein. For example, each of the user computing device 104 may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a network appliance, a web appliance, a distributed computing system, a multiprocessor system, a processor-based system, a consumer electronic device, a digital television device, a set top box, and/or any other computing device configured to store and access data, and to execute electronic game software and related applications. Additionally, although the system 100 is illustrated in FIG. 1 as including two user computing devices 104, 106, it should be appreciated that the system 100 may include any number of user computing devices.

The local hub server 104 may be embodied as any type of server (e.g., a web server) or similar computing device capable of performing the functions described herein. In the illustrative embodiment of FIG. 1, the local hub server 104 includes a processor 120, an I/O subsystem 124, a memory 126, a data storage 128, a communication circuitry 130, and one or more peripheral devices 132. In some embodiments, several of the foregoing components may be incorporated on a motherboard or main board of the local hub server 104, while other components may be communicatively coupled to the motherboard via, for example, a peripheral port. Furthermore, it should be appreciated that the local hub server 104 may include other components, sub-components, and devices commonly found in a sever and/or computing device, which are not illustrated in FIG. 1 for clarity of the description.

The processor 120 of the local hub server 104 may be embodied as any type of processor capable of executing software/firmware, such as a microprocessor, digital signal processor, microcontroller, or the like. The processor 120 is illustratively embodied as a single core processor having a processor core 122. However, in other embodiments, the processor 120 may be embodied as a multi-core processor having multiple processor cores 122. Additionally, the local hub server 104 may include additional processors 120 having one or more processor cores 122.

The I/O subsystem 124 of the local hub server 104 may be embodied as circuitry and/or components to facilitate input/output operations with the processor 120 and/or other components of the local hub server 104. In some embodiments, the I/O subsystem 124 may be embodied as a memory controller hub, an input/output controller hub, and a firmware device. In such embodiments, the firmware device of the I/O subsystem 124 may be embodied as a memory device for storing Basic Input/Output System (BIOS) data and/or instructions and/or other information (e.g., a BIOS driver used during booting of the local hub server 104). However, in other embodiments, I/O subsystems having other configurations may be used. For example, in some embodiments, the I/O subsystem 124 may be embodied as a platform controller hub. In such embodiments, the memory controller hub may be incorporated in or otherwise associated with the processor 120, and the processor 120 may communicate directly with the memory 126 (as shown by the dashed line in FIG. 1). Additionally, in other embodiments, the I/O subsystem 124 may form a portion of a system-on-a-chip and be incorporated, along with the processor 120 and other components of the user computing device 104, on a single integrated circuit chip.

The processor 120 is communicatively coupled to the I/O subsystem 124 via a number of signal paths. These signal paths (and other signal paths illustrated in FIG. 1) may be embodied as any type of signal paths capable of facilitating communication between the components of the local hub server 104. For example, the signal paths may be embodied as any number of point-to-point links, wires, cables, light guides, printed circuit board traces, vias, bus, intervening devices, and/or the like.

The memory 126 of the user local hub server 104 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 126 is communicatively coupled to the I/O subsystem 124 via a number of signal paths. Although only a single memory device 126 is illustrated in FIG. 1, the user computing device 104 may include additional memory devices in other embodiments. Various data and software may be stored in the memory 126. For example, one or more operating systems, applications, programs, libraries, and drivers that make up the software stack executed by the processor 120 may reside in memory 126 during execution. The data storage 128 may be embodied as any type of device or devices configured for the short-term or long-term storage of data such as, for example, memory devices and circuits, memory cards, hard disk drives, solid-state drives, or other data storage devices.

The communication circuitry 130 of the local hub server 104 may include any number of devices and circuitry for enabling communications between the local hub sever 104 and the main server 102, between the local hub server 104 and the one or more point-of-sale systems 110$_1$-110$_K$ and between the local hub server 104 and the point-of-sale system queue control unit 112. In the illustrated embodiment, for example, communication between the local hub server 104 and the main server 102 takes place wirelessly via the network 108, wherein the network 108 may represent, for example, a private or non-private local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). In alternative embodiments, the communication path between the local hub server 104 and the main server 102 may be, in whole or in part, a wired connection. Generally, the communication circuitry 130 may be configured to use any one or more, or combination, of secure and/or unsecure communication protocols to communicate with the main server 102 such as, for example, a wired network communication protocol (e.g., TCP/IP), a wireless network communication protocol (e.g., Wi-Fi®, WiMAX), a cellular communication protocol (e.g., Wideband Code Division Multiple Access (W-CDMA)), and/or other communication protocols. As such, the network 108 may include any number of additional devices, such as additional computers, routers, and switches, to facilitate communications between the local hub server 104 and the main server 102. As discussed hereinabove, communication between the local hub server 104 and the one or more point-of-sale systems 110$_1$-110$_K$, and between the local hub server 104 and the point-of-sale system queue control unit 112, may take place via one or more conventional wired or wireless communication interfaces.

In some embodiments, the local hub server 104 may also include one or more peripheral devices 132. Such peripheral devices 132 may include any number of additional input/output devices, interface devices, and/or other peripheral devices. For example, the peripheral devices 132 may include a display, a keyboard, a mouse, audio processing circuitry (including, e.g., conventional amplification circuitry and one or more speakers), and/or other input/output devices, interface devices, and/or peripheral devices.

The local hub server 106 may be substantially similar to the local hub server 104 and include similar components, which have been identified in FIG. 1 with common reference numbers. As such, the description provided above of the components of the local hub server 104 may be equally applicable to those similar components of the local hub server 106 and are not repeated herein so as not to obscure the present disclosure. Of course, it should be appreciated that in some embodiments the local hub server 104, 106) may be dissimilar to each other.

An embodiment of the main server 102 is also illustrated in FIG. 1, and generally includes the same components as the local hub server 12. For example, a processor 140, having a processor core 142, is coupled to an I/O subsystem 144, and the I/O subsystem 144 is coupled to a memory 146, a data storage unit 148, communication circuitry 150 and one or more peripheral devices 152. In some embodiments of the main server 104, the processor 140 may be coupled directly to the memory 146 as illustrated by the dashed-line connection in FIG. 1. The components 140, 144, 146, 148, 150 and 152 are identical in structure and operation to those described with respect to the local hub server 104 except for information stored in the data storage unit 148 and/or memory 146, which information may include data and/or one or more executable software algorithms. The communication circuitry 130 of each of the local hub servers 104, 106 facilitates communication with the communication circuitry 150 of the main server 102 so that information can be shared between the main server 102 and each of the one or more local hub servers 104, 106 via the network 108. Although only one such main server 102 is shown in FIG. 1, it should be appreciated that, in other embodiments, the system 100 may include any number of main servers. In any case, the main server 102 may be embodied as any type of server (e.g., a web server) or similar computing device capable of performing the functions described herein.

Figure 2:
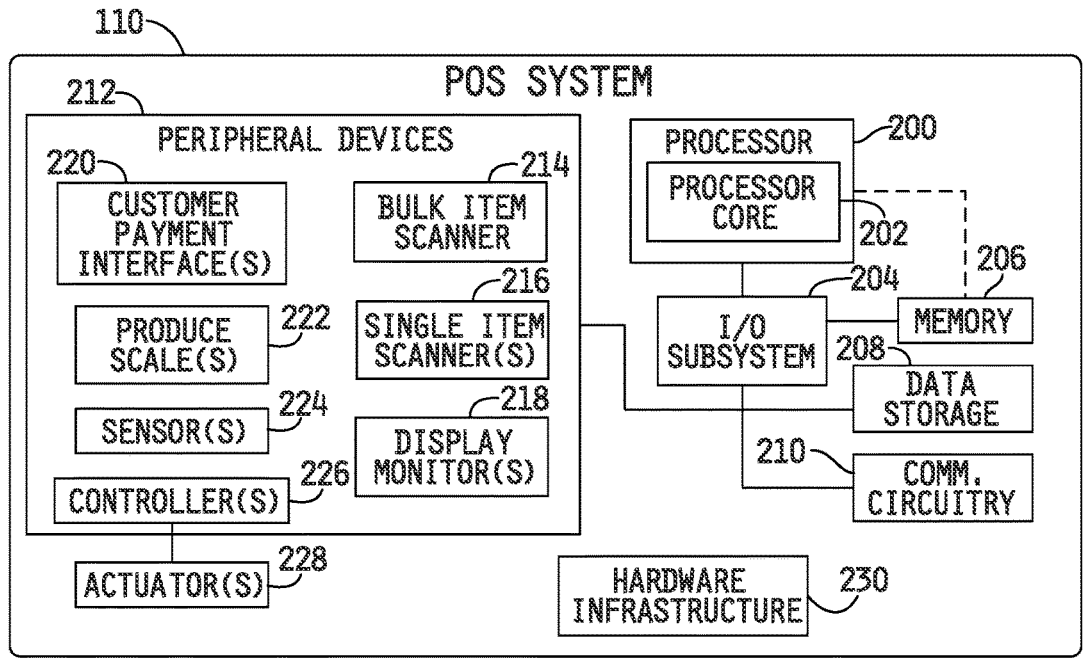
FIG. 2 is a simplified block diagram of an embodiment of one of the point-of-sale systems illustrated in FIG. 1.

Referring now to FIG. 2, an embodiment 110 of one of the one or more point-of-sale systems $110_1$-$110_K$, $110_1$-$110_J$, is shown which includes components similar to the main server 12 and also to the one or more local hub servers 104, 106, such as a processor 200, an I/O subsystem 204, a memory 206, a data storage device 208, communication circuitry 210 and a number of peripheral devices 212. Additionally, the illustrated point-of-sale system 110 includes one or more actuators 228 and hardware infrastructure 230, examples of which will be described in detail hereinafter. It will be appreciated that the point-of-sale system 110 may include other components, sub-components, and devices commonly found in a computer and/or computing device. The processor 200 is communicatively coupled to the various components of the point-of-sale system 110 via a number of signal paths. These signal paths may be embodied as any type of signal paths capable of facilitating communication between the components of the point-of-sale system 110. For example, the signal paths may be embodied as any number of wires, cables, light guides, printed circuit board traces, via, bus, link, interconnect, intervening devices, and/or the like.

The processor 200 of the point-of-sale system 110 may be embodied as any type of processor capable of executing software/firmware, such as a microprocessor, digital signal processor, microcontroller, or the like. The processor 200 is illustratively embodied as a single core processor having a processor core 202. However, similar to the processors 120 and 140 described above, the processor 200 may be embodied as a multi-core processor having multiple processor cores 202 in other embodiments. Additionally, the point-of-sale system 110 may include additional processors 200 having one or more processor cores 202.

The memory 206 of the point-of-sale system 110 may be embodied as or otherwise include one or more conventional memory devices or data storage locations. The data storage device(s) 208 of the point-of-sale system 110 may be embodied as any type of device or devices configured for the short-term or long-term storage of data and in some embodiments, the data storage device(s) 208 may be used to store information corresponding to one or more sales transaction. The communication circuitry 210 is configured to facilitate communication with a corresponding one of the local hub servers 104, 106 and the point-of-sale system 110 may use any suitable communication protocol to communicate with the corresponding local hub server 104, 106.

The peripheral devices 212 of the point-of-sale system 110 may include any number of peripheral or interface devices. Examples of some of the peripheral devices 212 illustrated in FIG. 2 include, but should not be limited to, a bulk item scanner 214, one or more conventional single item price scanners 216, one or more conventional display monitors 218, one or more conventional customer payment interfaces 220, one or more conventional produce scales 222, one or more conventional sensors or sensing systems 224 for producing one or more signals relating to the operation of the point-of-sale system 110 and one or more conventional controllers 226 for controlling one or more conventional actuators 228 associated with the operation of the point-of-sale system 110. The bulk items scanner 214 is configured to substantially simultaneously scan price code labels or other such indicators for multiple items grouped together on a conveyance unit and thereby substantially simultaneously determine prices for such multiple, grouped items. In one embodiment, the bulk item scanner 214 is a conventional bulk item scanner commercially available through Datalogic ADC, Inc. of Eugene, Oreg., although this disclosure contemplates alternative embodiments in which one or more other conventional bulk item scanners is/are used. The one or more customer payment interfaces 220 are provided, e.g., to facilitate receipt of credit card and/or other form of payment from customers, and each such interface 220 may illustratively include one or more of a display, a touch screen, a keyboard, a mouse, external speakers, and/or other peripheral devices. One or more of the one or more customer payment interfaces 220 may further include a produce scale 222.

The point-of-sale system 110 further includes hardware infrastructure 230 which forms the structural backbone of the system 230. Examples of structural components that may be included in the hardware infrastructure 230 include, but should not be limited to, one or more purchased item transport units, e.g., one or more purchased item conveyance units or systems, one or more electronically controllable gates, one or more conventional purchased item bagging areas, e.g., one or more conventional item bagging carousals, one or more purchased item support units, and the like. The one or more sensors 224 may be or include any sensor or sensing system which provides useful feedback for facilitating control of the hardware infrastructure 230 of the point-of-sale system 110. Examples of such or more sensors 224 may include, but should not be limited to, one or more weight sensors, one or more proximity sensors, one or more photoelectric, i.e., sensors that produce a signal when a beam of light or other radiation is interrupted, one or more linear or rotational speed sensors, one or more torque sensors, and the like. The one or more actuators 228 may be or include any actuator which may facilitate operation and/or control of the hardware infrastructure of the point-of-sale system 110. Examples of such one or more actuators may include, but should not be limited to, one or more linear and/or rotational drive motors, one or more electronically controlled switches, and the like.

Figure 3:
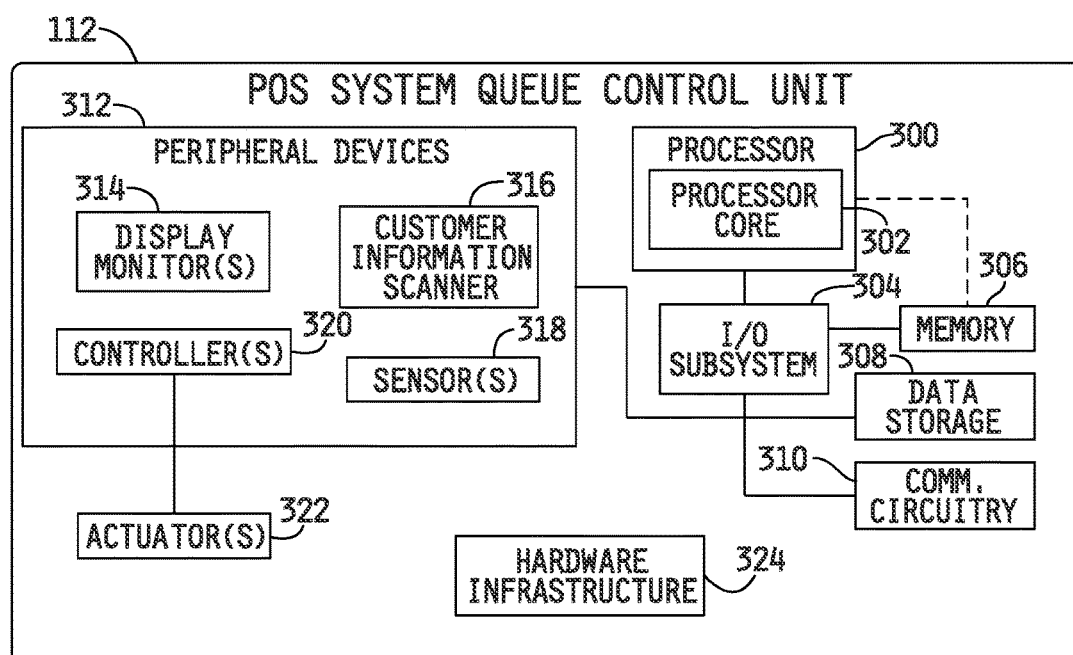
FIG. 3 is a simplified block diagram of an embodiment of one of the point-of-sale system queue control units illustrated in FIG. 1.

Referring now to FIG. 3, an embodiment of one of the point-of-sale system queue control units 112 is shown which includes components similar to the main server 12 and also to the one or more local hub servers 104, 106, such as a processor 300, an I/O subsystem 304, a memory 306, a data storage device 308, communication circuitry 310 and a number of peripheral devices 312. Additionally, the illustrated point-of-sale system queue control unit 112 includes one or more actuators 322 and hardware infrastructure 324, examples of which will be described in detail hereinafter. It will be appreciated that the point-of-sale system queue control unit 112 may include other components, sub-components, and devices commonly found in a computer and/or computing device. The processor 300 is communicatively coupled to the various components of the point-of-sale system queue control unit 112 via a number of signal paths. These signal paths may be embodied as any type of signal paths capable of facilitating communication between the components of the point-of-sale system queue control unit 112. For example, the signal paths may be embodied as any number of wires, cables, light guides, printed circuit board traces, via, bus, link, interconnect, intervening devices, and/or the like.

The processor 300 of the point-of-sale system queue control unit 112 may be embodied as any type of processor capable of executing software/firmware, such as a microprocessor, digital signal processor, microcontroller, or the like. The processor 300 is illustratively embodied as a single core processor having a processor core 302. However, similar to the processors 120, 140 and 200 described above, the processor 300 may be embodied as a multi-core processor having multiple processor cores 302 in other embodiments. Additionally, the point-of-sale system queue control unit 112 may include additional processors 300 having one or more processor cores 302.

The memory 306 of the point-of-sale system queue control unit 112 may be embodied as or otherwise include one or more conventional memory devices or data storage locations. The data storage device(s) 308 of the point-of-sale system queue control unit 112 may be embodied as any type of device or devices configured for the short-term or long-term storage of data and in some embodiments, the data storage device(s) 308 may be used to store information corresponding to one or more sales transaction. The communication circuitry 310 is configured to facilitate communication with a corresponding one of the local hub servers 104, 106 and the point-of-sale system queue control unit 112 may use any suitable communication protocol to communicate with the corresponding local hub server 104, 106.

The peripheral devices 312 of the point-of-sale system queue control unit 112 may include any number of peripheral or interface devices. Examples of some of the peripheral devices 312 illustrated in FIG. 3 include, but should not be limited to, one or more conventional display monitors 314, a customer information scanner 316, one or more conventional sensors or sensing systems 318 for producing one or more signals relating to the operation of the point-of-sale system queue control unit 112 and one or more conventional controllers 320 for controlling one or more conventional actuators 322 associated with the operation of the point-of-sale system queue control unit 112. The customer information scanner 316 may illustratively be configured to scan customer shopping membership cards or other such cards, and/or to otherwise receive customer identification input from customers. The one or more sensors 318 may be or include any sensor or sensing system which provides useful feedback for facilitating control of the point-of-sale system queue control unit 112. Examples of such or more sensors 318 may include, but should not be limited to, one or more proximity sensors, one or more line-of-sight sensors, and the like. The one or more actuators 322 may be or include any actuator which may facilitate operation and control of the point-of-sale system queue control unit 112. Examples of such one or more actuators may include, but should not be limited to, one or more drive motors, one or more electronically controlled switches, and the like.

Figure 4:
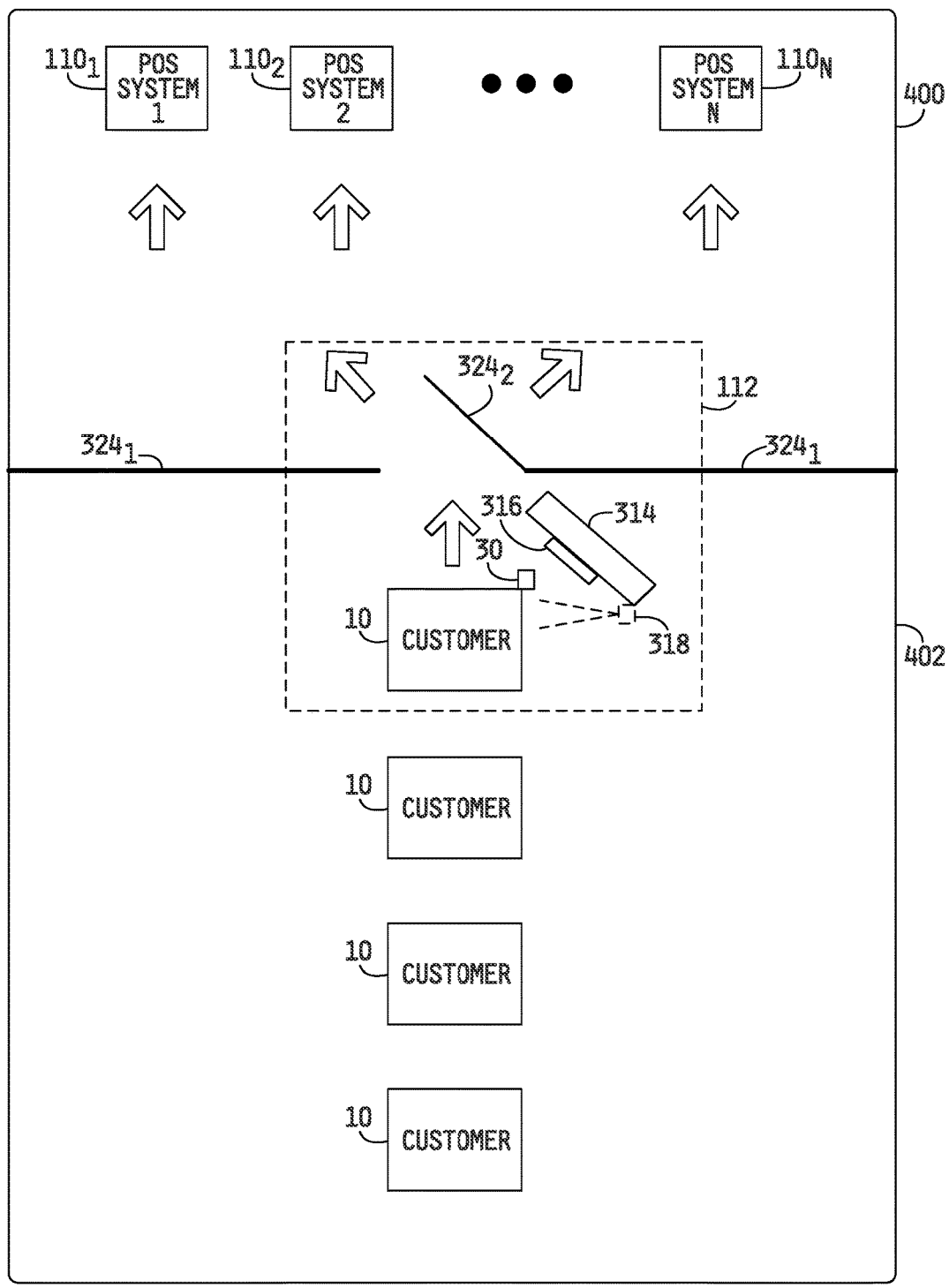
FIG. 4 is a simplified block diagram of an embodiment of an environment having multiple point-of-sale systems of the type illustrated in FIGS. 1 and 2, including a point-of-sale system queue control unit to guide customers to available ones of the multiple point-of-sale systems.

Referring now to FIG. 4, a simplified block diagram is shown of an embodiment of a retail environment which includes a point-of-sale environment 400 containing a number, N, of point-of-sale systems $110_1$-$110_N$ of the type illustrated in FIGS. 1 and 2, where N may be any positive integer. The retail environment further includes a customer queuing area 402 which is separated from the point-of-sale environment 400 by an example embodiment of a point-of-sale system queue control unit 112 of the type illustrated and described with respect to FIGS. 1 and 3. The point-of-sale system queue control unit 112 is structured and configured to selectively control and guide customer traffic to the various point-of-sale systems $110_1$-$110_N$.

In the illustrated embodiment, the point-of-sale systems $110_1$-$110_N$ are arranged in the retail environment 400 in a conventional side-by-side configuration, although it should be understood that this configuration is provided only by way of example and should not be considered limiting in any way. This disclosure contemplates other embodiments in which the N point-of-sale systems $110_1$-$110_N$ may be arranged in the point-of-sale environment 400 in other linear or non-linear configurations. In any case, the point-of-sale environment 400 is partitioned from the customer queuing area 402 by a barrier $324_1$ which is part of the hardware infrastructure 324 of the point-of-sale queue control unit 112. The barrier $324_1$ may, but need not, include a control gate $324_2$ which is controllable by the processor 300 between open and closed positions. An actuator 322 in the form of a conventional motor or other drive mechanism will typically be included to move the control gate $324_2$ between open and closed positions, although the actuator 322 is not shown in FIG. 4 to avoid obscuring the diagram. Positioned adjacent to the gate $324_2$ is a display monitor 314.

In the illustrated embodiment, customers 10 that have completed shopping will enter the queuing area 402, and the point-of-sale queue control unit 112 will guide the customers 10 to an appropriate one or ones of the various point-of-sale systems $110_1$-$110_N$. Illustratively, the point-of-sale queue control unit 112 monitors the operation of the N point-of-sale systems $110_1$-$110_N$, and will therefore have operational information relating to each such system $110_1$-$110_N$. Such operational information may include, for example, which, and how many, of the point-of-sale systems $110_1$-$110_N$ are currently busy processing customers and which are open, i.e., not currently processing customers, the number of items that have been scanned by each of the currently busy point-of-sale systems, and the like. The point-of-sale queue control unit 112 further has access to historical information relating to the operation of each of the point-of-sale systems $110_1$-$110_N$, and therefore has knowledge of the average time spent by each processing customer orders, peak hours and/or days of the week of use of each, and the like. The point-of-sale queue control unit 112 is generally operable to use any such information to determine to which one or ones of the point-of-sale systems $110_1$-$110_N$ to direct the next customer 10. One potential goal of such a determination may be to minimize the time spent processing customers by any such point-of-sale system $110_1$-$110_N$, although other criteria for making such a determination are contemplated by this disclosure.

In one embodiment, a customer information scanner 316 is positioned adjacent to the display monitor 314, although the customer information scanner 316 may alternatively be attached to the display monitor. In other embodiments, the customer information scanner 316 may be, or be integral with, the display monitor 314. In any case, customers 10 approaching the gate $324_2$ in such embodiments will scan a shopper's card 30 or other such card or device using the customer information scanner 316, or will otherwise enter customer identification information into the point-of-sale queue control unit 112, e.g., via the monitor 314, a keypad or the like. The point-of-sale queue control unit 112 will therefore have access, either via the data storage 308 or via the local hub server 104, 106, to information relating to the shopping histories of each such customer. Such customer history information may further include, for example, which of the various point-of-sale systems $110_1$-$110_N$ each such customer has used in the past, the frequency of use of each, the average time spent by each system $110_1$-$110_N$ processing the customer's purchases, and the like. In embodiments which include a customer information scanner 316 or other mechanism for identifying customers and tracking customer shopping histories, the point-of-sale queue control unit 112 is generally operable to use any such customer history information, either alone or in combination with any operational information relating to each of the different point-of-sale systems $110_1$-$110_N$, to determine to which one or ones of the point-of-sale systems $110_1$-$110_N$ to direct the next customer 10. One potential goal of such a determination may be to minimize the time spent processing customers by any such point-of-sale system $110_1$-$110_N$, although other criteria for making such a determination are contemplated by this disclosure.

Generally, the point-of-sale queue control unit 112 is configured to control and guide, e.g., direct, customers 10 in the queuing area 402 to and through the various point-of-sale systems $110_1$-$110_N$ by first processing any of the current and/or historical operational information relating to each of the different point-of-sale systems $110_1$-$110_N$, and/or processing any of the customer history information of the next customer 10 in the queue, to determine an appropriate one or ones of the point-of-sale systems $110_1$-$110_N$ to direct the next customer 10. One criteria for making such a determination may be simply to select one or more of the point-of-sale systems $110_1$-$110_N$ which is/are currently not being used. Another criteria may be to minimize the time spent processing the next customer's items by the selected one of the point-of-sale systems $110_1$-$110_N$. Yet another criteria may be to direct customers with historically large numbers of items and/or which historically take longer than average to process, to a specific one or ones of the point-of-sale systems $110_1$-$110_N$. Other criterion will occur to those skilled in the art, and any other such criterion is contemplated by this disclosure. In any case, the processor 300 of the point-of-sale system queue control unit 112 is configured to determine an appropriate one or ones of the point-of-sale systems $110_1$-$110_N$ to direct the next customer, and may use any one or combination of the example criterion just described and/or any one or combination of other criterion.

In any case, after making the determination as to which of the point-of-sale systems $110_1$-$110_N$ the next customer 10 in the customer queuing area 402 should be directed, the point-of-sale queue control unit 112 notifies the next customer 10 of the results of this determination by, for example, displaying a suitable graphic on the display screen 314. The graphic may be or include a number or name designation of the selected one or ones of the point-of-sale systems $110_1$-$110_N$, and/or may be or include one or more directional arrows, map, color code or the like.

The point-of-sale queue control unit 112 further controls the position of the gate $324_2$, in embodiments which include the gate $324_2$, between open and closed positions. In one embodiment, the processor 300 normally controls the gate $324_2$ to its closed position, although in other embodiments the processor 300 may normally control the gate to its open position as long as at least one of the point-of-sale systems $110_1$-$110_N$ is available for use and to otherwise control the gate $324_2$ to its closed position. In still other embodiments, the point-of-sale queue control unit 112 may include a proximity or photoelectric sensor 318, and the processor 300 may control the gate $324_2$ to its open position until the sensor 318 detects a customer 10 adjacent to the display screen 314, at which point the processor 300 controls the gate $324_2$ to its closed position. In any case, the processor 300 of the point-of-sale queue control unit 112 is configured to control the position of the gate $324_2$ to selectively allow passage of customers 10 through the gate $324_2$ and thereby control traffic to and through the point-of-sale environment 400.

Figure 5:
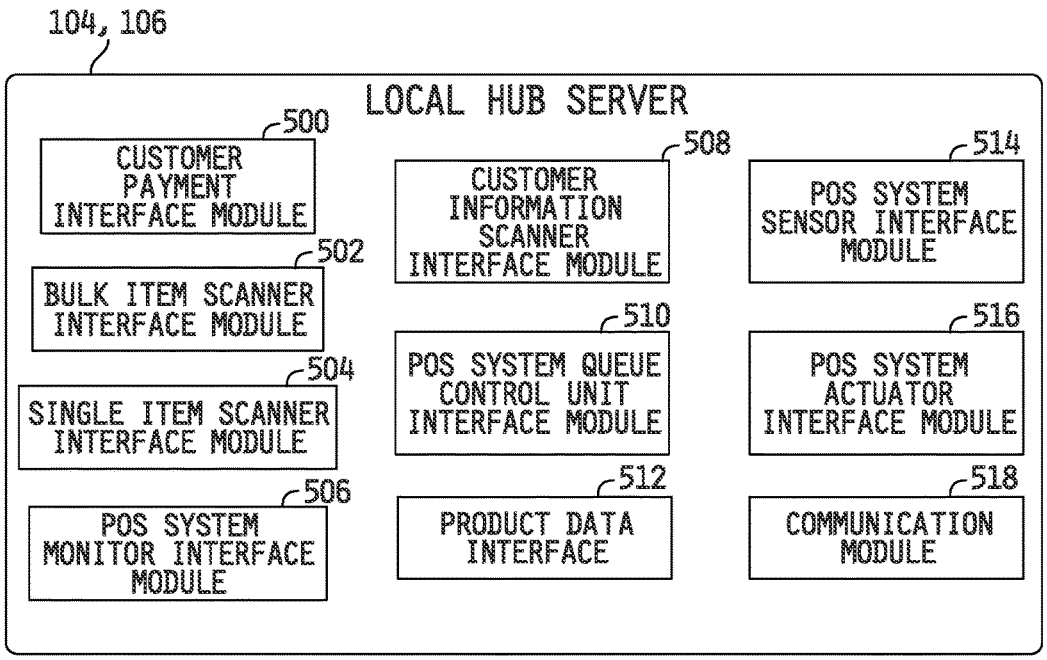
FIG. 5 is a simplified block diagram of an embodiment of an environment of the local hub server of FIG. 1.

Referring now to FIG. 5, one embodiment of a software environment of the local hub server(s) 104, 106 illustrated in FIG. 1 includes a customer payment interface module 500, a bulk item scanner interface module 502, a single item scanner interface module 504, a point-of-sale monitor interface module 506, a customer information scanner interface module 508, a point-of-sale system queue control unit interface module 510, a product data interface 512, a point-of-sale system sensor interface module 514, a point-of-sale actuator interface module 516 and a communication module 518. The modules 500, 502, 504, 506, 508 and 512 provide for information sharing between the local hub servers 104, 106 and the main server 102, in embodiments that include a main server 102, or between the local hub servers 104, 106 in embodiments that do not include the main server 102, so that certain information that is common to all of the retail outlets, e.g., product/item pricing, customer information, can be shared and so that certain sales and other business related information can be shared by each of the retail outlets with the main server 102 or with one of the local hub servers 104, 106 designated as a master server.

In some embodiments, one or more of the point-of-sale systems $110_1$-$110_N$ may be configured as a conventional thin-client device, and in such embodiments the local hub server 104, 106 includes suitable software and/or firmware to allows the local hub server 104, 106 to control one or more aspects of such one or more point-of-sale systems $110_1$-$110_N$ and/or to process information that would otherwise be processed by such one or more point-of-sale systems $110_1$-$110_N$. In the embodiment illustrated in FIG. 5, for example, the modules 510, 514 and 516 include any such suitable software and/or firmware to allow the local hub server 104, 106 to exercise such control and/or to process such information.

Figure 6:
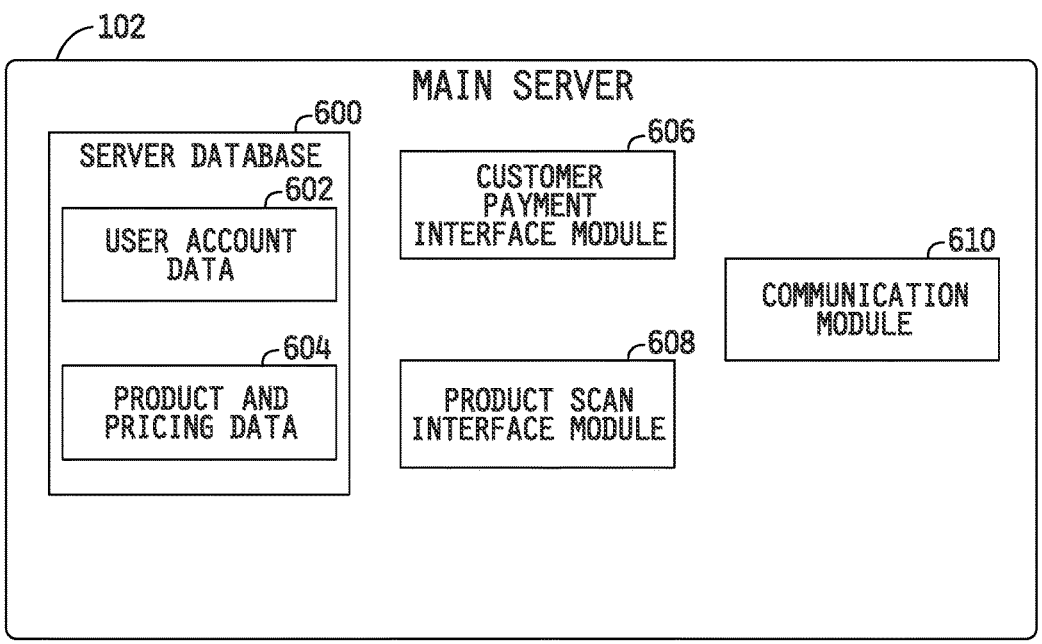
FIG. 6 is a simplified block diagram of an embodiment of an environment of the main server illustrated in FIG. 1.

Referring now to FIG. 6, one embodiment of a software environment of the main server 102 illustrated in FIG. 1 includes a server database 600, a customer payment interface module 606, a product scan interface module 608 and a communication module 610. The server database 600 illustratively includes user account data 602, which has stored therein all data for customers that have joined a shoppers club hosted by the retail establishment or that otherwise holds a user account with the retail establishment. The user account data 602 includes historical data for each such customer, as described above in connection with FIG. 4. The server database 600 further illustratively includes product and pricing data for all products/items offered for sale by the retail establishment.

Figure 7:
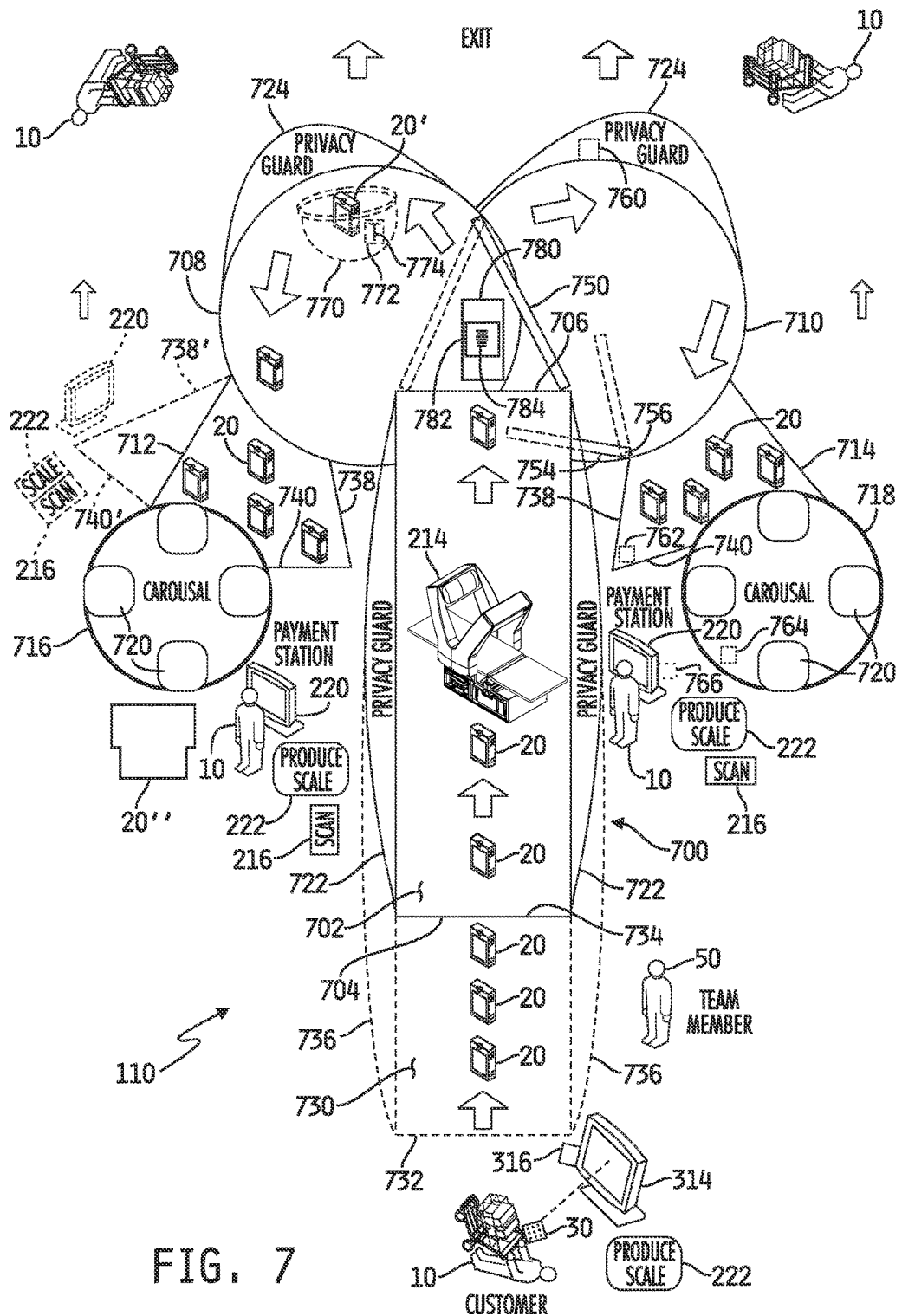
FIG. 7 is a simplified block diagram of one illustrative embodiment of a point-of-sale system of the type illustrated in FIGS. 1, 2 and 4.

Referring now to FIG. 7, a simplified block diagram is shown of one illustrative embodiment of a point-of-sale system 110 of the type illustrated in FIGS. 1, 2 and 4. In the illustrated embodiment, the point-of-sale system 110 includes an item handling and conveyance system 700 having a main conveyance path 702 with an item entrance end 702 and an item exit end 706 such that items travel along the conveyance path 702 between the item entrance end 704 and the item exit end 706 in the direction of the arrows superimposed on the conveyance path 702 in FIG. 7. A bulk item scanner 214 is positioned between the entrance end 704 and the exit end 706 of the conveyance path 702 such that items 20 to be purchased are transported through or past the bulk item scanner 214 as the items 20 move from the entrance end 704 to the exit end 706 of the conveyance path 702. In one embodiment, the conveyance path 702 is provided in the form of a conventional belt driven about two parallel rollers positioned at opposite ends 704, 706 of the conveyance path 702, although this disclosure contemplates alternate embodiments in which the conveyance path 702 may take one or more other known forms. In any case, the item transport speed of the conveyance path 702 is controlled by the processor 200.

Positioned adjacent to the exit end 706 of the conveyance path 702 are two turnabouts 708 and 710. The turnabout 708 transports items 20 exiting the exit end 706 of the conveyance path 702 to an item staging or collection area 712 adjacent to the left side of the conveyance path 702 (with reference to the direction indicated by the arrows superimposed on the conveyance path 702) where items 20 to be purchased come to rest prior to being bagged by the customer or employee of the retail enterprise. A conventional item bagging carousal 716 is positioned adjacent to the item staging or collection area 712, and the bagging carousal 716 is illustratively manually rotatable about an axis extending through its center. The bagging carousal 716 defines a number of bagging locations, and in the embodiment illustrated in FIG. 7 the carousal 716 defines four such bagging locations 720 each of which will typically be stocked with item transport bags. It will be understood that while the bagging carousal 716 is illustrated in FIG. 7 as having four bagging locations 720, alternate embodiments are contemplated in which the carousal includes more or fewer such bagging locations 720.

The second turnabout 710 transports items 20 exiting the exit end 706 of the conveyance path 702 to an item staging or collection area 714 adjacent to the right side of the conveyance path 702 (with reference to the direction indicated by the arrows superimposed on the conveyance path 702) where items 20 to be purchased come to rest prior to being bagged by the customer or employee of the retail enterprise. Another conventional item bagging carousal 718 is positioned adjacent to the item staging or collection area 714. In one embodiment, the bagging carousal 718 is identical to the bagging carousal 716, although alternative embodiments are contemplated in which the bagging carousal 781 may be different from the bagging carousal 716 in structure and/or function.

In one embodiment, the turnabouts 708 and 710 each include an integral or attached rotating platform or belt that may be driven by a suitable drive mechanism under the control of the processor 300. Illustratively, the rotating platform or belt of the turnabout 708 is configured to rotate counterclockwise such that the items 20 exiting the exit end 706 of the conveyance path 702 are transported in counterclockwise fashion about the turnabout 708 as indicated by the arrows superimposed on the turnabout 708 in FIG. 7. The rotating platform or belt of the turnabout 710 is illustratively configured to rotate clockwise such that items 20 exiting the exit end 706 of the conveyance path 702 are transported in clockwise fashion about the turnabout 710 as indicated by the arrows superimposed on the turnabout 710 in FIG. 7. In alternative embodiments, either or both of the turnabouts 708 and 710 may be stationary, and in such embodiments the portions of the turnabouts 708, 710 that are in line with (i.e., along the longitudinal axis of the conveyance path 702), and proximate to, the exit end 706 of the conveyance path 702 are elevated above the portions proximate to the item entrance ends of the staging areas 712 and 714 such that the items 20 to be purchased are, in such embodiments, gravity fed from the exit end 706 of the conveyance path 702 to the staging areas 712, 714. The surfaces of the turnabouts 708, 710 in such embodiments may further include wheels or rollers to facilitate movement of items 20 between the conveyance path 702 and the staging areas 712, 714.

In one embodiment, the staging areas 712, 714 are illustratively stationary structures configured to support and store multiple items 20 to be purchased. In alternative embodiments, either or both of the staging areas 712, 714 may be movable or include one or more moving surfaces. In the illustrated embodiment, each of the staging areas 712, 714 includes an inner wall 738 which extends from a corresponding turnabout 708, 710 inwardly toward one side of the conveyance path 702, and a customer access wall 740 which extends from a corresponding carousal 716, 718 inwardly toward the conveyance path 702 and joins the inner wall 738 to form a customer access portion of the staging areas 712, 714. Illustratively, a customer payment interface 220, and optionally a produce scale 222 and/or a single item scanner 216, are positioned between the carousals 716, 718 and the conveyance path 702 proximate to the customer access portion of the staging area 712, 714. Such positioning the customer access portions of the staging areas 712, 714 and of the customer payment interfaces 220, illustratively promotes privacy of the customers and their selected items as such an arrangement positions the customers between the carousals 714, 716 and the conveyance path 702 when effecting payment for their selected items 20 and also when accessing and bagging their selected items 20. In alternate embodiments, either or both of the staging areas 712, 714 may be configured to locate the customer access portion at a different position than that just described. For example, one such alternate position of the customer access portion of the staging area 712 is shown in dashed-line form in FIG. 7, wherein an outer wall 738' and customer access wall 740' extend outwardly from the turnabout 708 and the carousal 716 such that the customer access area of the staging area 712 is located to the left or outside of the carousal 716, along with a customer payment interface 220 and optionally a produce scale 220 and a single item scanner 216. Such alternate positioning may alternatively or additionally be implemented with the staging area 714.

In the embodiment illustrated in FIG. 7, a privacy barrier 722 is attached to each side of the conveyance path 702 and extends from the entrance end 704 to the exit end 706. The turnabouts 708 and 710 likewise each include a privacy barrier 724 attached thereto such that they generally face the conveyance path 702. Such privacy barriers 722, 724 are optional, but may be included to provide customers with some amount of privacy in relation to the items 20 they have selected for purchase.

In some embodiments, the conveyance system 700 may include another conveyance path adjacent to the entrance end 706 of the conveyance path 702, and in the embodiment illustrated in FIG. 7 such a second conveyance path 730 is shown in dashed-line representation to indicate that not all embodiments of the conveyance system 700 may include the second conveyance path 730. In embodiments that include the second or auxiliary conveyance path 730, an item exit end 734 of this conveyance path 730 is positioned proximate to the item entrance end 704 of the main conveyance path 702, and an opposite item entrance end 732 of the auxiliary conveyance path 730 extends away in a direction opposite from the item entrance end 704 of the conveyance path 702. In one embodiment, the auxiliary conveyance path 730 may illustratively include privacy barriers 736 extending along each longitudinal side, and in alternate embodiments the privacy barriers 736 may be integral with the privacy barriers 722. Illustratively, the conveyance path 730 is provided in the form of a conventional belt driven about two parallel rollers positioned at its opposite ends 732, 734, although this disclosure contemplates alternate embodiments in which the auxiliary conveyance path 730 may take one or more other known forms. In any case, the item transport speed of the conveyance path 730, like the item transport speed of the conveyance path 702, is controlled by the processor 200.

The auxiliary conveyance path 730 may be provided for the purpose of creating separation between the items 20 being transported through or past the bulk item scanner 214 to thereby increase the likelihood that the items 20 will be successfully scanned. Such separation may be accomplished, for example, by controlling the item transports speeds of the conveyance paths 702 and 730 such that the item transport speed of the conveyance path 730 is slower than that of the conveyance path 702. As items grouped closely together on the slower conveyance path 730 reach the exit end 734, the transition of the items 20 onto the item entrance end 704 of the faster conveyance path 702 will create additional separation between the items 20. This feature is depicted graphically in FIG. 7 which shows several items 20 on each conveyance path 730 and 702, with those positioned on the slower conveyance path 730 being more closely grouped than those on the faster conveyance path 702.

The conveyance system 700 further includes at least one diverter gate positioned to divert items 20 to the left turnabout 708 or the right turnabout 710. In the embodiment illustrated in FIG. 7, one such diverter gate 750 is positioned adjacent to the item exit end 706 of the conveyance path 702, and is illustratively mounted at a pivot point 752 proximate to the area where the two turnabouts 708, 710 intersect. The diverter gate 750 is illustratively driven by a conventional motor or other suitable drive device, and the position of the diverter gate 750 is controlled by the processor 200 between the two positions illustrated in solid and dashed-line forms in FIG. 7. For example, when the processor 200 determines that the items 20 for a particular customer are to be channeled to the left turnabout 708 and staging area 712, the processor 200 controls the diverter gate 750 to the solid-line position illustrated in FIG. 7 so that items 20 exiting the exit end 706 of the conveyance path 702 are diverted toward the turnabout 708. Conversely, when the processor 200 determines that the items 20 for a particular customer are to be channeled to the right turnabout 710 and staging area 714, the processor 200 controls the diverter gate 750 to the dashed-line position illustrated in FIG. 7 so the items 20 exiting the exit end 706 of the conveyance path 702 are diverted toward the turnabout 710.

The conveyance system 700 may further include one or more additional diverter gates, and one such additional diverter gate 754 is shown positioned proximate to the staging area 714 with a pivot point 756 mounted at or near the intersection of the inner wall 738 of the staging area 714 and the turnabout 710. The diverter gate 754 is illustratively driven by a conventional motor or other suitable drive device, and the position of the diverter gate 754 is controlled by the processor 200 between the two positions illustrated in solid and dashed-line forms in FIG. 7. This additional diverter gate 754 may be implemented, for example, to controllably transfer items 20 from the turnabout 710 to the staging area 714. When, for example, the quantity of items 20 being purchased is sufficiently low, there is little chance that the staging area will be unable to accommodate all of the items 20, and in such cases the processor 200 controls the diverter gate 754 to the dashed-line position so that items 20 traveling around the turnabout 710 are diverted toward the staging area 714. Conversely, when the quantity of items 20 being purchased is sufficiently great, the items 20 may be fed by the turnabout 710 to the staging area 714 at a rate faster than the customer can bag them, and there is therefore a greater likelihood that the staging area 714 will be unable to accommodate all of the items 20. In such cases, the processor 200 controls the diverter gate 754 to the solid-line position so that items traveling around the turnabout 710, and items exiting the conveyance path 702, will continue to travel around the turnabout.

In embodiments that include the diverter gate 754, the conveyance system 700 will include one or more sensors to provide feedback to the processor 200 for controlling the position of the diverter gate 754. In one embodiment, for example, a proximity sensor 760 or other suitable sensor may be placed adjacent to the turnabout 710, and the processor 200 may monitor the signal produced by the proximity sensor 760 to control the position of the gate 754. When the signal produced by the proximity sensor 760 indicates that a sufficiently large number of items 20 are traveling around the turnabout, the processor 200 may control the gate 754 to the solid-line position, and may otherwise control the gate 754 to the dashed-line position. Alternatively or additionally, the staging area 714 may include a weight sensor 762 or other suitable sensor to produce a signal indicative of the weight of the items 20 supported by the staging area 714. When the signal produced by the weight sensor 762 indicates that a sufficiently large number of items 20 are positioned on the staging area 714, the processor 200 may control the gate 754 to the solid-line position, and may otherwise control the gate 754 to the dashed-line position. Alternatively or additionally still, the bagging carousal 718 may include a weight sensor 764 or other suitable sensor to produce a signal indicative of the weight of items 20 supported by the carousal 714. When the signal produced by the weight sensor 764 indicates that a sufficiently large number of items are supported by the bagging carousal 718, the processor 200 may control the gate 754 to the solid-line position, and ma otherwise control the gate 754 to the dashed-line position.

It will be understood that while an auxiliary gate 754 and sensors 760, 762, 764 are illustrated only on the right side of the conveyance system 700, i.e., only in relation to the turnabout 710 and staging area 714, another auxiliary gate 754 and sensors 760, 762, 764 may also be implemented on the left side of the conveyance system 700, i.e., in relation to the turnabout 708 and staging area 712.

Customers 10 generally enter the point-of-sale system 110 from the front of the conveyance system 700 as illustrated in FIG. 7. A monitor 314 is illustratively positioned adjacent to the item entrance end of the conveyance path 702 (or 730). A customer information scanner 316 may also be located adjacent to or integral with the monitor 314 so that the customer accessing the conveyance system 700 can enter customer identification information into the point-of-sale system 110, e.g., by swiping or reading a customer card 30 or other such customer identification mechanism. A produce scale 222 may also be positioned at or near the front end of the conveyance system 700 so that customers can weigh produce and look up any unknown produce using the monitor 314. A team member 50, e.g., an employee of the retail establishment, may be positioned at the point-of-sale system 110 to assist customers, handle exceptions, check customer identifications for alcohol purchases, and the like.

The processor 200 is configured to determine to which side the next customer's items 20 should be routed, i.e., to the turnabout 708 and staging area 712 or the turnabout 710 and staging area 714. Generally, if the point-of-sale system 110 has just processed a previous customer, that customer may still be bagging items or be otherwise still involved in the checkout process, and the processor 200 will therefore determine that the items 20 for the next, or current, customer 10 should be routed to the opposite side of the conveyance system 700. If the point-of-sale system 110 otherwise has not recently processed another customer, the side that the current customer's items 20 will be routed to may be arbitrary. In some embodiments, a proximity or photoelectric sensor 766 may be positioned on or adjacent to either of the customer payment interfaces 220, e.g., as shown on the customer payment interface on the right side of the conveyance system 700, to provide suitable feedback to the processor 200 of whether or not a customer is present at the interface 220. Such feedback will further aid the processor 200 in making the determination of which side of the conveyance system 700 will process the current customer. In any case, when the processor 200 has determined which turnabout/staging area to which the current customer's items 20 should be routed, the processor 200 illustratively controls the monitor 314 to display a graphic informing the customer where, e.g., which side, the customer's items will be routed, and the processor 200 further controls the diverter gate(s) 750 (and 754) to effectuate the determined item routing path.

After the processor 200 has determined where, e.g., which side, to route the customer's items 20 and has suitably notified the customer of this determination, the customer 10 then loads the items 20 selected from the retail establishment onto the conveyance path 702 (or 730), and the conveyance path 702 (and 730) transports the customer's items 20 through or past the bulk item scanner 214 which reads the price codes of each. The conveyance path 702 then continues to transport the scanned items 20 to the item exit end of the conveyance path 706 and, depending upon the position of the diverter gate 750, the scanned items will be diverted to the left turnabout 708 or the right turnabout 710. The turnabout 708, 710 will, in turn, route the scanned items to the staging area 712, 714 where the customer can then access and bag the items using the bagging carousel 716, 718 and effect payment for the items using the customer payment interface 220.

Three special case items 20 will be noted, as such items require processing by the conveyance system 700 somewhat differently than the ordinary items 20 just described. A first special case is an oversized item, e.g., item 20" illustrated in FIG. 7, that will not fit on the conveyance path 702 (or 730) or that cannot be lifted onto the conveyance path 702 (or 730). Price scanning of such items will generally require a single item price scanner 216 to be accessible by the customer 10, and FIG. 7 shows such scanners 716 positioned adjacent to the customer payment interfaces 220. Otherwise, price scanning of such oversized items may be carried out by the attendant 50. A second special case is an item 20' that, for whatever reason, cannot or should not be scanned by the bulk scanner 218 and should instead be scanned using a single item scanner 216. In such cases, a bin 770 may be made available that has an attached card or label 772 with a predetermined code 774 which, when scanned by the bulk item scanner 218, causes the bulk items scanner 218 to ignore the bin 70 and item 20'. A third special case is a delicate item 782, such as a greeting card or similar item, which may not be scanned by the bulk item scanner 218 if improperly oriented on the conveyance path 710 and/or which the customer may want to protect from the conveyance path 702 and/or other adjacent items 20. In such cases, a tray or similar such item 780 may be provided, and the item 782 may be placed in the tray 780 with the price code 784 of the item 782 oriented for proper scanning by the bulk item scanner 218.

It will be appreciated that while the conveyance system 700 illustrated in FIG. 7 includes two turnabouts/staging areas/bagging carousels, alternate embodiments of the conveyance system 700 may include more or fewer such turnabouts/staging areas/bagging carousels. In any such alternate embodiment including two or more turnabouts/staging areas/bagging carousels, it will be further appreciated that such turnabouts/staging areas/bagging carousels may, but need not, be positioned symmetrically about the conveyance system 700 or symmetrical with respect to either side of the conveyance system 700.

Figure 8:
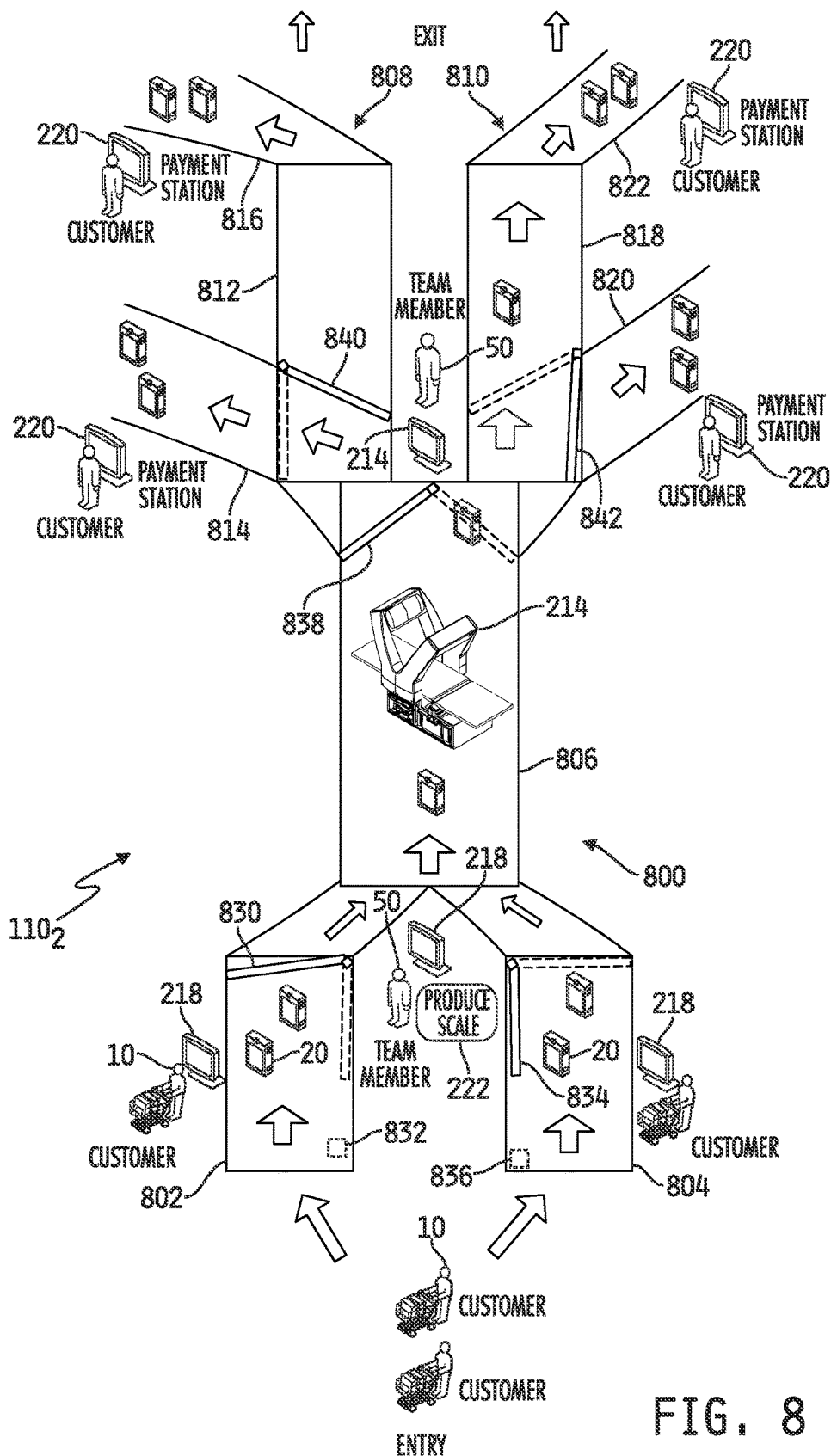
FIG. 8 is a simplified block diagram of another illustrative embodiment of a point-of-sale system of the type illustrated in FIGS. 1, 2 and 4.

Referring now to FIG. 8, a simplified block diagram is shown of another illustrative embodiment of a point-of-sale system $110_2$ of the type illustrated in FIGS. 1, 2 and 4. In the illustrated embodiment, the point-of-sale system $110_2$ includes many of the same features and components described above with respect to FIG. 7, and a detailed description of such like items will not be repeated here for brevity. In the embodiment illustrated in FIG. 8, a conveyance system 800 includes two customer entrance conveyance paths 802 and 804 which lead to a single conveyance path 806 which passes through or by the bulk item price scanner 214. Thereafter, the single conveyance path 806 splits into two separate conveyance paths 812 and 818. The conveyance path 812 is coupled to two separate item staging areas 814 and 816 comprising one dual-customer item access pod 808, and the conveyance path 818 is likewise coupled to two separate item staging areas 820 and 822 comprising another dual-customer item access pod 810. Diverter gates 830 and 834 are provided on the entrance conveyance paths 802 and 804 respectively, a single diverter gate 838 is provided at the end of the single conveyance path 806, and two additional diverter gates 840 and 842 are provided on the two separate conveyance paths 812 and 818 respectively. The processor 200 is configured to control the displays 218 positioned adjacent to each entrance conveyance path 802, 804 to inform the customer which staging area 814, 814 of the dual-customer item access pod 808, and which staging area 820, 822 of the dual-customer item access pod 810, the customer's items will be routed to. The processor 200 is also configured to control the gates, as generally described with respect to FIG. 7, to route the customer's items 20 to a suitable one of the item staging areas 814, 816, 820, 822. To route the left side customer to the staging area 814, for example, the processor 200 controls the diverter gate 830 to its dashed-line position, the diverter gate 838 to its dashed-line position and the diverter gate 840 to its solid line position. To route the right side customer to the staging area 822, as another example, the processor 200 controls the diverter gate 834 to its solid-line position, the diverter gate 838 to its solid-line position and the diverter gate 842 to its solid-line position. Each of the entrance conveyance paths 802 and 804 may include a weight sensor or other suitable sensor to notify the processor 200 when a customer 10 is loading items 20 onto the conveyance path 802, 804, e.g., to thereby determine whether a customer is present at the entrance conveyance path 802, 804. Alternatively, this function could be accomplished with, e.g., a proximity sensor or photoelectric sensor, to notify the processor 200 when the presence of a customer 10 is detected at the entrance conveyance path 802, 804.

Figure 9:
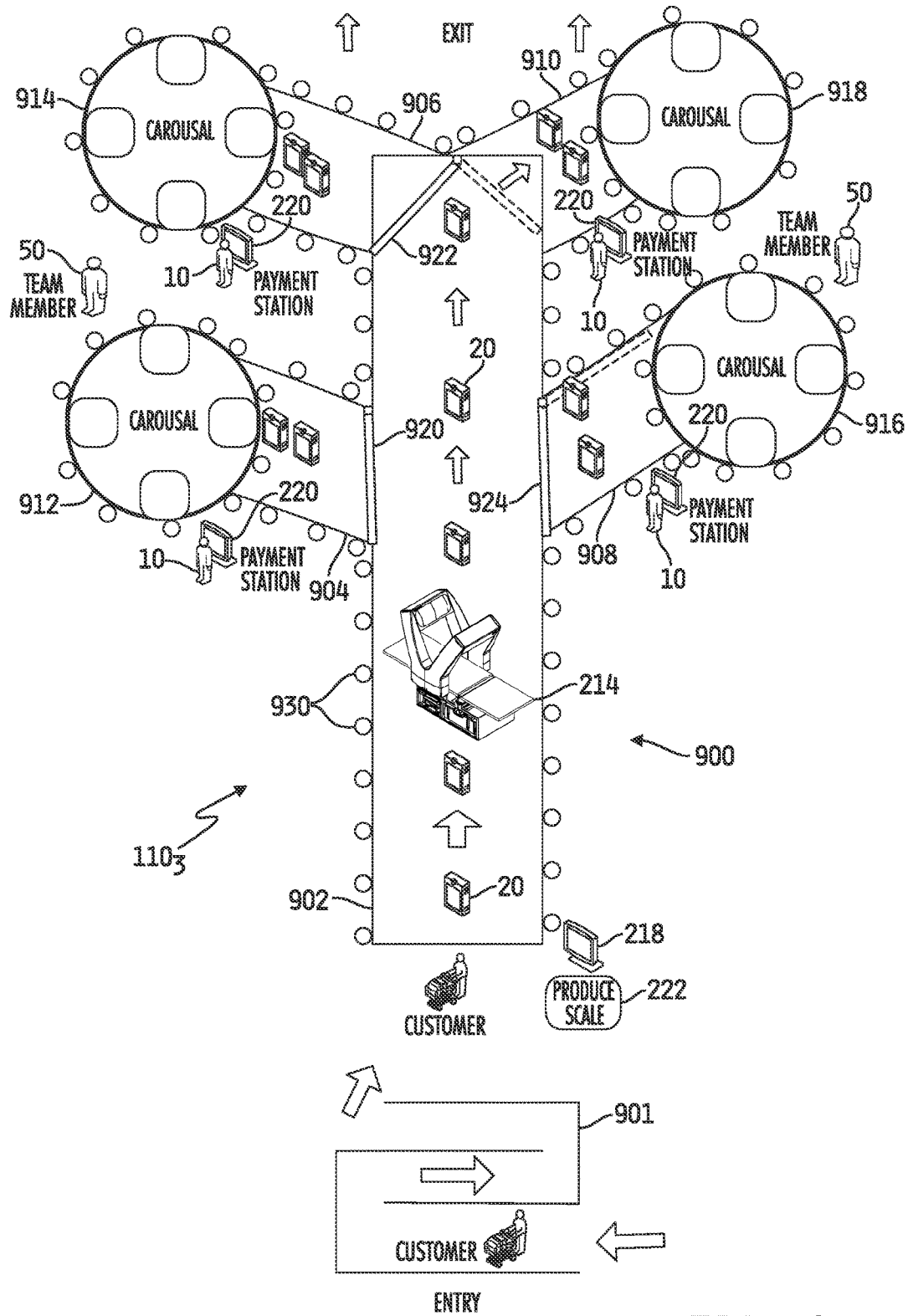
FIG. 9 is a simplified block diagram of yet another illustrative embodiment of a point-of-sale system of the type illustrated in FIGS. 1, 2 and 4.

Referring now to FIG. 9, a simplified block diagram is shown of yet another illustrative embodiment of a point-of-sale system $110_3$ of the type illustrated in FIGS. 1, 2 and 4.

In the illustrated embodiment, the point-of-sale system $110_3$ includes many of the same features and components described above with respect to FIGS. 7 and 8, and a detailed description of such like items will not be repeated here for brevity. In the embodiment illustrated in FIG. 9, a conveyance system 900 includes a customer queue 901 separate from the customer queue 402 illustrated and described with respect to FIG. 4. The customer queue 901 leads to a single, linear conveyance path 902 which passes through or by the bulk item price scanner 214, after which the conveyance path 902 is coupled on either side to two separate item staging areas 904, 906 and 908, 910. Bagging carousels 912, 914 are coupled to the staging areas 904, 906, and bagging carousels 916, 918 are coupled to the staging areas 908, 910. The conveyance system 900 further includes three diverter gates, one each, 920, 924, at the entrance to the item staging areas 904 and 908 respectively, and a third 922 at the entrances of both of the item staging areas 906 and 910.

The processor 200 is configured to control a display 218 positioned adjacent to the entrance of the conveyance path 902 to inform the customer which staging area 904, 906, 908, 910 the customer's items will be routed to. The processor 200 is also configured to control the diverter gates 920, 922 and 924, as generally described with respect to FIG. 7, to route the customer's items 20 to a suitable one of the item staging areas 904, 906, 908, 910. To route a customer to the staging area 910, for example, the processor 200 controls the diverter gate 920 to its solid-line position, the diverter gate 924 to its solid-line position and the diverter gate 920 to its solid-line position.

The conveyance system 900 may further include a series of lamps or other light sources 930 positioned around the perimeter of the system 900, e.g., along the sides of the conveyance path 902, along the sides of the item staging areas 904, 906, 908 and 910, and around each of the carousels 912, 914, 916 and 918. In one embodiment, the processor 200 is configured to control the activation, e.g., on/off or color change, of the lamps 930 to highlight trouble areas along the conveyance system 900. In alternative embodiments, the processor 200 may be configured to control the color, activation rate, activation pattern or the like of the light sources 930 in order to highlight for each customer the routing path of that customer's items 20 through the conveyance system 900.

Figure 10:
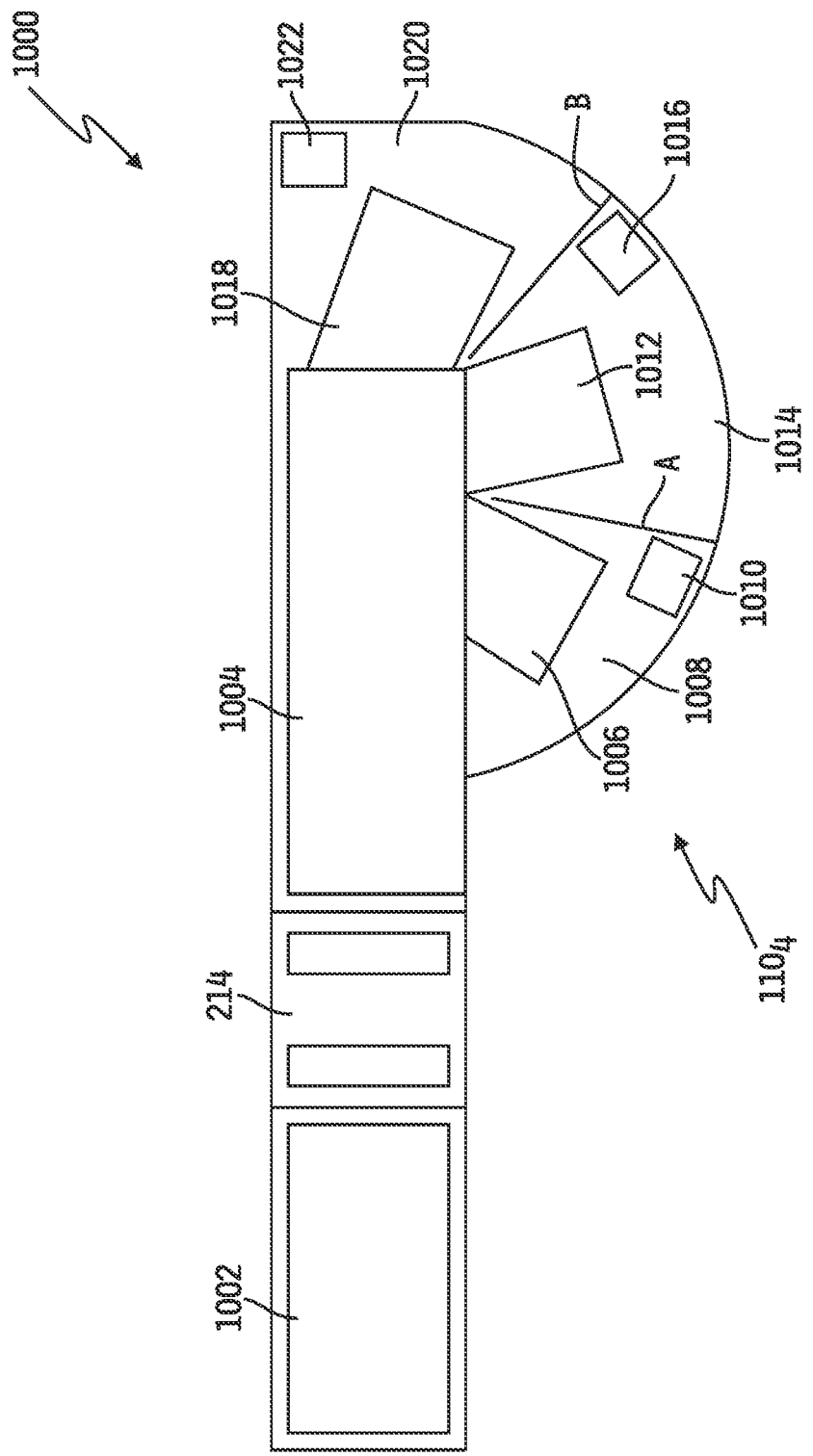
FIG. 10 is a simplified block diagram of still another illustrative embodiment of a point-of-sale system of the type illustrated in FIGS. 1, 2 and 4.

Referring now to FIG. 10, a simplified block diagram is shown of another illustrative embodiment of a point-of-sale system $110_4$ of the type illustrated in FIGS. 1, 2 and 4. In the illustrated embodiment, the point-of-sale system $110_4$ includes many of the same features and components described above with respect to FIG. 7, and a detailed description of such like items will not be repeated here for brevity. In the embodiment illustrated in FIG. 10, a conveyance system 1000 includes an input conveyance path 1002 which passes through or by the bulk item price scanner 214. Thereafter, an output conveyance path 1004 is coupled to multiple conveyance paths for carrying scanned items to one of multiple corresponding bagging areas, one of which is positioned at the end of the conveyance path 1000, i.e., generally in line with a longitudinal axis of the conveyance paths 1002 and 1004, and the remainder are positioned along one side of the point-of-sale system $110_4$. In the illustrated embodiment, three such conveyance paths 1006, 1012 and 1018 are shown, each of which carry scanned items to a corresponding bagging or staging area 1008, 1014 and 1020 respectively. Although not illustrated in FIG. 10 for brevity, it will be understood that a number of diverter gates will be positioned at or near the interfaces of the output conveyance path 1004 and the conveyance paths 1006, 1012 and 1018 to direct and guide scanned items to appropriate ones of the bagging or staging areas 1008, 1014 and 1020 respectively, as described in detail hereinabove. In some embodiments, the input conveyance path 1002 is separate from the output conveyance path 1004, and in other embodiments the conveyance paths 1002 and 1004 may be combined in to a single conveyance path.

The bagging or staging areas 1008 and 1014 are illustratively separated by a partition or divider A, and the bagging or staging areas 1014 and 1020 are illustratively separated by a partition or divider B. In the embodiment illustrated in FIG. 10, each of the bagging or staging areas includes a dedicated payment station. Thus, for example, the bagging or staging area 1008 has a dedicated payment station 1010, the bagging or staging area 1014 has a dedicated payment station 1014 and the bagging or staging area 1020 has a dedicated payment station 1022.

Figure 11:
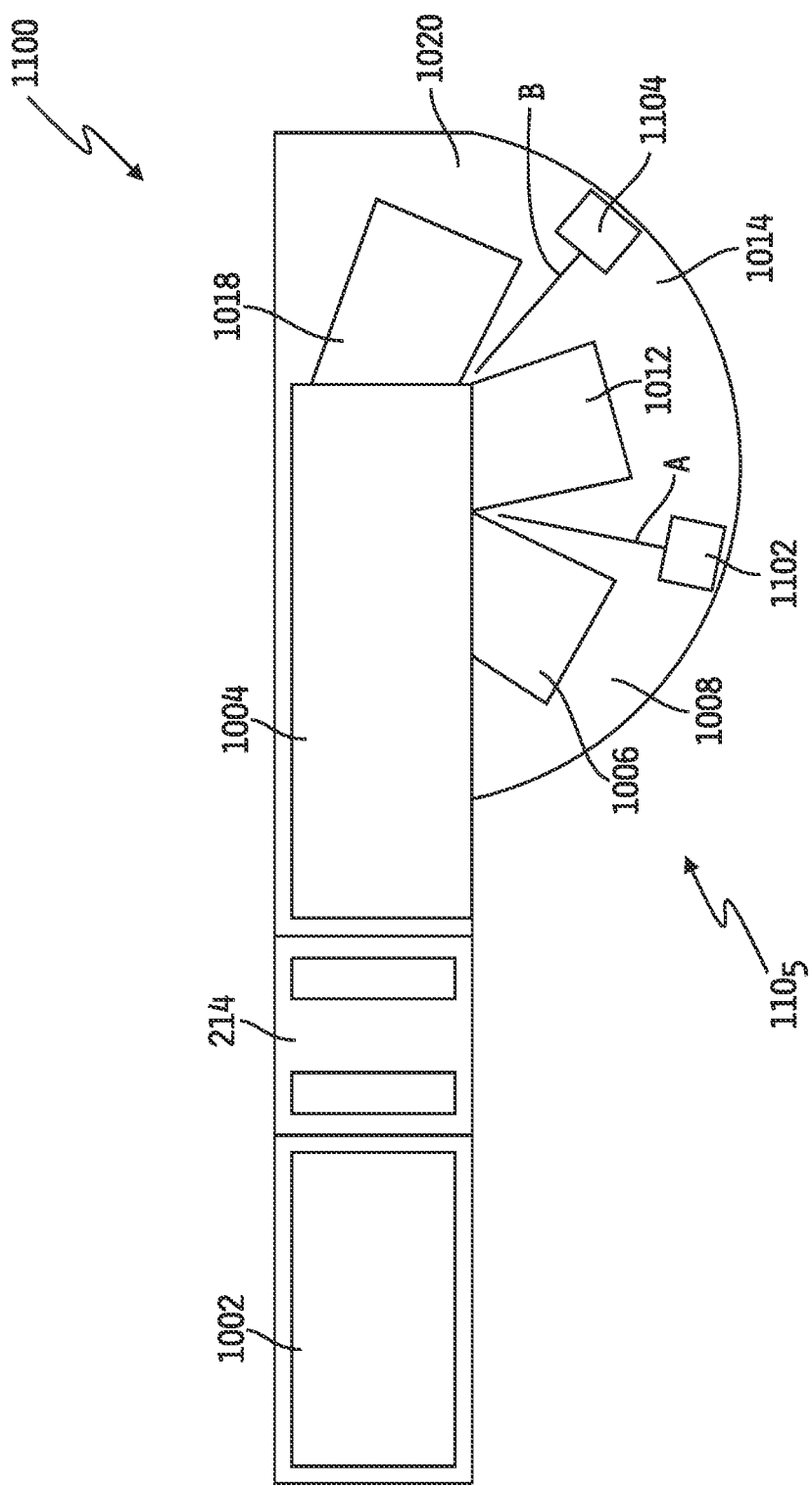
FIG. 11 is a simplified block diagram of a further illustrative embodiment of a point-of-sale system of the type illustrated in FIGS. 1, 2 and 4.

Referring now to FIG. 11, a simplified block diagram is shown of another illustrative embodiment of a point-of-sale system $110_5$ of the type illustrated in FIGS. 1, 2 and 4. In the illustrated embodiment, the point-of-sale system $110_5$ includes many of the same features and components described above with respect to FIG. 7, and a detailed description of such like items will not be repeated here for brevity. The point-of-sale system $110_5$ also includes many of the same features and components described above with respect to FIG. 10, and like features and components are therefore identified with like reference numbers. A detailed description of these like features and components will not be repeated here for brevity.

In the embodiment illustrated in FIG. 11, a conveyance system 1100 includes the bulk item prices scanner 214, the input conveyance paths 1002, 1004, 1006, 1012 and 1018 illustrated and described above with respect to FIG. 10, and also includes the bagging or staging areas 1008, 1014 and 1020, illustratively separated by partitions or dividers A and B, all as described above with respect to FIG. 10. The conveyance system 1100 differs from the conveyance system 1000 primarily in the shared positioning of the payment stations. In the embodiment illustrated in FIG. 11, for example, a shared payment station 1102 is positioned on, along or integrated into, the partition A such that the payment station 1102 may be used by customers accessing items in either of the bagging or staging areas 1008 and 1014. Likewise, a shared payment station 1104 is positioned on, along or integrated into, the partition B such that the payment station 1102 may be used by customers accessing items in either of the bagging or staging areas 1014 and 1020. In embodiments which do not include partition A and/or partition B, the shared payment stations 1102 and 1104 may be suitably mounted between adjacent bagging or staging areas.

Figure 12:
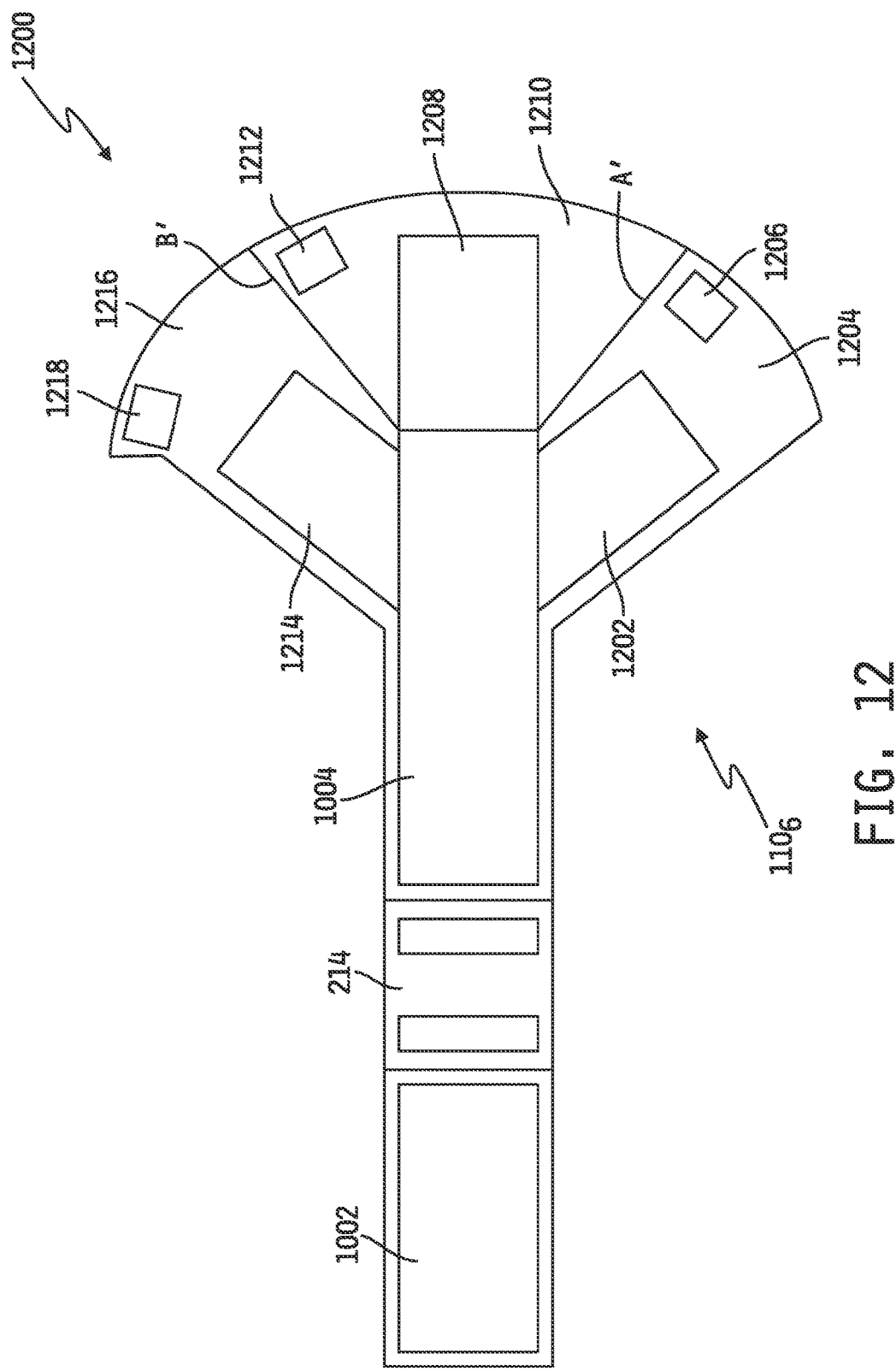
FIG. 12 is a simplified block diagram of yet a further illustrative embodiment of a point-of-sale system of the type illustrated in FIGS. 1, 2 and 4.

Referring now to FIG. 12, a simplified block diagram is shown of another illustrative embodiment of a point-of-sale system $110_6$ of the type illustrated in FIGS. 1, 2 and 4. In the illustrated embodiment, the point-of-sale system $110_6$ includes many of the same features and components described above with respect to FIG. 7, and a detailed description of such like items will not be repeated here for brevity. The point-of-sale system $110_6$ also includes many of the same features and components described above with respect to FIG. 10, and like features and components are therefore identified with like reference numbers. A detailed description of these like features and components will not be repeated here for brevity.

In the embodiment illustrated in FIG. 12, a conveyance system 1200 includes the input conveyance paths 1002 and 1004, and the bulk item price scanner 214, and, as with the conveyance systems 1000 and 1100, the output conveyance path 1004 is coupled to multiple conveyance paths for carrying scanned items to one of multiple corresponding bagging areas. The positioning of the multiple conveyance paths differs from that illustrated in FIGS. 10 and 11, and in the embodiment illustrated in FIG. 12 one such conveyance path is positioned at the end of the conveyance path 1200, i.e., generally in line with a longitudinal axis of the conveyance paths 1002 and 1004, and the remainder are distributed about this conveyance path on either side of the point-of-sale system $110_6$. In the illustrated embodiment, three such conveyance paths 1202, 1208 and 1214 are shown, each of which carry scanned items to a corresponding bagging or staging area 1204, 1210 and 1216 respectively. Although not illustrated in FIG. 12 for brevity, it will be understood that a number of diverter gates will be positioned at or near the interfaces of the output conveyance path 1004 and the conveyance paths 1202, 1208 and 1214 to direct and guide scanned items to appropriate ones of the bagging or staging areas 1204, 1210 and 1216 respectively, as described in detail hereinabove.

The bagging or staging areas 1204 and 1210 are illustratively separated by a partition or divider A', and the bagging or staging areas 1210 and 1216 are illustratively separated by a partition or divider B'. In the embodiment illustrated in FIG. 12, each of the bagging or staging areas includes a dedicated payment station. Thus, for example, the bagging or staging area 1204 has a dedicated payment station 1206, the bagging or staging area 1210 has a dedicated payment station 1212 and the bagging or staging area 1216 has a dedicated payment station 1218.

Figure 13:
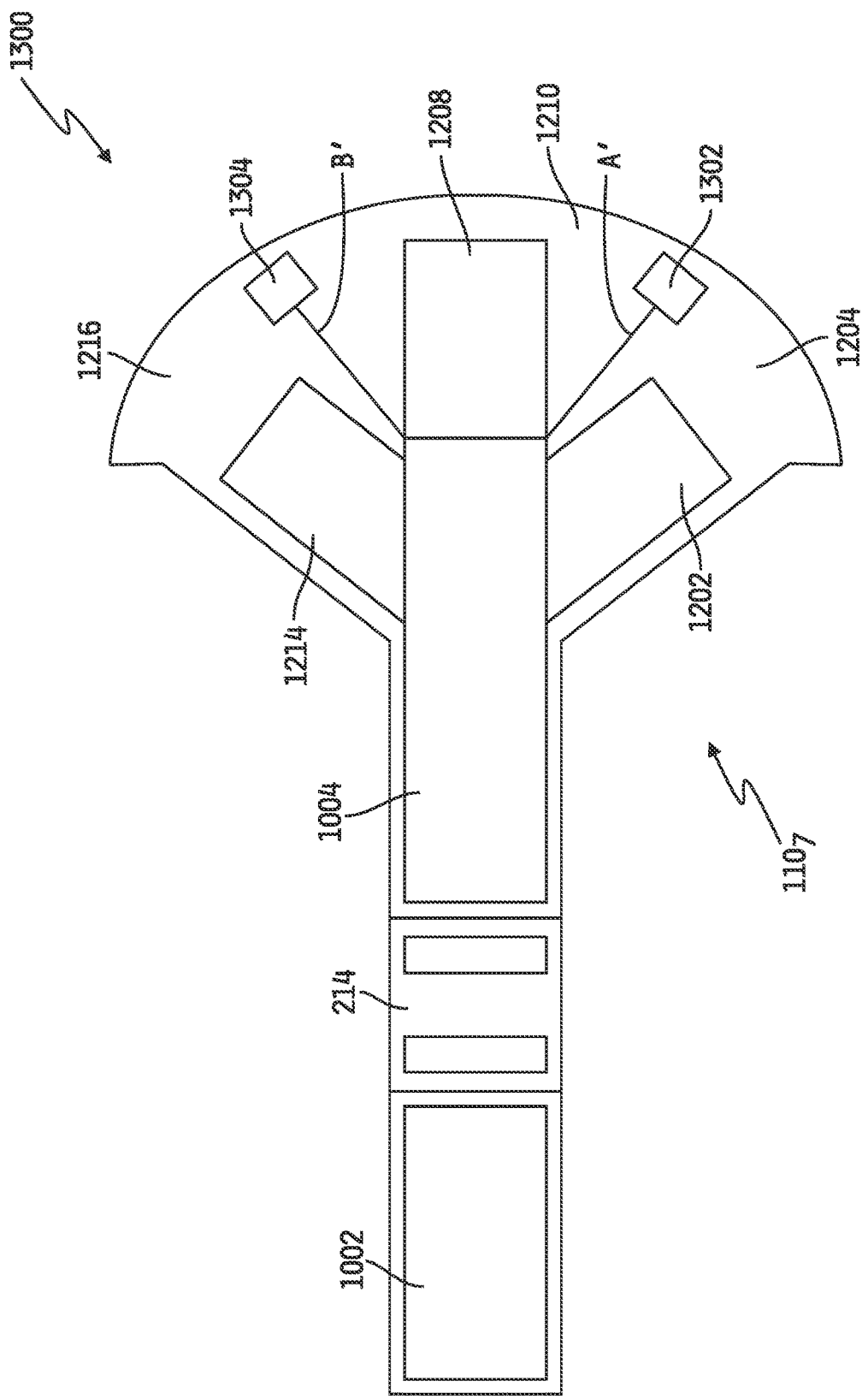
FIG. 13 is a simplified block diagram of still a further illustrative embodiment of a point-of-sale system of the type illustrated in FIGS. 1, 2 and 4.

Referring now to FIG. 13, a simplified block diagram is shown of another illustrative embodiment of a point-of-sale system $110_7$ of the type illustrated in FIGS. 1, 2 and 4. In the illustrated embodiment, the point-of-sale system $110_7$ includes many of the same features and components described above with respect to FIG. 7, and a detailed description of such like items will not be repeated here for brevity. The point-of-sale system $110_7$ also includes many of the same features and components described above with respect to FIG. 12, and like features and components are therefore identified with like reference numbers. A detailed description of these like features and components will not be repeated here for brevity.

In the embodiment illustrated in FIG. 13, a conveyance system 1300 includes the bulk item prices scanner 214, the input conveyance paths 1002, 1004, 1202, 1208 and 1214 illustrated and described above with respect to FIG. 12, and also includes the bagging or staging areas 1204, 1210 and 1216, illustratively separated by partitions or dividers A' and B', all as described above with respect to FIG. 12. The conveyance system 1300 differs from the conveyance system 1200 primarily in the shared positioning of the payment stations. In the embodiment illustrated in FIG. 13, for example, a shared payment station 1302 is positioned on, along or integrated into, the partition A' such that the payment station 1302 may be used by customers accessing items in either of the bagging or staging areas 1204 and 1210. Likewise, a shared payment station 1304 is positioned on, along or integrated into, the partition B' such that the payment station 1304 may be used by customers accessing items in either of the bagging or staging areas 1210 and 1216. In embodiments which do not include partition A' and/or partition B', the shared payment stations 1302 and 1304 may be suitably mounted between adjacent bagging or staging areas.

Generally, this disclosure contemplates embodiments of conveyance systems including the bulk item price scanner 214, or similar such high-speed item price determination system or device, which include N payment stations and M item bagging or staging locations, where N and M may be any positive integer and where N M. Some examples have been illustrated and described herein in which each of multiple bagging or staging areas includes a dedicated payment station, and other examples have been illustrated and described herein in which adjacent bagging or staging areas may share a payment station. Although not specifically illustrated in the attached drawings, this disclosure further contemplates embodiments in which a single payment station may be shared by more than two bagging or staging areas, and/or in which a payment station may not be co-located at one or more bagging or staging areas.

Figure 14:
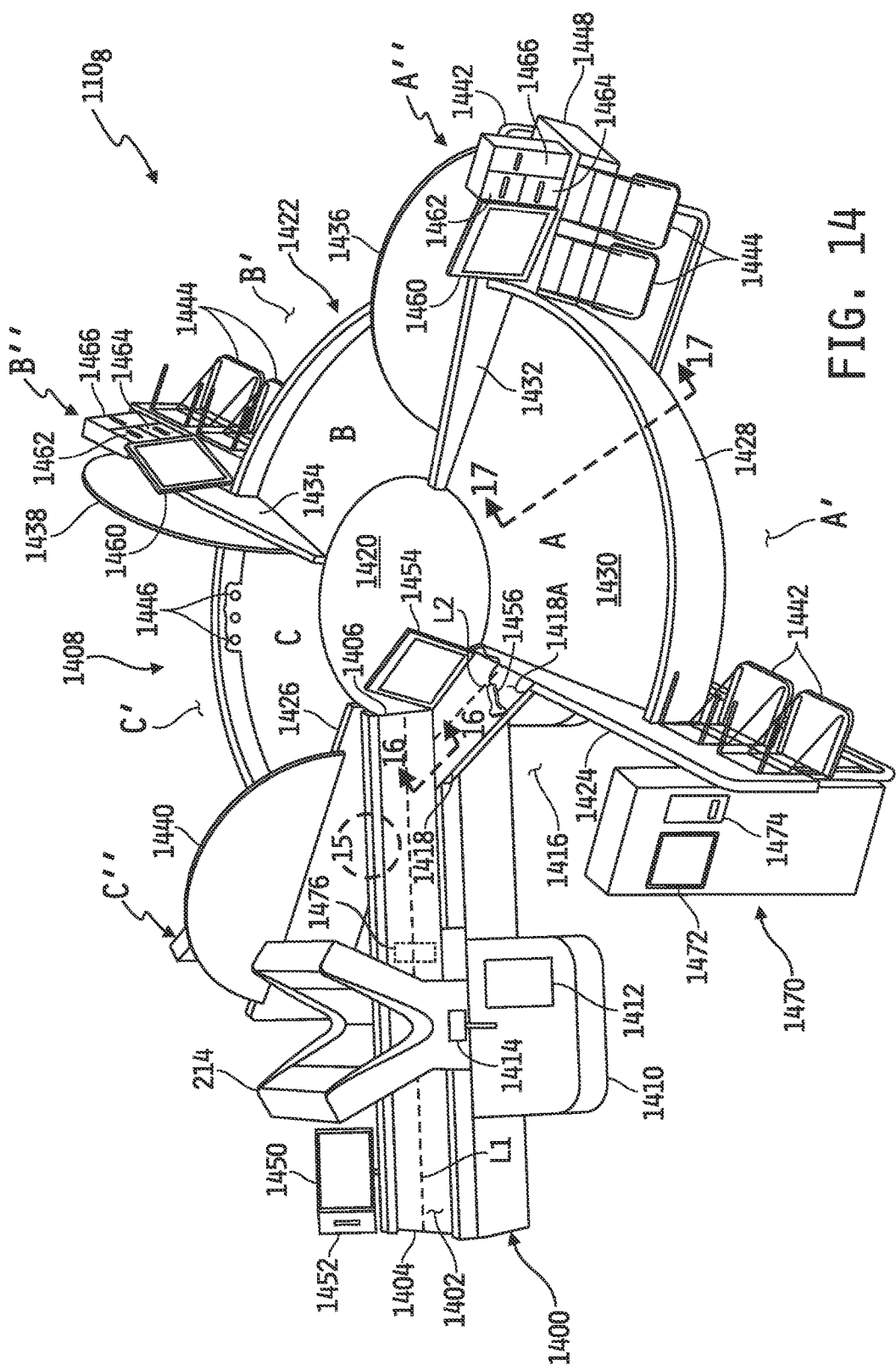
FIG. 14 is a simplified block diagram of yet another illustrative embodiment of a point-of-sale system of the type illustrated in FIGS. 1, 2 and 4.

Referring now to FIG. 14, a simplified diagram is shown of another embodiment of a system $110_8$ for processing customers through a point-of-sale system having a multiple-item price scanning apparatus. In the illustrated embodiment, the point-of-sale system $110_8$ includes many of the same features and components described above with respect to FIGS. 7-13, and a detailed description of some such like items may not be repeated here for brevity. It will be understood that any one or more features and/or components and/or combinations thereof illustrated in any of FIGS. 1-13 and described hereinabove may be implemented in the system $110_8$ illustrated in FIG. 14 regardless of whether explicitly stated in the above or following description, and any one or more features and/or components and or combinations thereof illustrated in any of FIGS. 14-27 may be implemented in any of the systems illustrated in any of FIGS. 1-13 regardless of whether explicitly stated in the above or following description.

In the embodiment illustrated in FIG. 14, a conveyance system 1400 includes a linear conveyance path 1402 having an item inlet end 1404 and an opposite item outlet end 1406, and the linear conveyance path 1402 is illustratively driven by one or more actuators 228, e.g., motors (see FIG. 2) to move linearly from the item inlet end 1404 toward the item outlet end 1406. The conveyance path 1402 passes through or by the multiple-item price scanner 214 which is attached or mounted to the conveyance system 1400. The item outlet end 1406 of the conveyance path is coupled to an item collection station 1408 which, in the illustrated embodiment, is partitioned into three separate but sequentially arranged item collection areas A, B and C. It will be understood, however, that the item collection structure may alternatively be partitioned into more or fewer item collection areas and/or may be arranged such that one or more of the item collection areas is not sequentially arranged relative to others of the item collection areas.

A shelf 1410 is mounted to one side wall of the conveyance system 1400 adjacent to the multiple-item price scanner 214, and the shelf 1410 illustratively carries a conventional produce scale 1412 and a conventional graphic display 1414 which displays weights of items being weighed on the produce scale 1412. Illustratively, the produce scale 1412 is positioned along a side of the shelf 1410 that is proximate to an attendant area 1416 positioned adjacent to one side of the conveyance path 1402 generally between the multiple-item price scanner 214 and the item exit end 1406 of the conveyance path 1402. One side of an attendant shelf 1418 is mounted to one sidewall of the conveyance system 1400 and another side is mounted to another wall 1424 which defines one terminal end of the item collection area A. A diverter or routing apparatus 1420 couples the item exit end 1406 of the conveyance path 1402 to the item collection station 1408, and the diverter or routing apparatus 1420 is operable to route or transport items from the conveyance path 1402 to designated ones of the item collection areas A, B and C. The diverter or routing apparatus 1420 may be or include any one or combination of diverting and/or routing apparatuses described hereinabove, and examples include, but are not limited to, one or more diverters, one or more rotatable turnabouts, one or more linear conveyance paths, or the like.

The item collection station 1408 illustratively includes an item collection structure 1422 partitioned into multiple item collection areas, e.g., three such item collection areas A, B and C illustrated in FIG. 14, and the item collection station 1408 defines multiple corresponding item bagging areas adjacent to the item collection structure 1422, e.g., three such item bagging areas A', B' and C' illustrated in FIG. 14. In the illustrated embodiment, a dedicated customer payment interface A", B" and C" is positioned at each of the respective item collection areas A, B and C adjacent to the respectively item bagging areas A', B' and C'.

Generally, a customer of the retail establishment in which the system $110_8$ is installed loads items to be purchased onto the conveyance path 1402 at the entrance end 1404 thereof. The conveyance path 1402 then linearly transports the items to be purchased from the item entrance end 1404 toward the item exit end 1406, and multiple items grouped together are substantially simultaneously scanned by the multiple-item price scanner 214 as the conveyance path 1402 transports the multiple items thereby. Items reaching the exit end 1406 of the conveyance path 1402 are then selectively routed by the diverter or routing apparatus 1420 to a designated one of the collection areas A, B or C of the item collection station 1408. Customers may effectuate payment of the purchased items via the customer payment interface located at the designated item collection area, e.g., customer payment interface A" located at item collection area A, and may collect and bag items routed to the designated item collection area via the associated bagging area, e.g., A', B' or C'.

An end wall 1424 defines and bounds one terminal end of one the item collection areas, e.g., item collection area A, and another end wall 1426 defines an bounds one terminal end of another one of the item collection areas, e.g., item collection area C. Yet another wall 1428 defines a continuous front wall of the item collection structure 1422 which extends about each of the item collection areas A, B and C, and an inclined item support surface 1430 extends about the item collection structure 1422 between the walls 1424, 1426, 1428 and the diverting or routing apparatus 1420. The item support surface 1430 is partitioned between the two end walls 1424, 1426 by a number of spaced-apart divider walls, and in the embodiment illustrated in FIG. 14 two such divider walls 1432 and 1434 are spaced equi-distant about the item collection structure 1422 to define the three sequentially positioned item collection areas A, B and C. The item support surface 1430 within each item collection area A, B and C slopes generally downwardly from the diverter or routing apparatus 1420 toward the front wall 1428.

In the illustrated embodiment, privacy panels are positioned between and extend above adjacent ones of the item collection areas A, B and C, and each such panel is configured to at least partially obscure visibility between adjacent item collection areas A, B and C and between adjacent bagging areas A', B' and C'. For example, a privacy panel 1436 is mounted to the divider wall 1432 and extends upwardly above the divider wall 1432 to obscure visibility between the adjacent item collection areas A and B, and also between the adjacent bagging areas A' and B'. Another privacy panel 1438 is mounted to the divider wall 1434 and extends upwardly above the divider wall 1434 to obscure visibility between the adjacent item collection areas B and C, and also between the adjacent bagging areas B' and C'. In the illustrated embodiment, the end wall 1426 is positioned adjacent to the conveyance path 1402, and in this embodiment yet another privacy panel 1440 is mounted to the end wall 1426 and extends upwardly above the end wall 1426 to obscure visibility between the item collection area C and the environment about the conveyance path 1402, and also between the environment about the conveyance path 1402 and the bagging area C'. The end wall 1424 is, in the illustrated embodiment, separated from the conveyance path 1402 by the attendant area 1416, and in this embodiment the end wall 1424 does not have a privacy panel mounted thereto although in alternate embodiments a privacy panel could be mounted to and extend upwardly above the end wall 1424 to obscure visibility between the item collection area A and/or bagging area A' and either or both of the attendant area 1416 and the environment about the conveyance path 1402. In any case, the privacy panels 1436, 1438, 1440 are, in one embodiment formed of a dark-colored, translucent material such as a thermoplastic or other polymer, and in alternate embodiments the privacy panels 1436, 1438, 1440 may be formed of any rigid, semi-rigid and/or flexible material of any color that is at least partially translucent or opaque and that may further have one or more desirable properties such as sound and/or light filtering, deflection or absorption.

Each of the bagging areas A', B' and C' includes a number of bagging stands each including at least one bag support structure configured to carry a plurality of item transport bags, e.g., paper and/or plastic grocery bags or the like. In the illustrated embodiment, for example, each bagging area A', B', and C' includes two conventional bagging stands 1442 and 1444 each mounted to opposing ones of the end and/or dividing walls within the corresponding bagging area A', B' and C' with each bagging stand 1442, 1444 configured to carry two different sets of item transport bags. Thus, in bagging area A', for example, a bagging stand 1442 configured to carry two different sets of bags is mounted to an inner surface of the end wall 1424 such that the bagging stand 1442 faces the bagging area A', and another bagging stand 1444 also configured to carry two different sets of bags is mounted to a table or shelf 1448 that forms part of or is mounted to the divider wall 1432 such that the bagging stand 1444 also faces the bagging area A'. It will be understood that the system $110_8$ may be alternately configured to include more, fewer and/or differently located bagging stands at any one or more of the bagging areas A', B' or C'.

Figure 15:
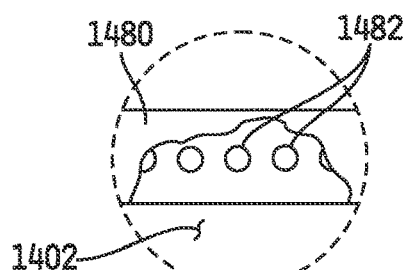
FIG. 15 is a magnified and partial cutaway view of the portion M of the conveyance unit illustrated in FIG. 14.

As shown by partial cutaway in FIG. 15, the front wall 1428 illustratively has a series of spaced-apart light sources 1446 mounted thereto which extend at least partially across each of the item collection areas A, B and C. In one embodiment, the light sources 1446 illuminate with a different color at each item collection area A, B and C, although in other embodiments the light sources 1446 could be made distinguishable between item collection areas A, B and C by switching the light sources on and off with different switching patterns. In any case, the light sources 1446 are, in one embodiment, light emitting diodes, although one or more other conventional light sources may be used in alternate embodiments.

The system $110_8$ further includes various electronic devices via which customers and attendants, i.e., employees of the retail enterprise, may interface with and control operation of one or more features of the system $110_8$. For example, the system $110_8$ illustratively includes a customer display monitor 1450 located at or adjacent to the item entrance end of the conveyance path 1402, and may further include a magnetic card reader or other card reader 1452 adjacent to the monitor 1450 via which customers can enter coupon club membership identification codes or other savings or incentive membership identification codes. The system $110_8$ further includes an attendant display monitor 1454 located at the attendant area 1416, e.g., on or extending above the attendant shelf 1418, and a hand-held price scanner 1456 also located at the attendant area 1416, e.g., also on or accessible at the attendant shelf 1418. The system $110_8$ further includes a plurality of customer payment interfaces, e.g., A", B" and C", each positioned at a different one of the item collection areas, e.g., A, B and C, and each configured to process customer payment for purchase of items routed only to that collection area. Thus, for example, the customer payment interface A" is dedicated for use strictly by customers having their price scanned items routed by the system $110_8$ to item collection area A, the customer payment interface B" is dedicated for used strictly by customers having their price scanned items routed by the system $110_8$ to item collection area B, and so forth. In the illustrated embodiment, each such customer payment interface includes a display monitor 1460, a payment card reader, e.g., a credit or debit card reader, 1462, a receipt printer 1464 and a coupon printer 1466, and such components may be mounted to or integral with the table or shelf 1448 forming part of or mounted to the walls 1432, 1434 and 1426. Cash paying customers, in the illustrated embodiment, are directed to a common cash payment station 1470 positioned adjacent to the end wall 1424 and the attendant area 1416. The cash payment station 1470 illustratively includes a display monitor 1472 and a cash processing module 1474.

In some embodiments, the conveyance system 1400 may include a magnetic, inductive, radio frequency or other sensor 1476 mounted beneath the conveyance path 1402 or mounted to or within a side wall of the conveyance system 1400, for the purpose of detecting items having a corresponding magnetic, metallic or radio frequency device or tag such as a security device, examples of which may include, but are not limited to spirit caps, spider wraps, keeper cases and the like.

Referring now to FIG. 15, a magnified view is shown of the portion of the conveyance system 1400 surrounded by the dashed-line circle 15. In the illustrated embodiment, the conveyance system 1400 includes a side wall 1480 to which the conveyance path 1402 is operatively mounted, and a portion of the side wall 1480 illustratively extends upwardly above the conveyance path 1402 as shown. A series of spaced-apart light sources 1482 are mounted to and along the portion of the side wall 1480 that extends upwardly above the conveyance path 1402. In one embodiment, the series of spaced-apart light sources 1482 extend along the upwardly extending portion of the side wall 1480 from the multiple-item price scanner 214 to the item exit end 1406 of the conveyance path, although in alternate embodiments the light sources 1482 may extend a greater or lesser distance. The side of the conveyance system 1400 opposite the side wall 1480 illustratively includes an identical side wall as shown in FIGS. 14 and 16A-16C, and in some embodiments another series of spaced-apart light sources 1482 are mounted to and along the portion of this side wall identically as just described with respect to the side wall 1482. In one embodiment, the light sources 1482 illuminate with a identical color on each side of the conveyance path 1402, in embodiments that include the light sources 1482 on both sides of the conveyance path 1402, although in alternate embodiments the light sources 1482 may illuminate with different colors on each side of the conveyance path 1402. In any case, the light sources 1482 are, in one embodiment, light emitting diodes, although one or more other conventional light sources may be used in alternate embodiments. As will be described in greater detail hereinafter with respect to FIG. 24, the light sources 1482 are illustratively controlled to illuminate in a manner that tracks movement of and therefore facilitates identification of items moving along the conveyance path 1402 that have been designated as so-called "exceptions." Broadly defined, an "exception" or "exception item" is an item being transported for purchase along the conveyance path 1402 which requires intervention and processing in some form by a retail enterprise attendant. Some examples of "exceptions," which should not be considered to be limiting in any way, will be provided below.

Figure 16A:
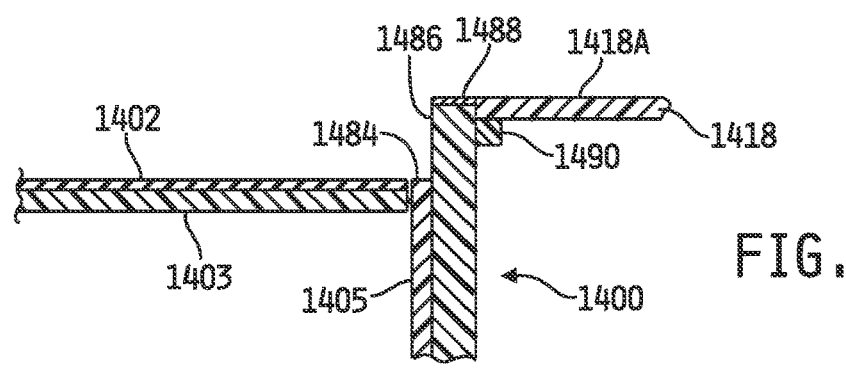
FIG. 16A is a cross-sectional view along section lines 16-16 of FIG. 14 illustrating an embodiment of a connection of the sweep shelf to the main conveyance unit.

Referring again to FIG. 14, the attendant shelf 1418 is illustratively configured to facilitate the processing of exceptions by the attendant. In particular, the attendant shelf 1418 is illustratively mounted to the conveyance path system 1400 in a manner that facilitates and promotes "sweeping" of exception items from the conveyance path onto the surface of the shelf 1418A for processing by the attendant. Referring now to FIG. 16A, a cross-section of a portion of the conveyance system 1400, shelf 1418 and mounting interface therebetween is shown as viewed along section lines 16-16. In the illustrated embodiment, the conveyance path 1402 rides upon and over a conveyance path support 1403 that is coupled at two or more points to a frame 1405 of the conveyance system 1400. A top surface 1484 of the frame 1405 is illustratively planar, as is the top, i.e., item-supporting, surface of the conveyance path 1402, and in the embodiment illustrated in FIG. 16A the top surface 1484 of the frame 1405 and the top surface of the conveyance path 1402 are co-planar, i.e., the two surfaces are level with each other. A conveyance path support structure 1486 is mounted to the frame 1405 such that the conveyance path 1402 is operatively mounted to the conveyance path support structure 1486. A top surface 1488 of the conveyance path support structure extends upwardly above the co-planar surfaces of the conveyance path 1402 and the frame 1405, and defines a planar shelf mating surface that is substantially parallel with co-planar surfaces of the conveyance path 1402 and the frame 1405 and that generally extends along one side of the conveyance path 1402 somewhere between the multiple-item scanner 214 and the item exit end 1406 of the conveyance path 1402. The shelf mating surface 1488 thus forms a step between the top surface of the conveyance path 1402 and the shelf mating surface 1488. The "sweep" shelf 1418 is mounted to the conveyance path support structure 1486, e.g., via one or more shelf supports 1490, with the top surface 1418A of the shelf 1418 abutting and co-planar with the shelf mating surface 1488 of the conveyance path support structure 1486 such that the shelf mating surface 1488 of the conveyance path support structure 1486 and the top surface 1418A of the sweep shelf 1418 together form a substantially continuous planar surface as shown in FIG. 16A.

As illustrated in FIG. 14, the conveyance path 1402 defines a longitudinal axis, L1, therethrough, and the shelf 1418 includes two opposing ends terminating at two opposing sides, and the shelf 1418 defines another longitudinal axis, L2, between the two opposing ends. As further illustrated in FIG. 14, the longitudinal axis, L2, of the shelf 1418 intersects the longitudinal axis, L1, of the conveyance path 1402 to form an acute angle therebetween when one of the ends of the shelf 1418 is mounted to the conveyance path support structure 1486. This mounting arrangement illustratively orients the shelf 1418 relative to the conveyance path 1402 to facilitate and promote manual "sweeping" of exception items from the item support surface of the conveyance path 1402 onto the top surface 1418A of the sweep shelf 1418 for processing by the attendant.

Figure 16B:
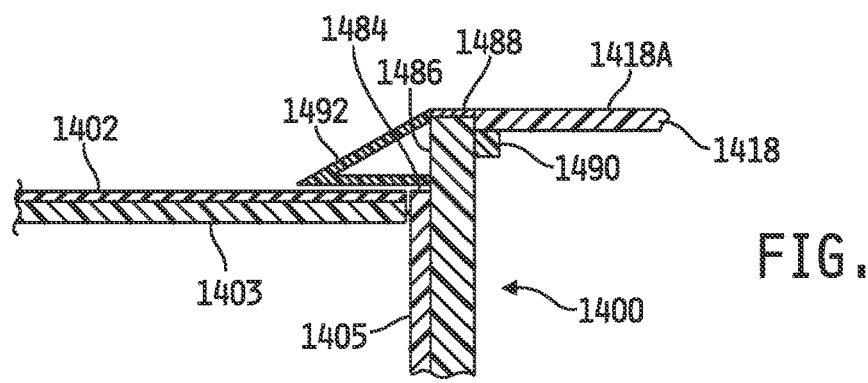
FIG. 16B is a cross-sectional view along section lines 16-16 of FIG. 14 illustrating an alternate embodiment of a connection of the sweep shelf to the main conveyance unit.

Referring to FIG. 16B, an alternate embodiment is shown in which a ramp 1492 is mounted to an inner surface of the conveyance path support structure 1486. The ramp 1492 illustratively has an inclined surface that extends from, and abuts, the shelf mating surface 1488 of the conveyance path support structure 1486 downwardly toward the planar, item support surface of the conveyance path 1402. In the illustrated embodiment, the inclined surface extends downwardly to, but does not contact, the item support surface of the conveyance path 1402, although in alternate embodiments the ramp may include wheels, rollers or the like which contact, and move with, the conveyance path 1402. The inclined ramp surface of the ramp 1492 is illustratively shown in FIG. 16B as having a linear slope or profile, although the inclined ramp surface of the ramp 1492 may alternatively be formed to have a non-linear slope or profile.

Figure 16C:
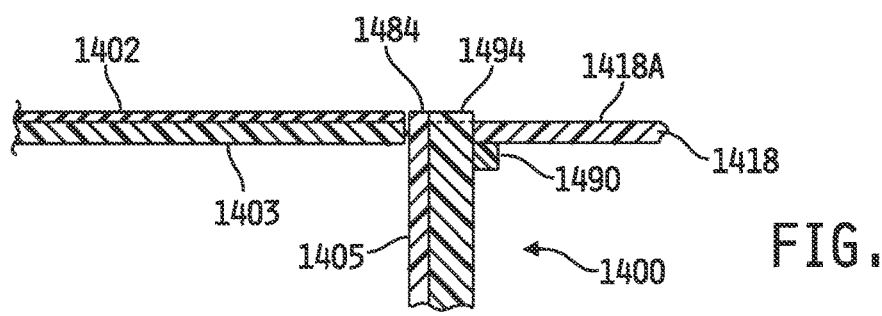
FIG. 16C is a cross-sectional view along section lines 16-16 of FIG. 14 illustrating another alternate embodiment of a connection of the sweep shelf to the main conveyance unit.

Referring to FIG. 16C, another alternate embodiment is shown in which a portion of the side wall 1486 is removed near the top surface 1488 to form a reduced-height, planar top surface 1494. In the embodiment shown in FIG. 16C, the planar top surface 494 of this portion of the side wall 1486 is illustratively co-planar with the planar top surface 1484 of the frame 1405 and also with the planar item support surface of the conveyance path 1402 such that the three planar surfaces are all level or flush with each other. In the embodiment illustrated in FIG. 16C, the "sweep" shelf 1418 is mounted to the conveyance path support structure 1486, e.g., via one or more shelf supports 1490, with the top surface 1418A of the shelf 1418 abutting and co-planar with the shelf mating surface 1494 of the conveyance path support structure 1486 such that the shelf mating surface 1494 of the conveyance path support structure 1486 and the top surface 1418A of the sweep shelf 1418 together form a substantially continuous planar surface that is co-planar or flush with the planar item support surface of the conveyance path 1402. In an alternate embodiment, as shown by dashed-line representation in FIG. 16C, an additional portion of the side wall 1486 may be removed near the top surface 1488 to form a reduced-height, planar top surface 1494 that extends below the plane defined by the top surface 1484 of the frame 1405 and also the planar item support surface of the conveyance path 1402. Either such arrangement illustrated in FIG. 16C will facilitate and promote "sweeping" of exception items from the conveyance path 1402 onto the surface of the shelf 1418A for processing by the attendant and provide no resistance or impediment to such sweeping.

Figure 17A:
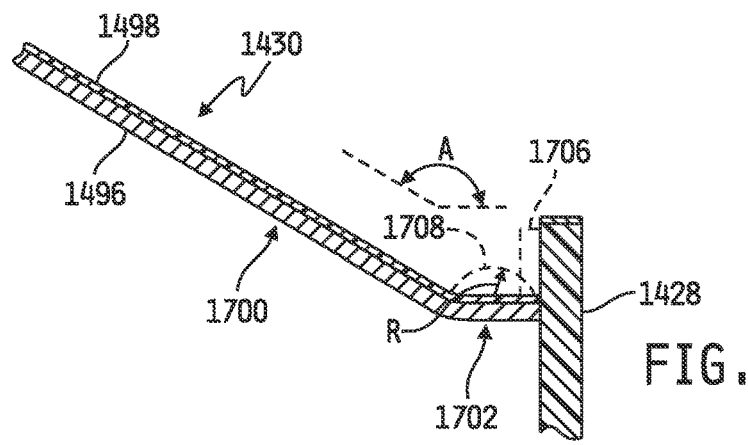
FIG. 17A is a cross-sectional view along section lines 17-17 of FIG. 14 illustrating an embodiment of one of the item collection areas of the point-of-sale system.

Referring again to FIG. 14, the item support surface 1430 of each item collection area A, B and C generally slopes downwardly from an item entrance end adjacent to the diverter or routing apparatus 1420 toward an item exit end adjacent to the inner surface of the front wall 1428 which surrounds the item collection structure 1422 and extends upwardly from the item support surface 1430. Referring now to FIG. 17A, a cross-section of a portion of one embodiment of the item support surface 1430 is shown as viewed along section lines 17-17 of FIG. 14. In the illustrated embodiment, the item support surface 1430 is provided in the form of a rigid base sheet 1496, e.g., metal, metal composite, or other rigid material, having a sloped portion or section 1700 which slopes downwardly away from the item entrance end of the item support surface 1430 toward the item exit end of the item support surface 1430 at an angle A, and which flattens out to form a horizontal portion or section 1702 adjacent to the front wall 1428. Illustratively, the angle A is selected to slow items moving down the item collection area, i.e., item collection area A, from the item entrance end of the item support surface 1430 toward the item exit end of the item support surface 1430 sufficiently to maintain integrity of one or more of the items and/or to maintain integrity of the contents of one or more of the items. In one alternate embodiment, a cushion member 706, e.g., a resilient and/or shock absorbing material such as foam or other such material, is attached to the inner surface of the front wall 1428 to absorb impacts of items that would otherwise strike or otherwise contact the front wall 1428. Alternatively or additionally, a protrusion 1708 may be attached to or integral with the horizontal portion 1702 of the item support surface 1430 and extend upwardly from the horizontal portion 1702 adjacent to the front wall 1428 substantially across the width of at least one of the item collection areas A, B or C. The protrusion 1708 may be a rigid, semi-rigid, flexible or resilient material shaped to slow movement of the items along the item collection area as the items approach the front wall 1428. In one embodiment, for example, the protrusion 1708 may define a radius of curvature, R, as illustrated in FIG. 17A. Alternatively or additionally still, the item support surface 1430 may include a sheet or coating 1498 formed on or adhered thereto, wherein such a sheet or coating 1498 may be formed of a material having a high coefficient of friction relative to one or more of the items received from the conveyance path 1402.

Figure 17B:
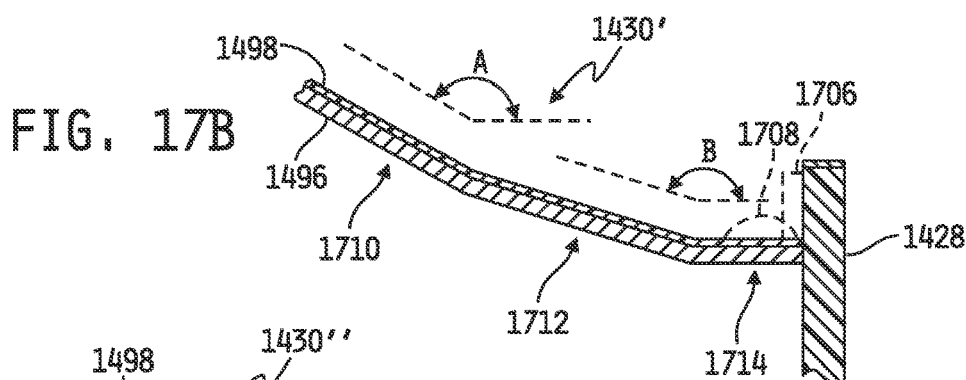
FIG. 17B is a cross-sectional view along section lines 17-17 of FIG. 14 illustrating an alternate embodiment of one of the item collection areas of the point-of-sale system.

Referring now to FIG. 17B, a cross-section of a portion of an alternate embodiment of the item support surface 1430 is shown as viewed along section lines 17-17 of FIG. 14. In the illustrated embodiment, the sloped section of the item support surface 1430 defines a first sloped portion 1710 sloping downwardly from the item entrance end of the item support surface 1430 toward the item exit end at the first angle, A, and at least a second sloped portion 1712 sloping downwardly from the first sloped portion 1710 toward the exit end of the item support surface 1430 at second angle, B, before flattening out to a horizontal portion 1714 adjacent to the front wall 1428. As illustrated in FIG. 17B, the first angle, A, is more steep than the second angle, B. It will be understood that the item support surface 1430 may alternatively be provided with any number of sloped sections each of which slope downwardly at a successively flatter or less steep angle than the previous sloped section. It will be further understood that any specific implementation of the embodiment illustrated in FIG. 17B may additionally include any one or more of the cushion member 1706, the protrusion 1708 and the sheet or coating 1498 as illustrated in FIG. 17A and described above.

Figure 17C:
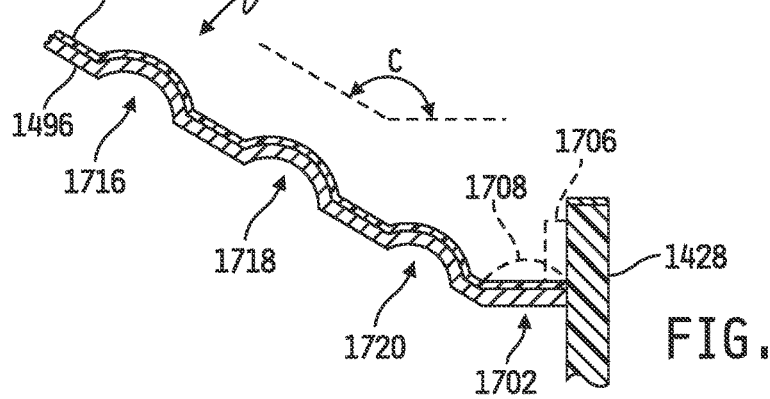
FIG. 17C is a cross-sectional view along section lines 17-17 of FIG. 14 illustrating another alternate embodiment of one of the item collection areas of the point-of-sale system.

Referring now to FIG. 17C, a cross-section of a portion of another alternate embodiment of the item support surface 1430 is shown as viewed along section lines 17-17 of FIG. 14. In the illustrated embodiment, the sloped section of the item support surface 1430 slopes downwardly at an angle, C, and defines at least one rounded ridge, e.g., 1716, extending upwardly from the item support surface 1430 between the item entrance end of the item support surface 1430 and the item exit end of the item support surface 1430. Illustratively, the angle C, like the angle A, is selected to slow items moving down the item collection area, i.e., item collection area A, given the addition of one or more rounded ridges, from the item entrance end of the item support surface 1430 toward the item exit end of the item support surface 1430 sufficiently to maintain integrity of one or more of the items and/or to maintain integrity of the contents of one or more of the items. Any such rounded ridge or "speed bump" may extend substantially across the item collection surface of any item collection area, e.g., item collection area A, and any such rounded ridge is shaped to slow movement of the items as the items traverse downwardly along the item collection area, e.g., item collection area A, B or C. Illustratively, any number of rounded ridges may be provided and, as illustrated in FIG. 17C, two or more rounded ridges 1716, 1718 may be identically sized and at least one rounded ridge 1720 may be sized differently than others of the rounded ridges. It will be understood that the item support surface 1430 may alternatively be provided with any number of sloped sections each of which slope downwardly at successively flatter or less steep angle, as illustrated in FIG. 17B. It will be further understood that any specific implementation of the embodiment illustrated in FIG. 17C may additionally include any one or more of the cushion member 1706, the protrusion 1708 and the sheet or coating 1498 as illustrated in FIG. 17A and described above.

Figure 17D:
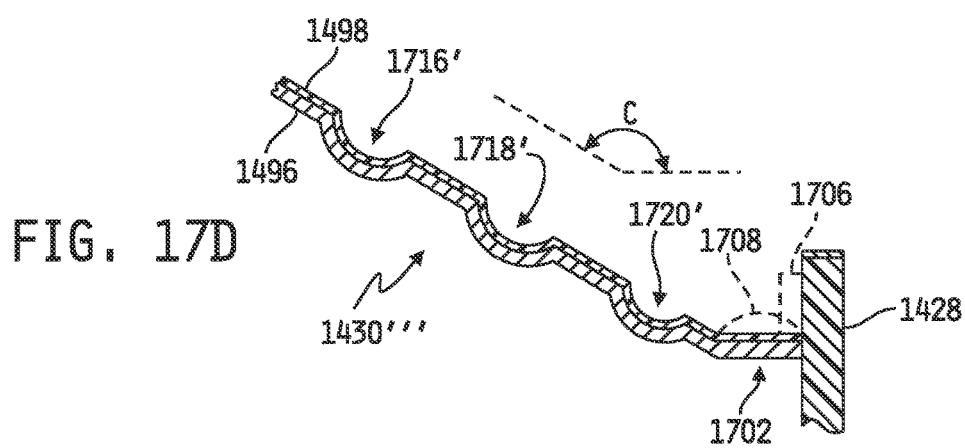
FIG. 17D is a cross-sectional view along section lines 17-17 of FIG. 14 illustrating yet a further alternate embodiment of one of the item collection areas of the point-of-sale system.

Referring now to FIG. 17D, a cross-section of a portion of yet another alternate embodiment of the item support surface 1430 is shown as viewed along section lines 17-17 of FIG. 14. This alternate embodiment is substantially identical to that of FIG. 17C except that one or more of the rounded ridges 1716, 1718, 720 is replaced by its inverse, i.e., a rounded channel 1716', 1718', 1720'. In the embodiment illustrated in FIG. 17D, for example, all of the rounded ridges 1716, 1718, 720 are replaced by their inverse, i.e., a rounded channel 1716', 1718', 1720'. Otherwise, the embodiment illustrated in FIG. 17D is identical to that of FIG. 17C.

Via the attendant display monitor 1454, the attendant may observe and control various operations of the system 110₈. Such operations, as well as the display thereof on the attendant display monitor 1454, are illustratively controlled by the processor 200 of the point-of-sale system 110 (see FIG. 2) by executing various sets of instructions stored in the memory 206 or data storage 208. Alternatively or additionally, one or more such sets of instructions and/or one or more portions of any such sets of instructions may be executed, in whole or in part, by one of the processors 120 of a local hub server 104, 106 and/or by the processor 140 of the main server 102 and/or by the processor 300 of a point-of-sale system queue control unit 112 in embodiments which include the point-of-sale system queue control unit 112. For purposes of this disclosure, however, such operations, control thereof and display thereof on the attendant display monitor 1454 will be described as being executed by the processor 200 of the point-of-sale system 110 in accordance with instructions stored in the memory 206 and/or data storage 208 executed by the processor 200.

Figure 18:
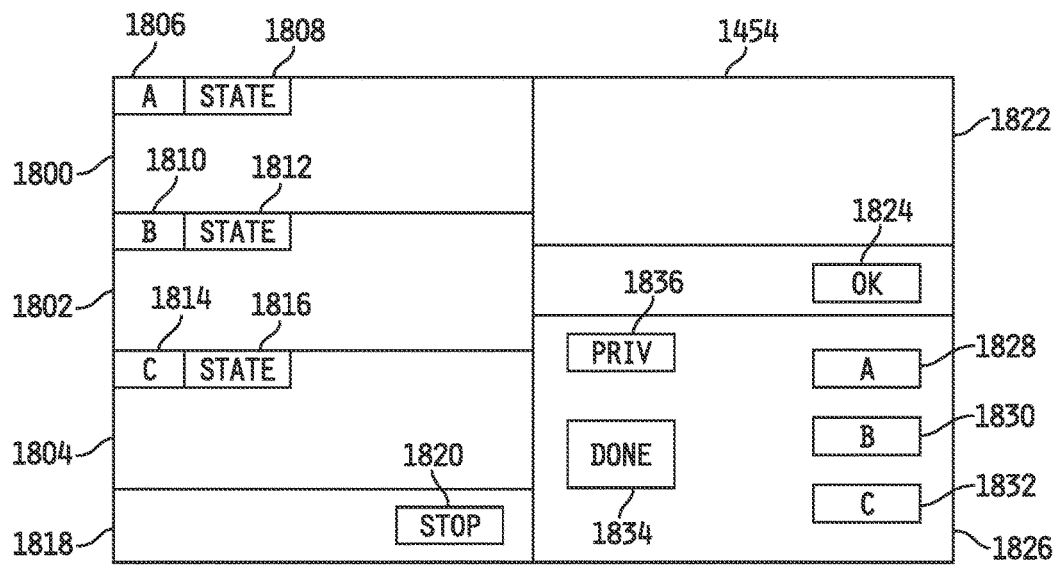
FIG. 18 is a simplified block diagram of an embodiment of an attendant control interface to the point-of-sale system shown in the form of a graphic interface displayed on the attendant monitor illustrated in FIG. 14.

Referring now to FIG. 18, a simplified block diagram of an embodiment of an attendant control interface to the point-of-sale system 110₈ is shown in the form of a graphic interface displayed on the attendant monitor 1454 illustrated in FIG. 14. In the illustrated embodiment, the graphic control interface includes three observation windows 1800, 1802, 1804 each for monitoring transaction activity at a corresponding one of the item collection areas A, B, C. For example, the observation window 1800 includes a collection area identifier 1806, e.g., A, and a state indicator 1808. The collection area identifier 1806 illustratively illuminates or is highlighted when the item collection area A is busy being used to process items for purchase by a customer, and is otherwise not illuminated or highlighted. The state indicator 1808 illustratively indicates an active state of the item collection area A when the collection area A is busy being used to process items for purchase by a customer, and otherwise indicates that the item collection area A is waiting or offline. The window below the identifier 1806 and indicator 1808 illustratively displays part or all of the transaction currently being processed by the item collection area A, and/or displays the current status of certain process activities carried out at the item collection area A, e.g., customer's items currently be scanned, customer's items scanned and being routed to item collection area A, all of customer's items routed to item collection area A but payment not yet received, payment for customer's items processed, etc. Each of the observation windows 1802 and 1804 contain similar identifiers 1810, 1814 and indicators 1812, 1816, and can display transaction information being processed by the item collection areas B and C.

Below the observation window 1804, the graphic control interface includes a control window 1818 having a STOP selector 1820, e.g., touch-screen selection key. The processor 200 is illustratively responsive to manual selection of the STOP selector 1820 to stop control the conveyance path 1420 to stop moving. In one embodiment, manual selection of the STOP selector 1820 causes the STOP selector 1820 graphic to change to RUN, after which the processor 200 is responsive to manual selection thereof to control the conveyance path 1420 to start moving again. Alternatively, the control window 1818 may include a separate RUN selector key.

In the top right section of the display 1454, the graphic control interface includes an exception processing window 1822 which includes an exception graphic in the form of an exception acknowledgement selector key 1824 (OK). When item exceptions are identified, e.g., by the multiple-item scanner 214 and/or the security device sensor 1476 in embodiments which include the security device sensor 1476, the processor 200 controls the exception processing window 1822 to display thereon an image of the exception item provided by the multiple-item scanner 214. Thereafter, the attendant will be required to extract the excepted item from the conveyance path 1402, e.g., via the sweep shelf 1418, and to select an exception graphic in the form of an acknowledgement selector key 1824 to indicate that the attendant has, and is processing, the exception item. In one embodiment, the system 110₈ is configured to provide for selection of the acknowledgement selector key 1824 by scanning the acknowledgement selector key 1824 with the hand-held scanner 1456, and a process 2300 for carrying out and controlling such acknowledgement via the hand-held scanner 1456 will be described below with respect to the flowchart illustrated in FIG. 23. Alternatively or additionally, the system 110₈ may be configured to provide for the selection of the acknowledgement selector key 1824 by providing for touch-screen activation or other manual activation of the acknowledgement selector key 1824. Alternatively or additionally still, the system 110₈ may be configured to provide for the selection of any selectable key displayed on the display monitor 1454 via the hand-held scanner 1456. Further still, the system 110₈ may be configured to controllably illuminate light sources extending along the conveyance path 1402 for the purpose of identifying and tracking exception items as briefly discussed above, and a process 2400 for carrying out and controlling this feature will be described below with respect to the flowchart illustrated in FIG. 24.

In the bottom right section of the display 1454, the graphic control interface includes an item collection area selection and control window 1826 which includes manually selectable item collection area selection graphics, e.g., keys, 1828, 1830 and 1834. Illustratively, the graphics 1828, 1830 and 1832 are illuminated or highlighted while the corresponding item collection area (A, B or C) is busy processing items purchased or to be purchased by a customer, and will stay illuminated or highlighted until the attendant selects the graphic 1828, 1830, 1832. This allows the attendant to visually monitor customer activity at the various item collection areas A, B and C, and to select an illuminated graphic and the DONE selection graphic 1834 make available the corresponding item collection area when the attendant sees that the item collection area is clear. If any of the graphics 1828, 1830, 1832 is not illuminated or highlighted, this means that the corresponding item collection area is available to receive items scanned by the multiple-item scanner 214. In one embodiment, the attendant manually selects one of the non-illuminated or non-highlighted graphics 1828, 1830, 1832 to thereby designate a corresponding one of the available item collection areas to receive items to be purchased by the next customer to use the system $110_8$. In an alternate embodiment, the processor 200 may automatically select one of the non-illuminated or non-highlighted graphics 1828, 1830, 1832 to thereby automatically designate a corresponding one of the available item collection areas to receive items to be purchased by the next customer to use the system $110_8$. In still another embodiment, the processor 200 may be operable to control the customer display monitor 1450 in a manner that allows the customer to selectively designate which of the item collection areas, from the currently available item collection areas, A, B or C, will receive the customer's items after scanning by the multiple-item scanner 214. A process 2500 for carrying out and controlling customer designation of an item collection area, A, B or C, will be described below with respect to the flowchart illustrated in FIG. 25 with the aid of example guidance and control graphics displayed on the customer display monitor illustrated in FIGS. 19-21.

The item collection area selection and control window 1826 further illustratively includes a manually selectable privacy control graphic, e.g., key 1836. In one embodiment, the processor 200 may be operable to control the display monitors 1462 of the various customer payment interfaces A", B" and C" to mask transaction information for items being sent to the item collection areas A, B or C by displaying on the corresponding display monitor(s) 1462 a privacy graphic until the corresponding customer manually selects, at the corresponding customer payment interface A", B" or C", to display their transaction information on the co-located display monitor 1462. A process 2600 for carrying out and controlling such a privacy block on the display monitor 1462 of one or more of the customer payment interfaces A", B" and/or C" will be described below with respect to the flowchart illustrated in FIG. 26. In some embodiments, the process 2600 allows for attendant override of the privacy block, and the selectable privacy control graphic 1836 on the attendant's display monitor 1454 is illustratively provided for this purpose.

The processor 200 may further be operable to automatically control the transport speed of the conveyance path 1402 and/or the rotational speed of at least one rotatable turnabout in embodiments which include at least one rotatable turnabout, to decrease such speed upon detection of one or more delicate items scanned by the multiple-item scanner 214 in order to preserve the integrity of the one or more delicate items and/or the contents of one or more delicate items. A process 2700 for carrying out such automatic speed control will be described below with respect to the flowchart illustrated in FIG. 27.

Figure 23:
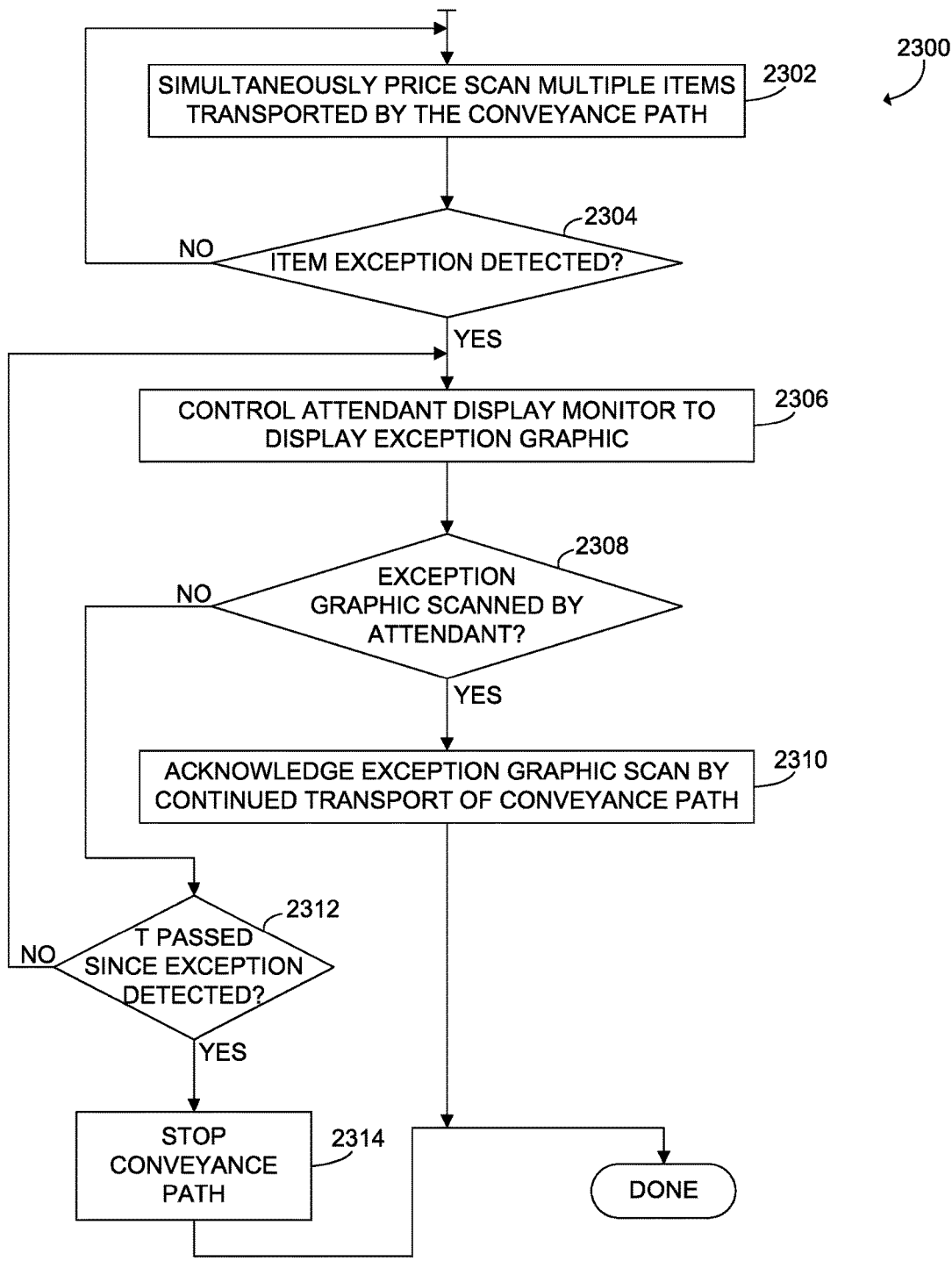
FIG. 23 is a simplified flowchart of an embodiment of a process for handling item exceptions that may occur in a point-of-sale system having a multiple-item price scanning apparatus.

Referring now to FIG. 23, a simplified flowchart is shown of an embodiment of a process 2300 for handling item exceptions that may occur in a point-of-sale system having a multiple-item price scanning apparatus. In one embodiment, the process 2300 is stored in the memory 206 and/or data storage 208 of the point-of-sale system 110 (see FIG. 2) in the form of one or more sets of instructions that are executable by the processor 200 to handle item exceptions that may occur during the processing, e.g. by the multiple-item scanner 214, of items to be purchased. Alternatively or additionally, one or more such sets of instructions and/or one or more portions of any such sets of instructions may be executed, in whole or in part, by one of the processors 120 of a local hub server 104, 106 and/or by the processor 140 of the main server 102 and/or by the processor 300 of a point-of-sale system queue control unit 112 in embodiments which include the point-of-sale system queue control unit 112. For purposes of this disclosure, however, the process 2300 will be described as being executed by the processor 200 of the point-of-sale system 110 in accordance with instructions stored in the memory 206 and/or data storage 208 executed by the processor 200. Moreover, although the process 2300 may be implemented in any of the point-of-sale system embodiments illustrated in the attached drawings and described hereinabove, the process 2300 will be described for purposes of this document as being implemented in the system $110_8$ illustrated in FIG. 14.

The process 2300 begins at step 2302 wherein the multiple-item scanner 214 is in the process of scanning multiple items transported by or through the multiple-item scanner 214 by the conveyance path 1402, wherein both the operation of the multiple-item scanner and the speed/movement of the conveyance path 1402 are under the control of the processor 200. Thereafter at step 2304, the processor 200 is operable to determine whether any item exceptions have been detected. If not, the process 2300 loops back to step 2302.

As described above, an "exception" or "exception item" is broadly defined as any item being transported for purchase along the conveyance path 1402 which requires intervention and processing in some form by a retail enterprise attendant. In one embodiment, the multiple-item scanner 214 is operable to detect whether any of the multiple items being price scanned are exception items during the price scanning process. For example, the multiple-item price scanner 214 is operable to price scan the multiple items by capturing multiple images of the items from multiple different angles as the items pass by or through the scanner 214, to analyze these images to detect conventional price and item-related barcodes, e.g., UPC, EAS, GS-1, etc., and to decode the barcodes to determine item identity, manufacturer, price, etc. However, during this conventional price scanning process, any of a number of different price scanning errors, scanning of particular items and scanning of items having certain mechanisms attached thereto can by their nature require intervention and additional processing by the attendant, and all such mechanisms will result in identification by the multiple-item scanner 214 and processor 200 of item exceptions. Examples of item exceptions that will be identified as such by the processor 200 based on an analysis of the various images produced by the multiple-item scanner 214 when scanning an item may include, but should not be limited to, failure to price scan an item having a valid barcode, i.e., failure to capture and/or properly analyze an image of the barcode resulting in failure to determine its identity/price, the item scanned is identified by the price barcode or supplemental barcode as a delicate item such as a gift card, the item scanned is identified, via information on the barcode or other information attached to or part of the item, as an item to be bagged alone, i.e., without any other items in a bag used to contain the item, the item scanned is detected as having at least one additional barcode attached thereto which identifies the item as an exception item, examples of which include an additional barcode identifying the item as a pharmaceutical item, photographs, items to large or bulky to price scan with the multiple-item price scanner 214, an item from another checkout lane that crashed or the like, the item scanned is identified as having at least one security device attached thereto, examples of which may include an electronic article surveillance (EAS) device such as a spirit cap, spider wrap, keeper case, electronic tag or the like, the item scanned includes a supplemental barcode identifying the item as having an optional purchasable warranty which may be offered by the item manufacturer and/or the retail enterprise, and the item scanned is identified as an age restricted item requiring proof of purchaser's age. In some embodiments, the conveyance system 1400 may include or more sensors operable to sense exception items, i.e., operable to sense one or more structures attached to, embedded in or carried by the item, such as a security device or other structure(s), that identify the item as an exception item. For example, the sensor 1476 illustrated in FIG. 14 may be a magnetic, inductive, radio frequency or other sensor configured to detect a magnetic, metallic or radio frequency device attached to, embedded in or carried by an item which, when detected by the sensor 1476, identifies the item as an exception item. Other examples of exception items, mechanisms for identifying items as exception items and/or techniques for detecting exception items will occur to those skilled in the art, and any such other examples are contemplated by this disclosure.

Following step 2304, the process 2300 of FIG. 23 advances to step 2306 where the processor 200 controls the attendant display monitor 1454 to display thereon an exception graphic. Referring again to FIG. 18, an example exception graphic 1824 is shown displayed on the display monitor 1454. However, in embodiments in which the attendant is to acknowledge the exception graphic by scanning the exception graphic with the hand-held scanner 1456, as is required by the following step 2308 of the process 2300, the exception graphic must be a graphic capable of detection by the hand-held scanning device 1456, e.g., an exception barcode, quick response (QR) code, or the like. In any case, if at step 2308 the processor 200 determines that the exception graphic displayed on the attendant display monitor 1454 has been scanned by the hand-held scanner 1456, the process 2300 advances to step 2310 where the processor 200 acknowledges the scan by the hand-held scanner 1456 of the exception code by continuing uninterrupted transport of the conveyance path 1402, i.e., by continuing to control the speed of the conveyance path 1402 to transport items between the item entrance end 1404 and the item exit end 1406 thereof, and following step 2310 the process 2300 is complete or may alternatively loop back to step 2302 to monitor for additional exception items.

Until the processor 200 detects successful scanning of the exception graphic by the hand-held price scanner 1456 at step 2308, the process 2300 loops to step 2312 to determine if a time period, T, has elapsed since detecting the exception. If not, the process 2300 continues to loop back through steps 2306, 2308 and 2312. If, however, the processor 200 determines at step 2312 that the time period, T, has elapsed since detecting the exception, the process 2300 advances to step 2314 where the processor 200 automatically controls the conveyance path 1402 to stop so that the exception can be addressed. Thereafter, the process 2300 is complete, or may alternatively loop back to step 2302 to monitor for additional exception items.

Figure 24:
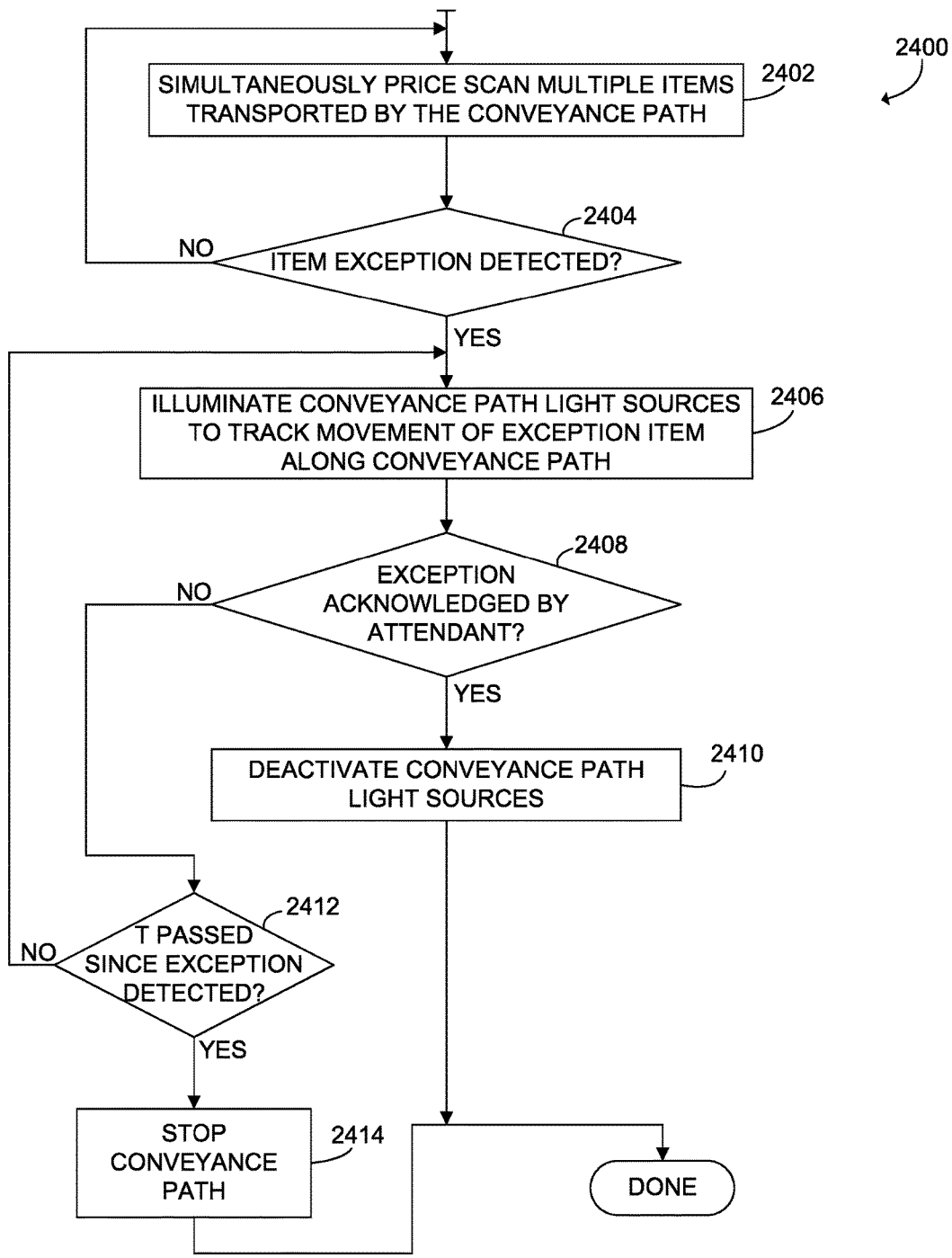
FIG. 24 is a simplified flowchart of an embodiment of a process for tracking exceptions during travel along a conveyance path in a point-of-sale system having a multiple-item price scanning apparatus.

Referring now to FIG. 24, a simplified flowchart is shown of an embodiment of a process 2400 for tracking exceptions during travel along a conveyance path in a point-of-sale system having a multiple-item price scanning apparatus. In one embodiment, the process 2400 is stored in the memory 206 and/or data storage 208 of the point-of-sale system 110 (see FIG. 2) in the form of one or more sets of instructions that are executable by the processor 200 to track identified item exceptions during travel along the conveyance path 1402. Alternatively or additionally, one or more such sets of instructions and/or one or more portions of any such sets of instructions may be executed, in whole or in part, by one of the processors 120 of a local hub server 104, 106 and/or by the processor 140 of the main server 102 and/or by the processor 300 of a point-of-sale system queue control unit 112 in embodiments which include the point-of-sale system queue control unit 112. For purposes of this disclosure, however, the process 2400 will be described as being executed by the processor 200 of the point-of-sale system 110 in accordance with instructions stored in the memory 206 and/or data storage 208 executed by the processor 200. Moreover, although the process 2400 may be implemented in any of the point-of-sale system embodiments illustrated in the attached drawings and described hereinabove, the process 2400 will be described for purposes of this document as being implemented in the system $110_8$ illustrated in FIG. 14.

The process 2400 begins at step 2402 wherein the multiple-item scanner 214 is in the process of scanning multiple items transported by or through the multiple-item scanner 214 by the conveyance path 1402, wherein both the operation of the multiple-item scanner and the speed/movement of the conveyance path 1402 are under the control of the processor 200. Thereafter at step 2404, the processor 200 is operable to determine whether any item exceptions have been detected. Item exceptions, for purposes of the process 2400, may be or include any one or combination of the example item exceptions described above with respect to the process 2300 of FIG. 23, and such item exceptions may be detected during the process 2400 a combination of the processor 200 and the multiple-item price scanner 214, a combination of the processor 200 and one or more sensors on-board the conveyance system 1400, e.g., the sensor 1476 described hereinabove, or other conventional device and/or technique for detecting and item exceptions.

If, at step 2404, the processor 200 determines that an item exception has not been detected, the process 2400 loops back to step 2402. If the processor 200 instead determines at step 2404 that an item exception has been detected, the process 2400 advances to step 2406 where the processor 200 is operable to control the light sources 1482 extending along the side wall 1480 and/or the side wall 1486 of the conveyance system 1400 to illuminate in a manner that tracks movement of the exception item as the exception item is transported by the conveyance path toward the exit end 1406 of the conveyance path 1402. In one embodiment, for example, the processor 200 is operable to execute step 2406 by controlling the light sources 1482 to illuminate one or more of the light sources 1482 adjacent to the point at which the item exception was detected, e.g., at the multiple-item scanner 214, and to then sequentially illuminate downstream ones of the light sources 1482 based on the transport speed of the conveyance path so that one or more of the light sources 1482 illuminate as the exception item is transported thereto by the conveyance path 1402. In one embodiment, the upstream light sources are turned off after the exception item passes thereby, and in alternate embodiments the upstream light sources are maintained illuminated after the exception item has passed thereby until the exception item is cleared by the attendant.

Following step 2406, the process 2400 of FIG. 24 advances to step 2408 where the processor 200 determines whether the item exception has been acknowledged by the attendant using any one or more of the techniques described above with respect to FIG. 18. If at step 2408 the processor 200 determines that the exception has been acknowledged by the attendant, the process 2400 advances to step 2410 where the processor 200 deactivates the light sources 1482 along the conveyance path 1402, and following step 2410 the process 2400 is complete or may alternatively loop back to step 2402 to monitor for additional exception items.

Until the processor 200 detects that the attendant has acknowledged the item exception at step 2408, the process 2400 loops to step 2412 to determine if a time period, T, has elapsed since detecting the exception. If not, the process 2400 continues to loop back through steps 2406, 2408 and 2412. If, however, the processor 200 determines at step 2412 that the time period, T, has elapsed since detecting the exception, the process 2400 advances to step 2414 where the processor 200 automatically controls the conveyance path 1402 to stop so that the exception can be addressed. Thereafter, the process 2400 is complete, or may alternatively loop back to step 2402 to monitor for additional exception items.

Figure 25:
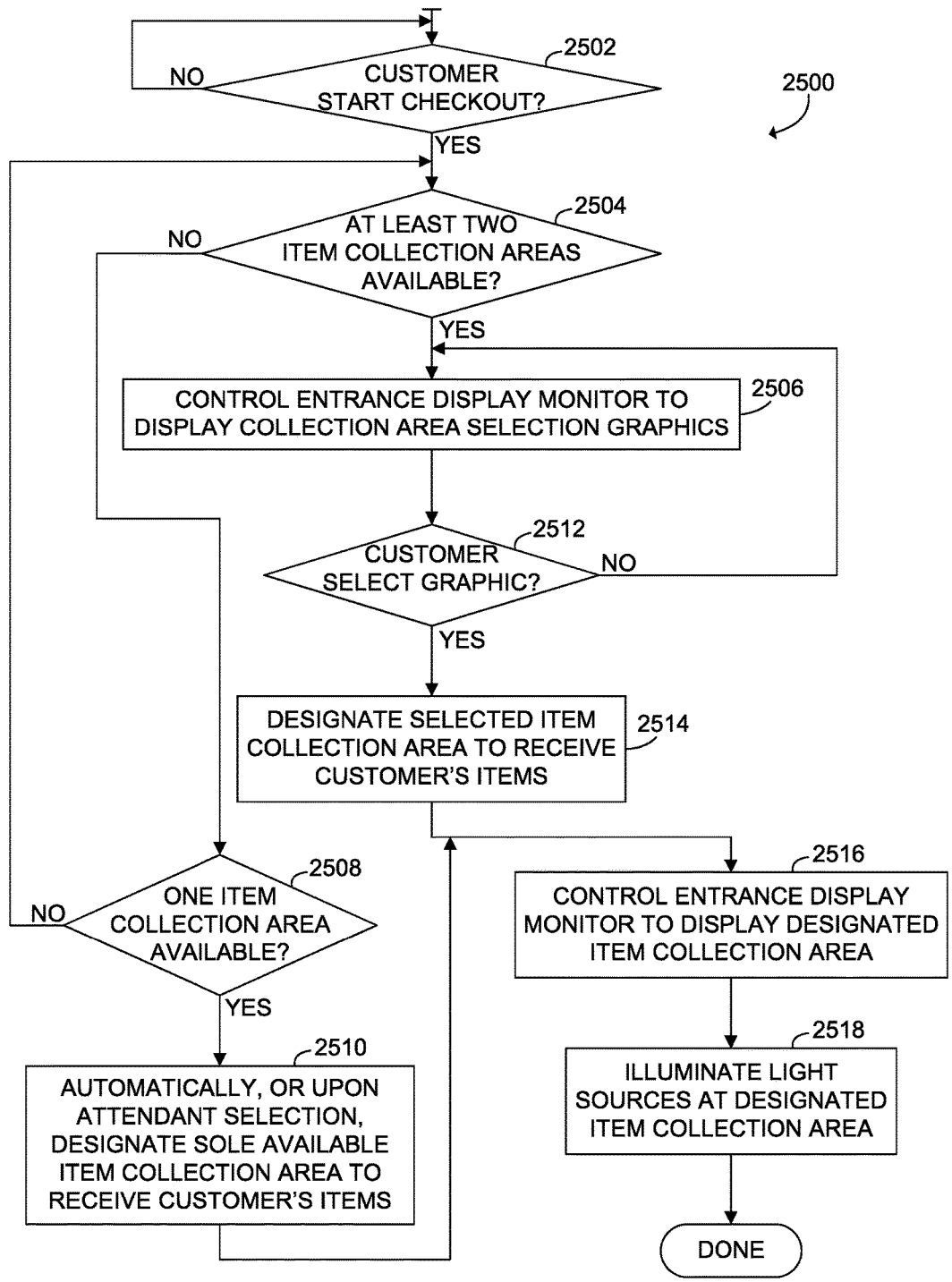
FIG. 25 is a simplified flowchart of an embodiment of a process for providing for customer selection of one of a number of available item collection areas in a point-of-sale system having a multiple-item price scanning apparatus.

Referring now to FIG. 25, a simplified flowchart is shown of an embodiment of a process 2500 for providing for customer selection of one of a number of available item collection areas in a point-of-sale system having a multiple-item price scanning apparatus. In one embodiment, the process 2500 is stored in the memory 206 and/or data storage 208 of the point-of-sale system 110 (see FIG. 2) in the form of one or more sets of instructions that are executable by the processor 200 to allow customers to select one of a number of available item collection areas to which the customers items will be routed. Alternatively or additionally, one or more such sets of instructions and/or one or more portions of any such sets of instructions may be executed, in whole or in part, by one of the processors 120 of a local hub server 104, 106 and/or by the processor 140 of the main server 102 and/or by the processor 300 of a point-of-sale system queue control unit 112 in embodiments which include the point-of-sale system queue control unit 112. For purposes of this disclosure, however, the process 2500 will be described as being executed by the processor 200 of the point-of-sale system 110 in accordance with instructions stored in the memory 206 and/or data storage 208 executed by the processor 200. Moreover, although the process 2500 may be implemented in any of the point-of-sale system embodiments illustrated in the attached drawings and described hereinabove, the process 2500 will be described for purposes of this document as being implemented in the system 110₈ illustrated in FIG. 14.

Figure 19:
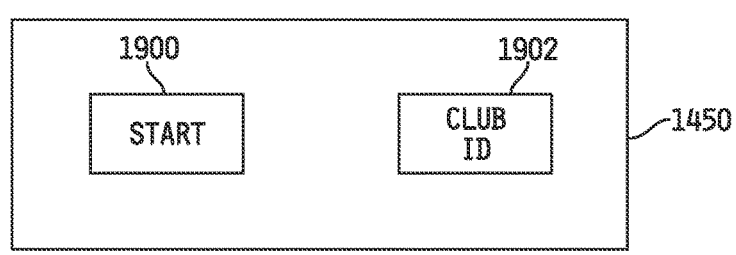
FIG. 19 is a simplified block diagram of an embodiment of a customer control interface to the point-of-sale system shown in the form of a graphic interface displayed on the customer monitor at the entrance to the point-of-sale system illustrated in FIG. 14.

The process 2500 begins at step 2502 wherein the customer starts the checkout process at the entrance end 1404 of the conveyance path 1402. Referring to FIG. 19, for example, the processor 200 may control the customer entrance display 1450 to display a START graphic 1900 and/or a graphic 1902 identifying a coupon club or other club membership sponsored by the retail enterprise to which the customer may belong. The processor 200 is illustratively operable to determine at step 2502 that the customer has started the checkout process in response to manual selection of either of the graphics 1900 or 1902. Otherwise, the process 2500 loops back to the beginning of step 2502.

After the processor 200 determines at step 2502 that the customer has started the checkout process, the process 2500 advances to step 2504 to determine whether at least two of the item collection areas, e.g., at least two of the item collection areas A, B and C, are currently available, i.e., not being used by other customers. In one embodiment, the processor 200 is operable to make this determination by monitoring the statuses of the item collection area graphics 1828, 1830 and 1832 displayed on the attendant display monitor 1454. If the status of at least two of the graphics 1828, 1830, and 1832 indicate that the corresponding item collection areas are available, the process 2500 advances to step 2506. If, however, the processor 200 determines at step 2504 that only one or fewer of the item collection areas A, B and C is available, the process advances to step 2508 wherein the processor 200 is operable to determine whether one item collection area is currently available or no item collection areas are currently available. If the latter, the process 2500 loops back to step 2504 to monitor the item collection areas for availability. If the former, the process 2500 advances to step 2510 where, in one embodiment, the processor 200 monitors the corresponding graphic 1828, 1830 or 1832 displayed on the attendant display monitor 1454 and designates this sole available item collection area when the attendant manually selects the corresponding one of the graphics 1828, 1830 or 1832. In alternative embodiments, the processor 200 is operable at step 2510 to automatically designate the sole available item collection area, which then results in automatic illumination or highlighting of the corresponding graphic 1828, 1830, 1832 displayed on the attendant display monitor 1454. In either case, the sole available item collection area is designated as the item collection area that will receive the customer's items after being price scanned by the multiple-item scanner 214.

Figure 20:
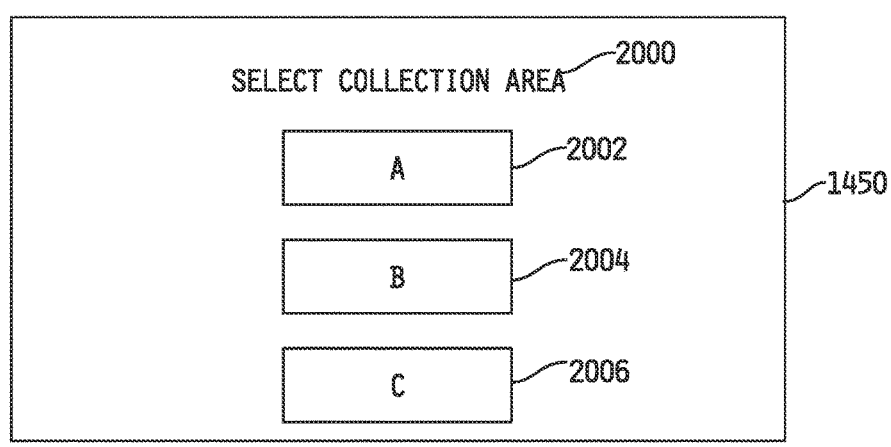
FIG. 20 is a simplified block diagram of an embodiment of another customer control interface to the point-of-sale system shown in the form of another graphic interface displayed on the customer monitor illustrated in FIG. 14.

Following advancement of step 2504 to step 2506, which occurs if two or more item collection areas are currently available for use, the processor 200 is operable at step 2506 to control the customer entrance display monitor 1452 to display thereon item collection area selection graphics corresponding to all of the currently available item collection areas, e.g., A, B and/or C. Referring to FIG. 20, the processor 200 may control the customer entrance display 1450 to display a message 2000 prompting the customer to manually select one of the item collection area selection graphics 2002, 2004, 2006 corresponding to the customer's choice of item collection area from the currently available collection areas. In one embodiment, the processor 200 is operable at step 2506 to display only item collection area selection graphics corresponding to those that are currently available. Alternatively, the processor 200 may be operable at step 2506 to display all of the item collection area selection graphics 2002, 2004, 2006 as illustrated in FIG. 20, but to illuminate or highlight and render active only those that are currently available. Thus, for example, if the processor 200 determines at step 2504 that only item collection areas A and B are currently available, the processor 200 in this embodiment may execute step 2506 by illuminating or highlighting, and rendering active, only the item collection area selection graphics 2002 and 2004 while dimming or ghosting, and rendering inactive, the item collection area selection graphic 2006. The customer either case may select only one of the active graphics 2002, 2004 or 2006, and by doing so selects a corresponding one of the item collection areas to which the customer's items will be routed following price scanning thereof.

Following step 2506, the processor 200 is operable at step 2512 to determine whether the customer has made a selection of the displayed item collection area selection graphics. If not, the process 2500 loops back to the beginning of step 2506. Otherwise, the process 2500 advances to step 2514 wherein the processor 200 designates the item collection area selected by the customer as the item collection area that will receive the customer's items after being price scanned by the multiple-item scanner 214.

Figure 21:
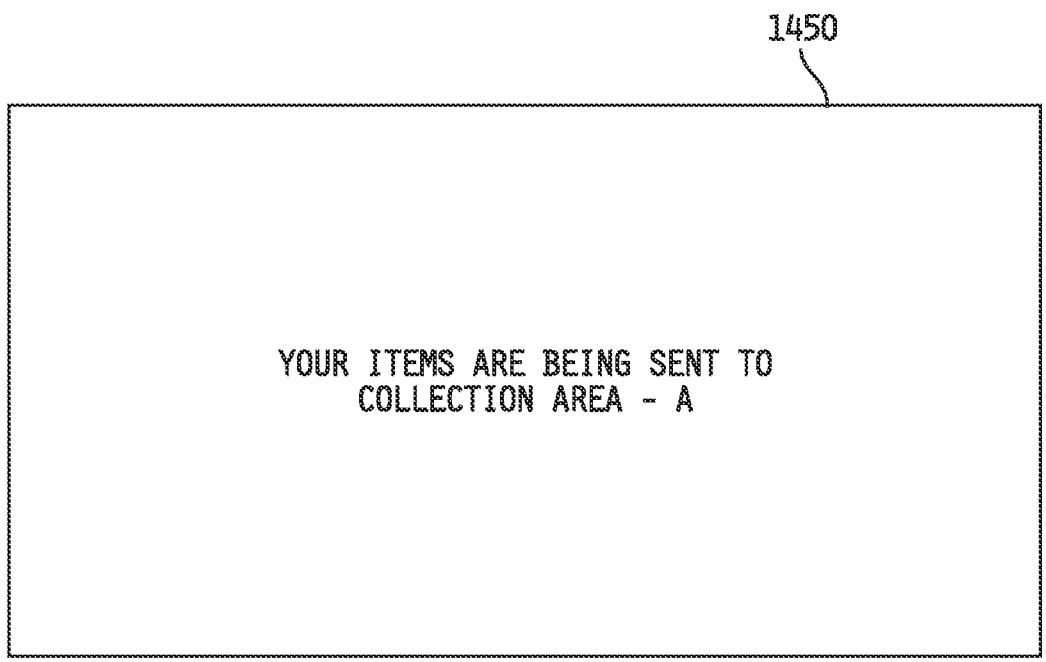
FIG. 21 is a simplified block diagram of an embodiment of another customer control interface to the point-of-sale system shown in the form of yet another graphic interface displayed on the customer monitor illustrated in FIG. 14.

Whether the designated item collection area, A, B or C, is selected by the customer, by the attendant or automatically by the processor 200, the process 2500 advances to step 2516 where the processor illustratively controls the customer entrance display monitor 1452 to display the item collection area designated to receive the customer's items after being price scanned by the multiple-item scanner 214. Referring to FIG. 21, for example, the customer entrance display monitor 1452 is shown having an example message displayed thereon informing the customer of the item collection area to which the customer's items will be sent after being price scanned by the multiple-item scanner 214. Following step 2516, the process 1500 advances to step 2518 where the processor 200 illustratively controls the light sources 1446 at the designated one of the item collection areas to illuminate. Optionally, the processor 200 may control the customer entrance display monitor 1452 at step 2516 to display the identified item collection area displayed thereon in a color that matches that of the light sources 1466 at the designated item collection area. In any case, the process 2500 is completed after execution of step 2518.

Figure 26:
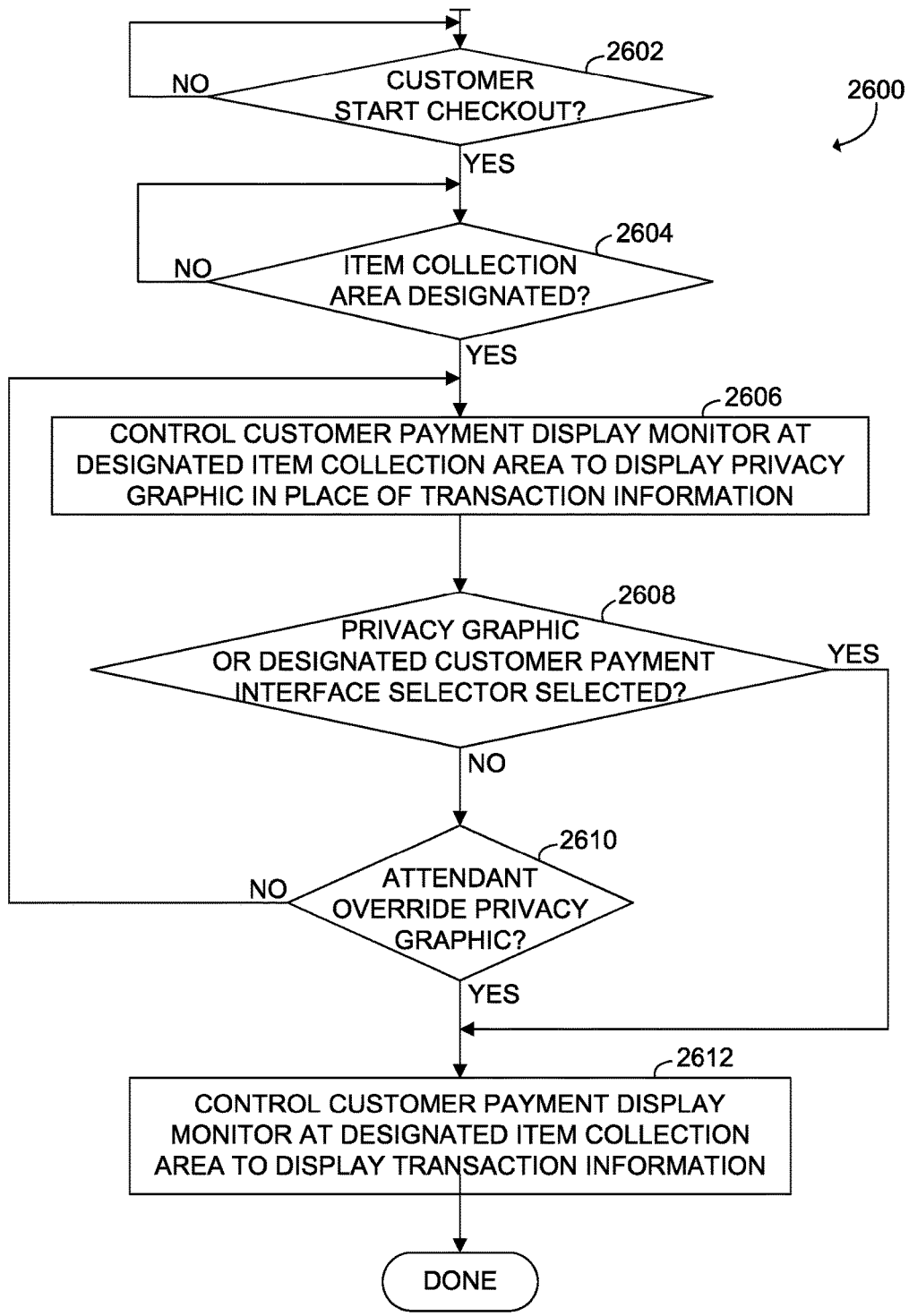
FIG. 26 is a simplified flowchart of an embodiment of a process for inhibiting display of purchase transaction information on a customer payment interface co-located at a designated item collection area until the customer selects display of the information at the customer payment interface.

Referring now to FIG. 26, a simplified flowchart is shown of an embodiment of a process 2600 for inhibiting display of purchase transaction information on a customer payment interface co-located at a designated item collection area until the customer selects display of the information at the customer payment interface. In one embodiment, the process 2600 is stored in the memory 206 and/or data storage 208 of the point-of-sale system 110 (see FIG. 2) in the form of one or more sets of instructions that are executable by the processor 200 to allow customers to selectively inhibit display of purchase transaction information on any of the customer payment interfaces, e.g., A", B" and/or C", until the customer selects display of the information at the customer payment interface. Alternatively or additionally, one or more such sets of instructions and/or one or more portions of any such sets of instructions may be executed, in whole or in part, by one of the processors 120 of a local hub server 104, 106 and/or by the processor 140 of the main server 102 and/or by the processor 300 of a point-of-sale system queue control unit 112 in embodiments which include the point-of-sale system queue control unit 112. For purposes of this disclosure, however, the process 2600 will be described as being executed by the processor 200 of the point-of-sale system 110 in accordance with instructions stored in the memory 206 and/or data storage 208 executed by the processor 200. Moreover, although the process 2600 may be implemented in any of the point-of-sale system embodiments illustrated in the attached drawings and described hereinabove, the process 2600 will be described for purposes of this document as being implemented in the system $110_8$ illustrated in FIG. 14.

Figure 22:
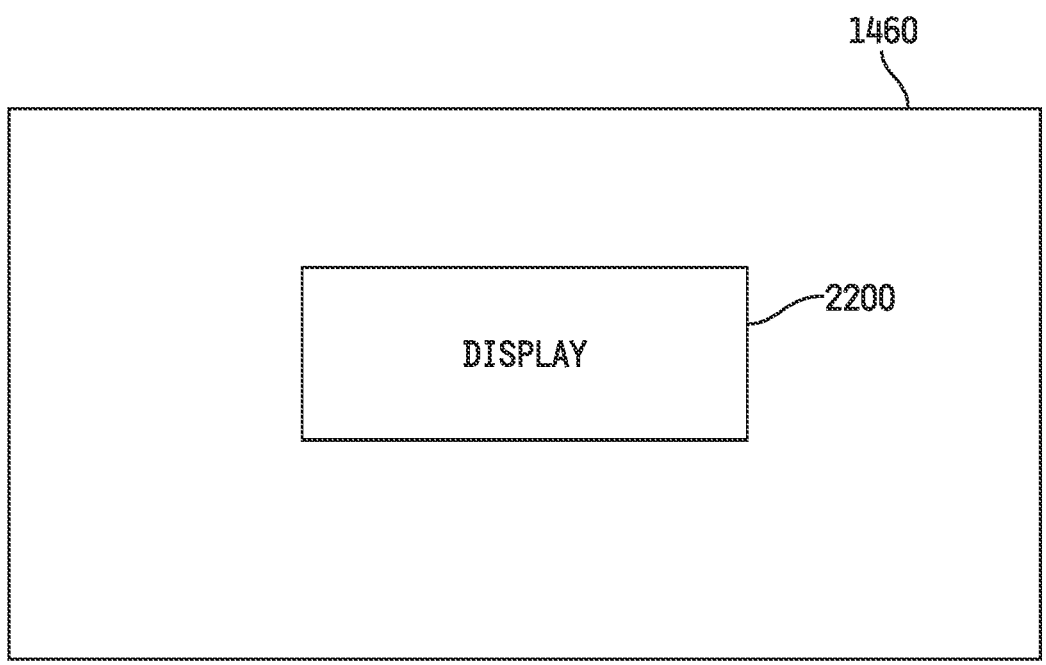
FIG. 22 is a simplified block diagram of an embodiment of a customer control interface to the point-of-sale system shown in the form of a graphic interface displayed on the customer payment monitor at one of the collection and bagging areas illustrated in FIG. 14.

The process 2600 begins at step 2602 wherein the customer starts the checkout process at the entrance end 1404 of the conveyance path 1402. Execution of step 2602 may illustratively proceed as described with respect to step 2502 of the process 2500 illustrated in FIG. 25. When the processor 200 determines that the customer has started the checkout process, the process 2600 advances to step 2604 where the processor 200 determines whether an available one of the item collection areas, A', B', C' has been designated, e.g., by the customer, by the attendant or automatically by the processor 200. If not, the process 2600 loops back to the beginning of step 2604, and if so the process 2600 advances to step 2606 where the processor 200 is operable to control the customer payment display monitor at the designated item collection area to display a privacy graphic in place of transaction information when subsequently price scanning the customer's items. Referring to FIG. 22, the customer payment display monitor 1460 located at the designated item collection area is shown being controlled by the processor 200 at step 2606 to display an example privacy graphic 2200. In one embodiment, the privacy graphic 2200 is manually selectable, and in alternate embodiments it is not.

Following step 2606, the process 2600 advances to step 2608 where the processor 200 is operable in one embodiment, in which the privacy graphic 2200 is manually selectable, to determine whether the privacy graphic 2200 has been manually selected. In an alternate embodiment, in which the privacy graphic 2200 is not manually selectable, the processor 2200 is operable at step 2608 to determine whether another manually selectable customer interface payment selector has been selected. In either case, if the customer has not selected the graphic 2200 or alternate selector the process 2600 advances to step 2610 where the processor 200 monitors the attendant display monitor 1454 to determine whether the attendant has overridden the privacy graphic 2200 by manually selecting the privacy override graphic 1836 displayed thereon. If not, the process 2600 loops back to step 2606, and if so, and also if the privacy graphic 2200 or other designated customer payment interface selector has been found to be manually selected at step 2608, the process 2600 advances to step 2612 where the processor 200 is operable to control the customer payment display monitor at the designated item collection area to display the customer's transaction information. The process 2600 is completed after execution of step 2618.

Figure 27:
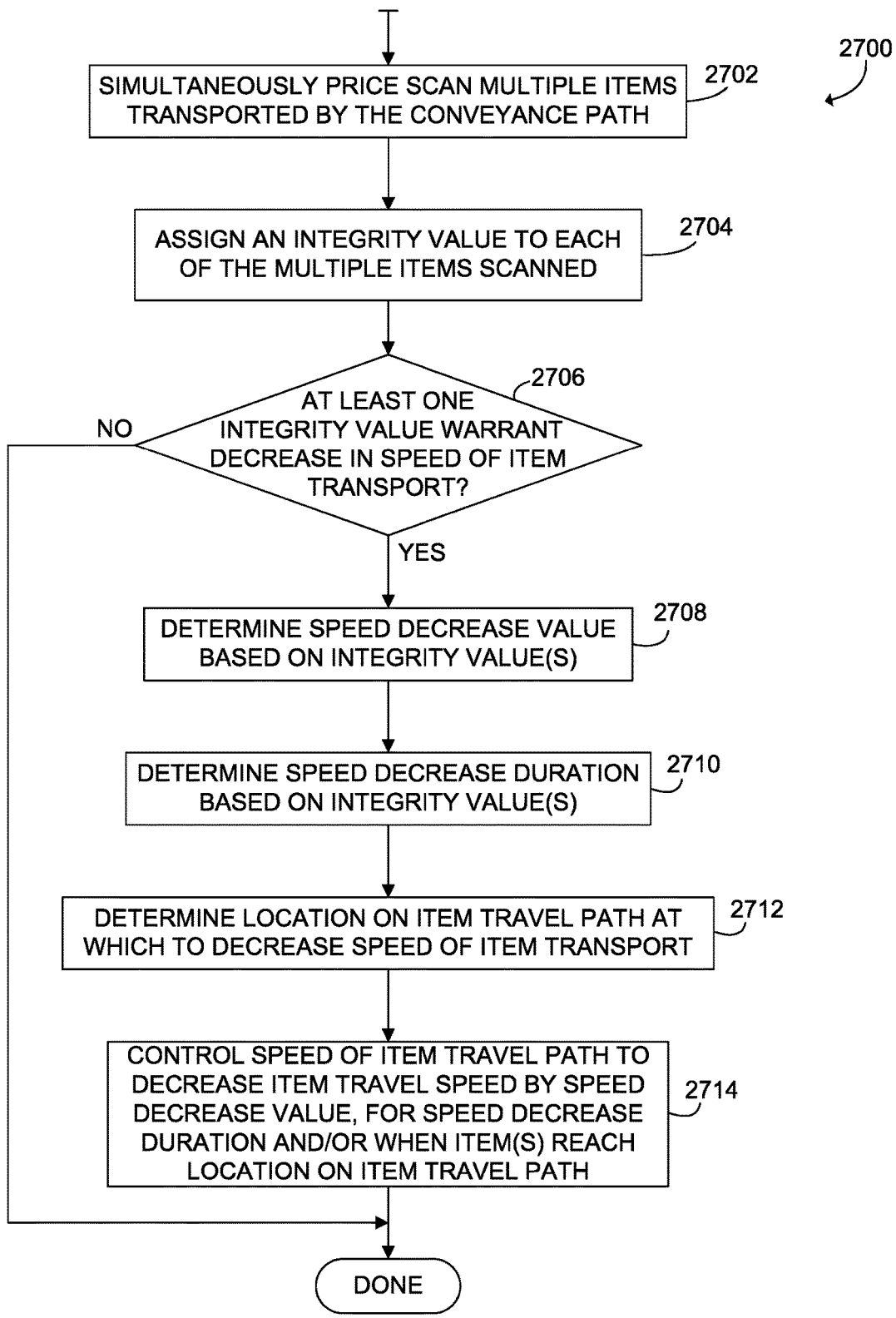
FIG. 27 is a simplified flowchart of an embodiment of a process for controlling the speed of movement of items transported through a point-of-sale system having a multiple-item price scanning apparatus so as to maintain integrity of one or more of the items and/or the contents of one or more of the items.

Referring now to FIG. 27, a simplified flowchart is shown of an embodiment of a process 2700 for controlling the speed of movement of items transported through a point-of-sale system having a multiple-item price scanning apparatus so as to maintain integrity of one or more of the items and/or the contents of one or more of the items. In one embodiment, the process 2700 is stored in the memory 206 and/or data storage 208 of the point-of-sale system 110 (see FIG. 2) in the form of one or more sets of instructions that are executable by the processor 200 to control the speed of movement of items transported through the point-of-sale system so as to maintain integrity of one or more of the items and/or the contents of one or more of the items. Alternatively or additionally, one or more such sets of instructions and/or one or more portions of any such sets of instructions may be executed, in whole or in part, by one of the processors 120 of a local hub server 104, 106 and/or by the processor 140 of the main server 102 and/or by the processor 300 of a point-of-sale system queue control unit 112 in embodiments which include the point-of-sale system queue control unit 112. For purposes of this disclosure, however, the process 2700 will be described as being executed by the processor 200 of the point-of-sale system 110 in accordance with instructions stored in the memory 206 and/or data storage 208 executed by the processor 200. Moreover, although the process 2700 may be implemented in any of the point-of-sale system embodiments illustrated in the attached drawings and described hereinabove, the process 2700 will be described for purposes of this document as being implemented in the system $110_8$ illustrated in FIG. 14.

The process 2700 begins at step 2702 wherein the multiple-item scanner 214 is in the process of scanning multiple items transported by or through the multiple-item scanner 214 by the conveyance path 1402, wherein both the operation of the multiple-item scanner and the speed/movement of the conveyance path 1402 are under the control of the processor 200. Thereafter at step 2704, the processor 200 is operable to assign an integrity value to each of the multiple items scanned. Generally, the integrity value assigned to any given item will be a value corresponding to a measure of the fragility of the item or integrity of the contents of the item, when being transported through the point-of-sale system $110_8$. Thus, for example, highly fragile items like eggs and bread may have high (or low) integrity values relative to those of less fragile items like canned goods. In any case, the process 2700 advances from step 2704 to step 2706 wherein the processor 200 is operable to determine whether at least one of the assigned integrity values warrants a decrease in the speed of item transport through the point-of-sale system $110_8$. In one embodiment, for example, the processor 200 is operable at step 2704 to compare the assigned integrity value to an integrity value threshold indicative of fragile items, and to determine that at least one integrity value warrants the speed decrease if at least one integrity value crosses the integrity threshold value. If not, the process advances to DONE, and otherwise advances to step 2708 where the processor 200 is illustratively operable to determine a speed decrease value based on the assigned integrity values, i.e., an amount or magnitude of speed by which the transport speed will be decreased, based on the assigned integrity values. In one embodiment, for example, the processor 200 is operable to select the assigned integrity value having the largest different compared to the integrity threshold value and determine the speed decrease value based thereon. In alternate embodiments, the processor 200 is operable to determine the speed decrease value at step 2708 based on an average integrity value of assigned integrity values that cross the integrity threshold value, based on a single one, e.g., mean, median or mode, of the assigned integrity values that cross the integrity threshold value, based on a random or selected one of the assigned integrity values that cross the integrity threshold value or other function of one or more assigned integrity values that cross the integrity threshold value.

Following step 2708, the process 2700 advances to step 2710 where the processor 200 is illustratively operable to determine a speed decrease duration value, i.e., a time duration over which the transport speed will be decreased, based on the assigned integrity values. The speed decrease duration value may be illustratively selected in the same manner as the speed decrease value. Following step 2710, the process 2700 advances to step 2712 wherein the processor 200 is illustratively operable to determine a location on the item travel path at which to decrease the speed of item transport. In one embodiment, the processor 200 is operable to execute step 2712 by estimating, based on a present value of the conveyance transport speed, a time duration, relative to a time at which the integrity value assigned to the at least one of the multiple items is determined to warrant a decrease in a speed, that is required for the at least one of the multiple items to reach the location. In any case, the process 2700 advances from step 2712 to step 2714 where the processor 200 is operable to control the speed of the item travel path to decrease the item travel speed by the speed decrease value, to decrease the item travel speed for the speed decrease duration and/or to decrease the item travel speed and/or duration when the item(s) reach the determined location on the item travel path. In one embodiment, the processor 200 may be operable to execute step 2714 by controllably decreasing the item travel speed when the time duration, from the time at which the integrity value assigned to the at least one of the multiple items is determined to warrant a decrease in a speed, elapses. The process 2700 illustratively ends following step 2714.

In embodiments that include only linear item transport paths, the speed decrease values, speed decrease durations and location of speed decrease may all be computed based on the linear speeds of each of the linear item transport paths. In other embodiments that include, for example, one or more linear item transport paths and at least one rotatable turnabout, the processor 200 may effectuate a decrease in item transport speed by controllably decreasing either or both of the transport speed of the linear conveyance path and the rotational speed of the at least one rotatable turnabout by the speed decrease amount. Likewise in such embodiments, the processor 200 may effectuate a decrease in item transport speed by controllably decreasing either or both of the transport speed of the linear conveyance path and the rotational speed of the at least one rotatable turnabout for the speed decrease duration. Further still, the processor 200 in such embodiments may determine a location of one or more of the items relative to either or both of the linear conveyance path and the at least one rotatable turnabout at which to decrease speed, and to decrease speed of the corresponding one of the linear conveyance path and the at least one rotatable turnabout when the item reaches the corresponding location on the linear conveyance path or at least one rotatable turnabout.

It will be understood that any single feature of any embodiment of the various point-of-sale system embodiments illustrated and described with respect to FIGS. 7-27 may be implemented in any of the other embodiments illustrated in the attached figures and described herein regardless of whether or not explicitly described with respect to that embodiment. It will be further understood that not every feature described with respect to any one embodiment must be implemented with that embodiment, as some features may be optional regardless of whether explicitly stated in the above description.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. A system for processing customers of a retail establishment through a point-of-sale system at which multiple items can be simultaneously scanned for purchase, the system comprising:

a conveyance path to transport items for purchase from the retail establishment, a multiple-item scanner to substantially simultaneously price scan multiple items grouped together on the conveyance path as the conveyance path transports the multiple items thereby, a diverter configured to be controlled by a processor of the system, the diverter situated at an end of the conveyance path and on direction of the processor diverts a grouping of the items onto a particular one of a plurality of linear conveyance paths, each of the linear conveyance paths sloping downward to the particular one of a plurality of separate item collection areas, the plurality of separate item collection areas coupled to the conveyance path, each of the plurality of item collection areas configured to selectively and linearly receive items from a particular linear conveyance path after price scanning by the multiple-item scanner, wherein the plurality of separate item collection areas includes four separate item collection areas arranged and situated in a circle around an end portion of the conveyance path, a plurality of customer payment interfaces each positioned at a different one of the plurality of item collection areas and each configured to process customer payment for purchase of items routed only to the one of the plurality of item collection areas at which that customer payment station is positioned;

a plurality of weigh scales to weigh select ones of the items, each weigh scale positioned proximate to a particular customer payment interface and each weigh scale a peripheral device of the particular customer payment interface to which that weigh scale is positioned proximate to;

a plurality of customer displays, each customer display situated adjacent to each entrance of each of the linear conveyance paths; and firmware and software configured to allow a local server to control and process information on the local server for transactions of the customers at the point-of-sale device that would otherwise be processed on the point-of-sale system, the point-of-sale system configured to operate as a thin-client device interfaced to the local server, wherein the firmware and software further configured to display customer-assignment information on each customer display indicating assignments between the customers and the item collection areas at the entrances of each of the linear conveyance paths.

2. The system of claim 1 wherein the plurality of item collection areas are positioned sequentially adjacent to each other, and further comprising a plurality of privacy panels each positioned between and extending above different adjacent ones of the plurality of item collection areas and each configured to at least partially obscure visibility between adjacent ones of the plurality of item collection areas.

3. The system of claim 2 wherein one of the plurality of item collection areas is positioned adjacent to the conveyance path, and further comprising another privacy panel positioned between and extending above the one of the plurality of item collection areas and the conveyance path, the another privacy panel configured to at least partially obscure visibility between the one of the plurality of item collection areas and the conveyance path.

4. The system of claim 1 further comprising a first wall defining a terminal end of a first one of the plurality of item collection areas, a second wall defining a terminal end of a last one of the plurality of item collection areas and at least one divider wall positioned between the first and last walls, the first, second and at least one divider wall defining the plurality of item collection areas therebetween.

5. The system of claim 4 wherein each of the plurality of customer payment interfaces is mounted to, or supported by a support structure mounted to, one of the first wall, the second wall and one of the plurality of divider walls.

6. The system of claim 4 further comprising a plurality of bagging areas each positioned adjacent to a different one of the plurality of item collection areas, each of the plurality of bagging areas comprising at least one bagging stand including at least one bag support structure configured to carry a plurality of item transport bags, the at least one bagging stand mounted to one or more of the first wall, the second wall and the plurality of divider walls.

7. The system of claim 1 wherein each of the plurality of customer payment interfaces comprises at least a display monitor and a credit card processing module.

8. The system of claim 1 further comprising a cash payment interface positioned outside of the plurality of collection areas, the cash payment interface configured to process customer payment only in the form of cash for purchase of items routed to any of the plurality of item collection areas.

9. A system for processing customers of a retail establishment through a point-of-sale system at which multiple items can be simultaneously scanned for purchase, the system comprising:

a conveyance path support structure defining a planar shelf mating surface, a conveyance path operatively mounted to the conveyance path support structure to transport items for purchase from the retail establishment, the conveyance path defining a planar item support surface that is parallel with the shelf mating surface of the conveyance path support structure, the conveyance path having an item entrance end and an opposite item exit end, a diverter configured to be controlled by a processor of the system, the diverter situated at the item exit end of the conveyance path and on direction of the processor diverts a grouping of the items onto a particular one of a plurality of linear conveyance paths, each of the linear conveyance paths sloping downward to the particular one of a plurality of payment stations, a multiple-item scanner to substantially simultaneously price scan multiple items grouped together on the conveyance path as the conveyance path transports the multiple items thereby, the shelf mating surface of the conveyance path support structure defined along one side of the conveyance path between the multiple-item scanner and the item exit end of the conveyance path, a plurality of payment stations, each payment station positioned at a particular end of one of the plurality of linear conveyance paths, and each payment station for payment of a particular grouping of the items, wherein the plurality of payment stations includes four separate payment stations arranged and situated in a circle around the item exit end of the conveyance path;

a plurality of weigh scales, each weigh scale to weigh select ones of the items and each weigh scale positioned proximate to a particular payment station interface and each weigh scale a peripheral device of the particular payment stations to which that weigh scale is positioned proximate to;

an attendant station adjacent to the one side the conveyance path support structure, the attendant station comprising a shelf having a planar top surface, the shelf mounted to the conveyance path support structure with the top surface abutting and co-planar with the shelf mating surface of the conveyance path, the shelf mating surface of the conveyance path support structure and the top surface of the shelf together forming a substantially continuous planar surface;

a plurality of customer displays, each customer display situated adjacent to each entrance of each of the linear conveyance paths; and firmware and software configured to allow a local server to control and process information on the local server for transactions of the customers at the point-of-sale device that would otherwise be processed on the point-of-sale system, the point-of-sale system configured to operate as a thin-client device interfaced to the local server, and wherein the firmware and software further configured to display customer-assignment information on each customer display indicating assignments between the customers and collection areas at the entrances of each of the linear conveyance paths.

10. The system of claim 9 wherein the conveyance path defines a first longitudinal axis therethrough, wherein the shelf comprises two opposing ends each terminating at two opposing sides, the shelf defining a second longitudinal axis between the two opposing ends, and wherein the second longitudinal axis intersects the first longitudinal axis to form an acute angle therebetween when one of the opposing ends of the shelf is mounted to the conveyance path support structure, whereby the shelf is oriented relative to the conveyance path to facilitate manual sweeping by an attendant at the attendant station of items from the conveyance path onto the top surface of the shelf.

11. The system of claim 9 wherein the conveyance path support structure defines a first side wall extending along the one side of the conveyance path, the first side wall having a top surface defining the shelf mating surface of the conveyance path support structure.

12. The system of claim 11 wherein the shelf mating surface of the first side wall extends above the planar item support surface of the conveyance path to form a step between the conveyance path and the shelf mating surface of the first side wall.

13. The system of claim 12 wherein the shelf mating surface of the first side wall extends below the planar item support surface of the conveyance path.

14. The system of claim 12 wherein the shelf mating surface of the first side wall is substantially co-planar with the planar item support surface of the conveyance path.

15. The system of claim 9 further comprising:

a plurality of separate item collection areas, each separate item collection area to selectively receive the multiple items from one of the plurality of linear conveyance paths after scanning by the multiple-item scanner and transport of the multiple items to the diverter situated at the item exit end of the conveyance path, and a wall defining a terminal end of a one of the plurality of item collection areas, wherein the other of the opposing ends of the shelf is mounted to the wall.

16. The system of claim 15 further comprising:

a second side wall extending along an opposite side of the conveyance path between the item entrance end of the conveyance path and the item exit end of the conveyance path, and a plurality of light sources extending along at least one of the first and second side walls from the multiple-item scanner toward the item exit end of the conveyance path.

17. A system for processing customers of a retail establishment through a point-of-sale system at which multiple items can be simultaneously scanned for purchase, the system comprising:

a conveyance path to transport items for purchase from the retail establishment, the conveyance path having an item entrance end and an opposite item exit end, a multiple-item scanner to substantially simultaneously price scan multiple items grouped together on the conveyance path as the conveyance path transports the multiple items thereby, a diverter configured to be controlled by a processor of the system, the diverter situated at item exit end of the conveyance path and on direction of the processor diverts a grouping of the items onto a particular one of a plurality of linear conveyance paths, each of the linear conveyance paths sloping downward to the particular one of a plurality of separate item collection areas, the plurality of separate item collection areas to receive groupings of the items from the plurality of linear conveyance paths after price scanning by the multiple-item scanner and transport of the groupings to the item exit end of the conveyance path, wherein the plurality of separate item collection areas includes four separate item collection areas arranged and situated in a circle around the item exit end of the conveyance path, a plurality of weigh scales, each weigh scale for weighing select ones of the items, and each weigh scale positioned proximate to a particular collection area and payment station and each weigh scale a peripheral device of the payment station to which that weigh scale is positioned proximate to;

at least one rotatable turnabout positioned between the item exit end of the conveyance path and the plurality of item collection areas to route the multiple items from the item exit end of the conveyance path to a selected one of the plurality of item collection areas after price scanning by the multiple-item scanner along a selected one of the plurality of linear conveyance paths;

a plurality of customer displays, each customer display situated adjacent to each entrance of each of the linear conveyance paths; and firmware and software configured to allow a local server to control and process information on the local server for transactions of the customers at the point-of-sale device that would otherwise be processed on the point-of-sale system, the point-of-sale system configured to operate as a thin-client device interfaced to the local server, and wherein the firmware and software further configured to display customer-assignment information on each customer display indicating assignments between the customers and the item collection areas at the entrances of each of the linear conveyance paths.

18. The system of claim 17 further comprising the diverter to route the multiple items from the at least one rotatable turnabout to the selected one of the plurality of item collection areas after price scanning by the multiple-item scanner of the multiple items and transport of the multiple items along the conveyance path from the item entrance end to the item exit end of the conveyance path.

* * * * *